(12) United States Patent
Shin

(10) Patent No.: US 9,552,572 B2
(45) Date of Patent: Jan. 24, 2017

(54) MOBILE TERMINAL

(71) Applicant: Sang Hyun Shin, Namyangju-si (KR)

(72) Inventor: Sang Hyun Shin, Namyangju-si (KR)

(*) Notice: Subject to any disclaimer, the term of this patent is extended or adjusted under 35 U.S.C. 154(b) by 4 days.

(21) Appl. No.: 14/659,104

(22) Filed: Mar. 16, 2015

(65) Prior Publication Data
US 2016/0161922 A1 Jun. 9, 2016

(30) Foreign Application Priority Data
Dec. 8, 2014 (KR) .................. 10-2014-0175079

(51) Int. Cl.
*G04G 9/06* (2006.01)
*G06Q 10/10* (2012.01)

(52) U.S. Cl.
CPC ............ *G06Q 10/1095* (2013.01); *G04G 9/06* (2013.01)

(58) Field of Classification Search
CPC ........ G04G 5/00; G04G 5/002; G04G 9/0082; G04G 9/06; G06Q 10/1095
See application file for complete search history.

(56) References Cited

U.S. PATENT DOCUMENTS

| | | | |
|---|---|---|---|
| 6,477,117 B1 * | 11/2002 | Narayanaswami .. | G04G 13/026 368/224 |
| 7,081,905 B1 * | 7/2006 | Raghunath ............... | G04G 5/00 345/684 |
| 8,522,163 B2 * | 8/2013 | Relyea ................. | G04G 9/0082 715/834 |
| 8,978,062 B2 * | 3/2015 | Loebig ................... | G11B 27/34 725/37 |
| 9,001,625 B2 * | 4/2015 | Essery ................. | H04W 88/02 368/46 |
| 9,176,480 B2 * | 11/2015 | Sadilek ............... | G06F 3/04886 |
| 2012/0066629 A1 * | 3/2012 | Lee ..................... | G06F 3/04847 715/769 |
| 2013/0235704 A1 * | 9/2013 | Grinberg ............... | G04G 21/08 368/69 |
| 2013/0254705 A1 * | 9/2013 | Mooring .............. | G06F 3/0488 715/784 |

* cited by examiner

*Primary Examiner* — Sean Kayes
(74) *Attorney, Agent, or Firm* — Birch, Stewart, Kolasch & Birch, LLP

(57) ABSTRACT

Disclosed is a mobile terminal. The mobile terminal includes a display unit and a controller configured to display a watch object on the display unit, the watch object including at least one of a plurality of schedule information or a plurality of applications. The controller is configured to, when a first region of the watch object is touched or when a current time reaches a time corresponding to the first region, display schedule information or a corresponding application screen related to the first region of the watch object or the time corresponding to the first region, and, when a second region of the watch object is touched or when a current time reaches a time corresponding to the second region, display schedule information or a corresponding application screen related to the second region of the watch object or the time corresponding to the second region. In this way, user convenience may be enhanced.

18 Claims, 85 Drawing Sheets

MOBILE TERMINAL

CROSS-REFERENCE TO RELATED APPLICATION

This application claims the priority benefit of Korean Patent Application 10-2014-0175079, filed on Dec. 8, 2014 in the Korean Intellectual Property Office, the disclosure of which is incorporated herein by reference.

BACKGROUND OF THE INVENTION

1. Field of the Invention

The present invention relates to a mobile terminal and, more particularly, to a mobile terminal which is capable of improving user convenience.

2. Description of the Related Art

A mobile terminal is a portable device that is portable and has one or more of, for example, a function of performing voice and video calls, a function of inputting and outputting information, and a function of storing data. Owing to diversified functions thereof, mobile terminals have complex functions such as, for example, capture of still images or moving images, playback of music files or video files, gaming, broadcast reception, wireless Internet, and message transmission and reception and are implemented in a multimedia player form. These mobile terminals in the form of a multimedia player have been applied in various ways in terms of hardware or software in order to implement such complex functions.

SUMMARY OF THE INVENTION

Therefore, it is an object of the present invention to provide a mobile terminal which is capable of improving user convenience.

In accordance with one embodiment of the present invention, the above and other objects can be accomplished by the provision of a mobile terminal including a display unit and a controller configured to display a watch object on the display unit, the watch object including at least one of a plurality of schedule information or a plurality of applications, wherein the controller is configured to, when a first region of the watch object is touched or when a current time reaches a time corresponding to the first region, display schedule information or a corresponding application screen related to the first region of the watch object or the time corresponding to the first region, and, when a second region of the watch object is touched or when a current time reaches a time corresponding to the second region, display schedule information or a corresponding application screen related to the second region of the watch object or the time corresponding to the second region.

In accordance with another embodiment of the present invention, there is provided a mobile terminal including a display unit, a communication unit configured to externally transmit data, and a controller configured to display a watch object on the display unit, the watch object including at least one of a plurality of schedule information or a plurality of applications, wherein the controller is configured to transmit schedule information with respect to a first region in the watch object to an external device when there is a schedule information transmission input to the first region.

In accordance with a further embodiment of the present invention, there is provided a mobile terminal including a display unit, a communication unit configured to externally transmit data, and a controller configured to display a watch object on the display unit, the watch object including at least one of a plurality of schedule information or a plurality of applications, wherein the controller is configured to transmit schedule information, including time information with respect to a first region in the watch object and application information set to correspond to the first region, when there is a schedule information transmission input to the first region.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Hereinafter, the present invention will be described in detail with reference to the accompanying drawings.

A mobile terminal described in this specification may include, for example, a mobile phone, a smart phone, a wearable device that is wearable on the wrist, a tablet PC, wearable glasses, a personal digital assistant (PDA), a portable multimedia player (PMP), a camera, a navigation system, a tablet computer, an e-book terminal, and a head mounted display (HMD).

With respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other.

Figure 1:
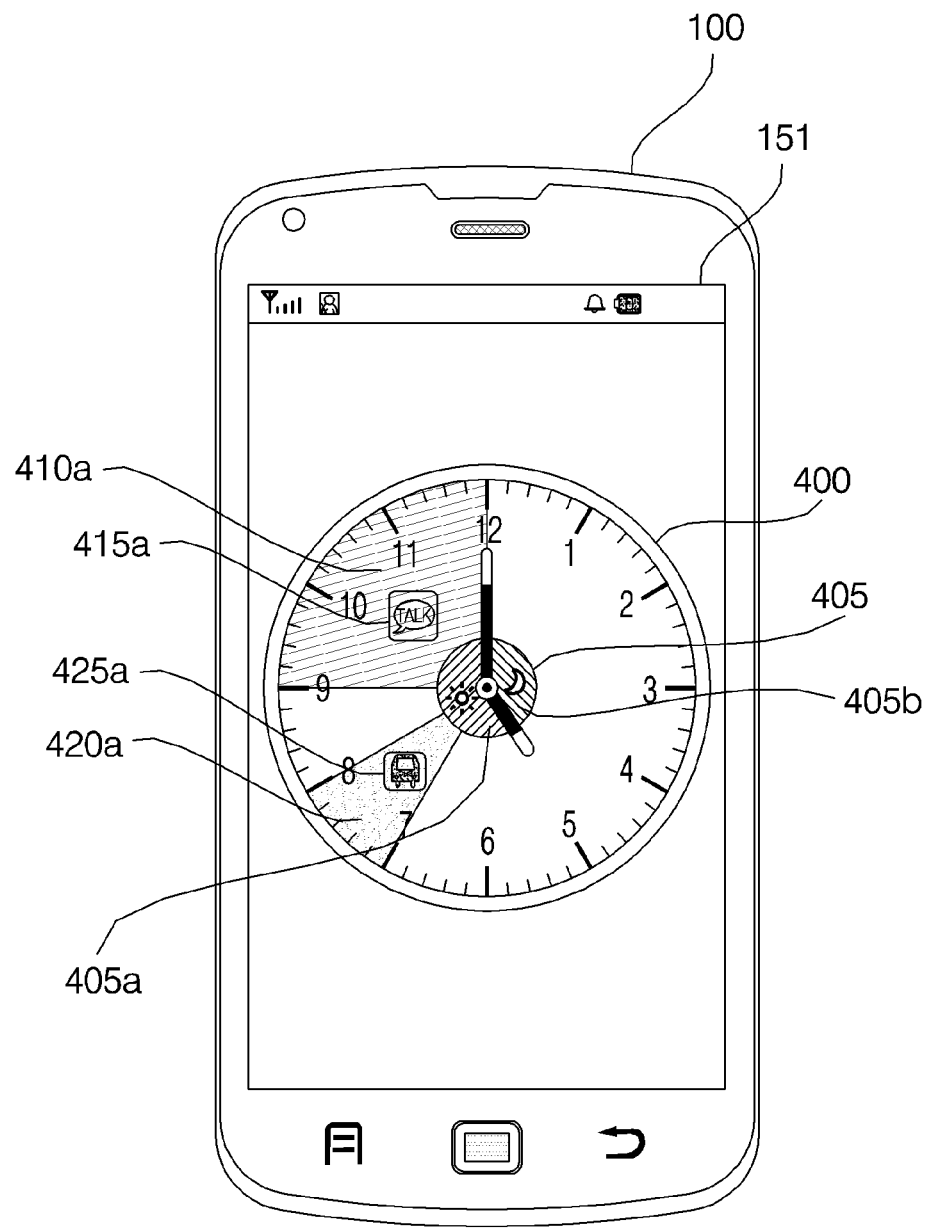
FIG. 1 is a view illustrating a watch object displayed on a mobile terminal.

FIG. 1 is a view illustrating a watch object displayed on a mobile terminal.

Referring to FIG. 1, the mobile terminal 100 may display a watch object 400 as a lock screen or a standby screen.

In FIG. 1, it is illustrated that the watch object 400 is displayed on a display unit 151.

Although the watch object 400 may have various shapes, FIG. 1 illustrates the watch object 400 as having a circular shape.

The watch object 400 may interwork with a plurality of schedule information, a plurality of applications, or combinations thereof.

That is, the watch object 400 may include a plurality of schedule information, may include a plurality of application items, or may include a plurality of schedule information and a plurality of application items.

FIG. 1 illustrates that a first application item 425a is associated with and displayed at a first region 420a between 7:00 AM to 8:00 AM and a second application item 415a is associated with and displayed at a second region 410a between 9:00 AM to 12:00 AM.

FIG. 1 illustrates that the first application item 425*a* is a traffic related application item and the second application item 415*a* is an SNS application item.

For example, when a current time reaches 7:00 AM in a state in which the watch object 400 is displayed as a lock screen or a standby screen, a traffic related application corresponding to the first application item 425*a* may be automatically executed and a traffic related application screen may be displayed on the mobile terminal 100. Alternatively, when a current time reaches 9:00 AM in a state in which the watch object 400 is displayed as a lock screen or a standby screen, an SNS related application corresponding to the second application item 415*a* may be automatically executed and an SNS related application screen may be displayed on the mobile terminal 100. In this way, a reserved application may be directly executed even without a user input, which may enhance user convenience.

In another example, when a current time reaches 7:00 AM in a state in which the watch object 400 is displayed as a lock screen or a standby screen, an alarm message that indicates whether or not to execute a traffic related application corresponding to the first application item 425*a* may be automatically output via vibration, audio or video. Then, as the corresponding traffic related application is executed in response to a user input, a traffic related application screen may be displayed on the mobile terminal 100. Alternatively, when a current time reaches 9:00 AM in a state in which the watch object 400 is displayed as a lock screen or a standby screen, an alarm message that indicates whether or not to execute an SNS related application corresponding to the second application item 415*a* may be automatically output via vibration, audio or video. Then, as the corresponding SNS related application is executed in response to a user input, an SNS related application screen may be displayed on the mobile terminal 100. In this way, user convenience may be enhanced.

As described above, user convenience may be enhanced by setting a plurality of applications in the watch object 400 so as to interwork with the watch object 400.

On the other hand, for example, when the first region 420*a* in the watch object 400 is selected by a user touch input, first schedule information between 7:00 AM and 8:00 AM corresponding to the first region 420*a* may be output via vibration, audio or video. As a result, the user can simply and rapidly check the first schedule information.

In another example, when the second region 410*a* in the watch object 400 is selected by a user touch input, second schedule information between 9:00 AM and 12:00 AM corresponding to the second region 410*a* may be output via vibration, audio or video. As a result, the user can simply and rapidly check the second schedule information.

In addition to the first region 420*a* and the second region 410*a*, the watch object 400 may further include an hour hand, a minute hand, and a day and night object 405 representing daytime and nighttime.

The day and night object 405 may include a daytime object 405*a* representing daytime and a nighttime object 405*b* representing nighttime.

The daytime object 405*a* and the nighttime object 405*b* may be separated from each other by the hour hand, or may be separated from each other by the first region 420*a* or the second region 410*a* that interworks with schedule information or an application.

The first region 420*a* and the second region 410*a*, which are associated with different pieces of schedule information, may be separated from each other by, for example, different colors or brightnesses.

Meanwhile, in the case where the watch object 400 is displayed as a lock screen, the lock screen may be released as at least one of numbers (1 to 12) in the watch object 400 is selected. Specifically, when a specific pattern of numbers is pushed, the lock screen is released and a home screen may be displayed.

On the other hand, in a state in which the watch object 400 is displayed as a lock screen, an unlock screen may be displayed when the user touches a region except for the watch object 400 in order to release the lock screen. For example, when it is attempted to release the lock screen via input of numbers, a number input window may be displayed. In another example, when it is attempted to release the lock screen via facial recognition, a camera may be operated and a display window for displaying an image captured by the camera may be displayed.

Setting of schedule information and setting of a related application will be described below with reference to FIG. 5A and the following drawings.

Figure 2:
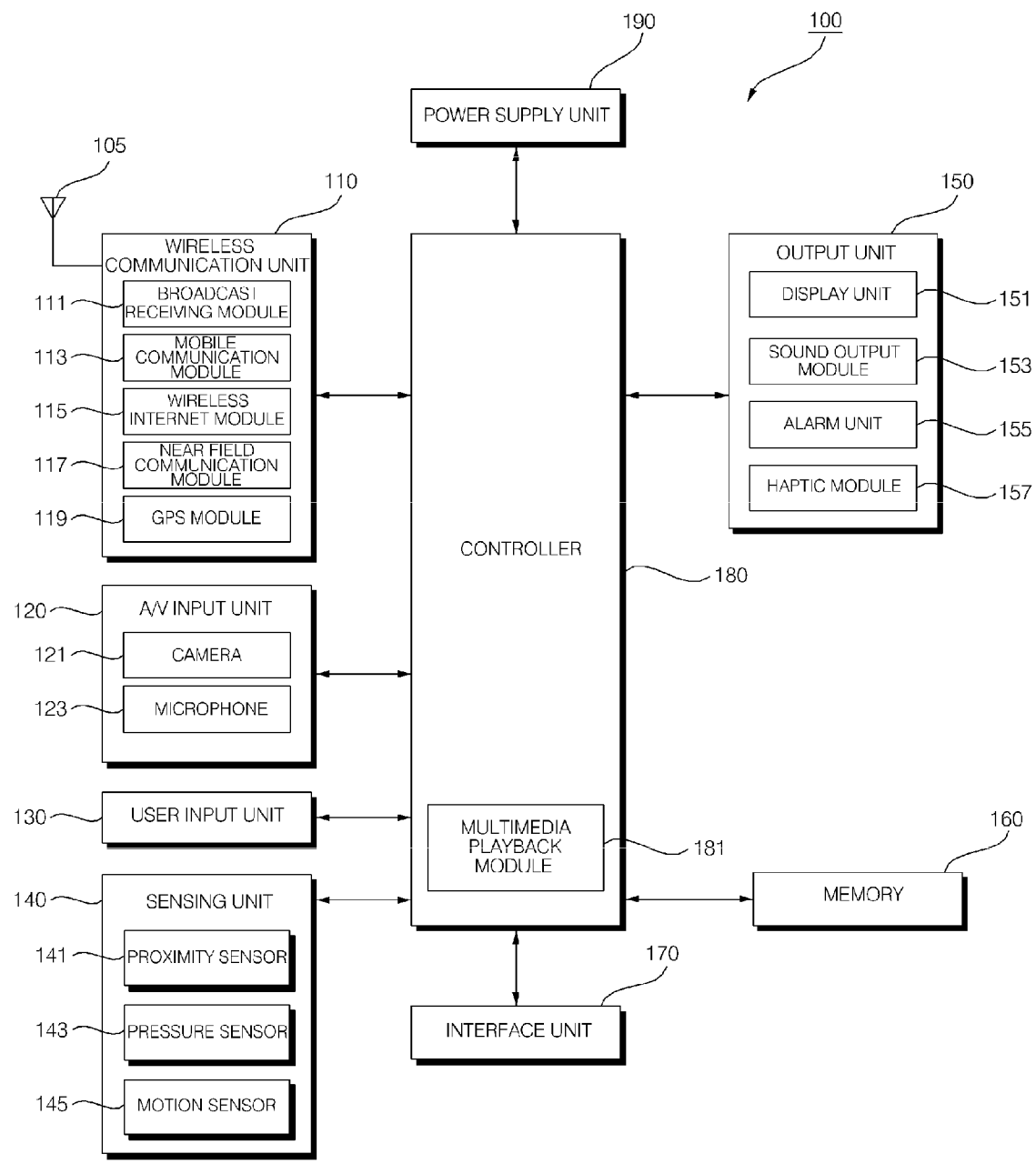
FIG. 2 is a block diagram illustrating the mobile terminal illustrated in FIG. 1.

FIG. 2 is a block diagram of the mobile terminal illustrated in FIG. 1. The mobile terminal according to an embodiment of the present invention will be described below with reference to FIG. 2 in terms of constituent elements based on functions of the mobile terminal.

Referring to FIG. 2, the mobile terminal 100 may include a wireless communication unit 110, an audio/video (A/V) input unit 120, a user input unit 130, a sensing unit 140, an output unit 150, a memory 160, an interface unit 170, a controller 180 and a power supply unit 190. When the aforementioned components are implemented in actual applications, two or more components may be combined into a single component or a single component may be divided into two or more components as needed.

The wireless communication unit 110 may include a broadcast receiving module 111, a mobile communication module 113, a wireless Internet module 115, a near field communication unit 117, and a global positioning system (GPS) module 119, for example.

The broadcast receiving module 111 may receive at least one of broadcast signals and broadcast related information from an external broadcast management server through broadcast channels. At this time, the broadcast channels may include, for example, satellite channels and terrestrial channels. The broadcast management server may mean a server that produces and transmits at least one of broadcast signals and broadcast related information, or a server that receives at least one of previously produced broadcast signals and broadcast related information and transmits the same to the terminal.

The broadcast signals may include not only TV broadcast signals, radio broadcast signals and data broadcast signals, but also broadcast signals in the form of TV broadcast signals or radio broadcast signals combined with data broadcast signals. The broadcast related information may mean information related to broadcast channels, broadcast programs, or broadcast service providers. The broadcast related information may be provided through a mobile communication network and, in this case, may be received by the mobile communication module 113. The broadcast related information may be present in various forms.

The broadcast receiving module 111 receives broadcast signals using a variety of broadcast systems. More particularly, the broadcast receiving module 111 may receive broadcast signals using a digital broadcast system such as, for example, a digital multimedia broadcasting terrestrial (DMB-T), digital multimedia broadcasting-satellite (DMB-S), media forward link only (MediaFLO), digital video broadcasting handheld (DVB-H), and integrated service digital broadcasting terrestrial (ISDB-T). In addition, the broadcast receiving module 111 may be configured to be suitable for all broadcast systems providing broadcast signals as well as the aforementioned digital broadcast systems. The broadcast signals and/or the broadcast related information received through the broadcast receiving module 111 may be stored in the memory 160.

The mobile communication module 113 performs transmission and reception of radio signals with at least one of a base station, an external terminal and a server on a mobile communication network. Here, the radio signals may include voice call signals, image call signals, or various types of data based on text/multimedia message transmission and reception.

The wireless Internet module 115 is a module for wireless Internet connection. The wireless Internet module 115 may be internally or externally coupled to the mobile terminal 100. Wireless Internet technologies may include, for example, wireless LAN (WLAN) (Wi-Fi), wireless broadband (Wibro), world interoperability for microwave access (Wimax), and high speed downlink packet access (HSDPA).

The near field communication module 117 is a module for near field communication. Near field communication technologies may include, for example, Bluetooth, radio frequency identification (RFID), infrared data association (IrDA), ultra wideband (UWB), ZigBee, and near field communication (NFC).

The GPS module 119 may receive location information from a plurality of GPS satellites.

The A/V input unit 120 serves to input audio signals or video signals and may include a camera 121 and a microphone 123, for example. The camera 121 processes an image frame such as, for example, a still image or a moving image that is acquired by an image sensor in a video call mode or an image capture mode. In addition, the processed image frame may be displayed on a display unit 151.

The image frame processed by the camera 121 may be stored in the memory 160, or may be outwardly transmitted through the wireless communication unit 110. Two or more camera 121 may be provided according to one aspect of a configuration of the terminal.

The microphone 123 receives an external sound signal, for example, in a call mode, a recording mode, or a voice recognition mode and processes the received sound signal into electrical voice data. Then, in the case of a call mode, the processed voice data may be converted into and output in a form that is transmittable to a mobile communication base station through the mobile communication module 113. The microphone 123 may utilize various noise removal algorithms to remove noise generated upon receiving the external sound signal.

The user input unit 130 generates key input data that is input by the user to control operation of the terminal. The user input unit 130 may be configured into, for example, a key pad, a dome switch, or a touch pad (static pressure/electrostatic), which is capable of receiving a command or information input by a user push operation or touch operation. In addition, the user input unit 130 may be configured into, for example, a jogwheel or other jog type means based on rotation of a key, a joystick, or a finger mouse. In particular, when a touch pad is layered onto the display unit 151 as described below, this may be called a touch screen.

The sensing unit 140 senses a current state of the mobile terminal 100 such as, for example, an opened/closed state of the mobile terminal 100, a position of the mobile terminal 100 and the presence of a user touch, and generates a sensing signal to control an operation of the mobile terminal 100. For example, when the mobile terminal 100 takes the form of a slide phone, the sensing unit 140 may sense whether the slide phone is opened or closed. In addition, the sensing unit 140 may serve to sense, for example, whether power is supplied from a power supply unit 190 and whether the interface unit 170 is coupled to an external device.

The sensing unit 140 may include a proximity sensor 141, a pressure sensor 143 and a motion sensor 145, for example. The proximity sensor 141 may detect, for example, the presence of an object that approaches the mobile terminal 100 or the presence of an object that is present near the mobile terminal 100 without mechanical contact. The proximity sensor 141 may detect a proximate object using, for example, variation in alternating current (AC) magnetic field, variation in static magnetic field, or a rate of variation in capacitance. Two or more proximity sensors 141 may be provided according to one aspect of a configuration of the terminal.

The pressure sensor 143 may detect, for example, whether pressure is applied to the mobile terminal 100 and the magnitude of the pressure. The pressure sensor 143 may be installed to a portion of the mobile terminal 100 where detection of pressure is required according to a usage environment. When the pressure sensor 143 is installed to the display unit 151, according to a signal output from the pressure sensor 143, a touch input through the display unit 151 and a pressure touch input that applies a greater pressure than the touch input may be distinguished from each other. In addition, according to a signal output from the pressure sensor 143, the magnitude of pressure applied to the display unit 151 upon a pressure touch input may be detected.

The motion sensor 145 senses, for example, motion or a position of the mobile terminal 100 using, for example, an accelerometer or a gyro sensor. The accelerometer, which may be used in the motion sensor 145, is a device that converts variation in acceleration in any one direction into an electric signal. The accelerometer is extensively used as a micro electro mechanical system (MEMS) technique is developed.

By way of example, there are various kinds of accelerometers such as those built in an air bag system of a vehicle in order to measure a large value of acceleration used for detecting a collision and those used in games as input means in order to measure a small value of acceleration by recognizing a small operation of the human hand. The accelerometer may typically include two axes or three axes components mounted in one package, or may require only one axis (for example, a z-axis) component according to a usage environment. Accordingly, in some applications, when an X-axis or Y-axis accelerometer, other than a Z-axis accelerometer, needs to be used, an additional substrate segment may be used to vertically mount the accelerometer on a main substrate.

In addition, the gyro sensor serves to measure an angular velocity and may sense an orientation (angle) deviated from a reference direction.

The output unit 150 serves to output an audio signal, a video signal, or an alarm signal. The output unit 150 may include the display unit 151, a sound output module 153, an alarm unit 155, and a haptic module 157, for example.

The display unit 151 displays and outputs information processed in the mobile terminal 100. For example, when the mobile terminal 100 is in a call mode, the display unit 151 displays a user interface (UI) or a graphic user interface (GUI) related to a call. In addition, when the mobile terminal 100 is in a video call mode or an image capture mode, the display unit 151 may display a captured or received image separately or simultaneously and display a UI or a GUI.

Meanwhile, as described above, when the display unit 151 and a touch pad are layered with each other to constitute a touchscreen, the display unit 151 may be used as an input device that enables input of information by a user touch, in addition to being used as an output device.

When the display unit 151 takes the form of a touchscreen, the display unit 151 may include a touchscreen panel and a touchscreen panel controller, for example. In this case, the touchscreen panel is a transparent panel attached to the exterior of the mobile terminal 100 and may be connected to an inner bus of the mobile terminal 100. When there is a touch input during contact result observation, the touchscreen panel transmits corresponding signals to the touchscreen panel controller. The touch screen panel controller processes the signals and transmits corresponding data to the controller 180 in order to allow the controller 180 to recognize whether there is a touch input or which area of the touch screen is touched.

The display unit 151 may be configured into e-paper. E-paper is of a reflective display type and has excellent viewing characteristics like typical paper and ink such as a high resolution, a wide viewing angle, and a bright white background. E-paper may be implemented on any substrate such as, for example, a plastic or metal substrate, or paper, may continuously display an image even after power is shut-down, and may contribute to extension of the battery life of the mobile terminal 100 owing to elimination of a backlight power source. A hemispherical twist ball charged with electrostatic power, an electrophoresis micro capsule, or the like may be used as e-paper.

In addition, the display unit 151 may include at least one of a liquid crystal display, a thin film transistor-liquid crystal display, an organic light-emitting diode, a flexible display, and a 3D display. In addition, at least two display units 151 may be provided according to one implementation form of the mobile terminal 100. For example, both an external display unit (not illustrated) and an internal display unit (not illustrated) may be equipped in the mobile terminal 100.

The sound output module 153 outputs audio data received from the wireless communication unit 110 or stored in the memory 160 in, for example, a call signal reception mode, a call mode, a recording mode, a voice recognition mode, and a broadcast reception mode. In addition, the sound output module 153 outputs a sound signal of a function performed in the mobile terminal 100, which relates to call signal reception sound and message reception sound. The sound output module 153 may include, for example, a speaker and a buzzer.

The alarm unit 155 outputs a signal for notifying the occurrence of an event in the mobile terminal 100. Examples of an event occurring in the mobile terminal 100 include call signal reception, message reception, and key signal input. The alarm unit 155 outputs a signal for notifying the occurrence of an event in a different format than an audio signal or a video signal. For example, the alarm unit 155 outputs a signal in a vibration form. When a call signal or a message is received, the alarm unit 155 may output a signal for notifying the reception. In addition, when a key signal is input, the alarm unit 155 may output a signal as a feedback on the key signal input. A user may recognize the occurrence of an event through a signal output from the alarm unit 155. A signal for notifying the occurrence of an event may be output through the display unit 151 or the sound output module 153 in the mobile terminal 100.

The haptic module 157 generates various haptic effects that a user can feel. A representative example of haptic effects generated by the haptic module 157 is vibration effect. When the haptic module 157 generates vibration as haptic effect, the intensity and pattern of vibration generated by the haptic module 157 are convertible and different vibrations may be combined and output, or sequentially output.

In addition to the vibration, the haptic module 157 may generate various haptic effects such as, for example, an effect by stimulation due to an arrangement of pins that vertically move with respect to a skin contact surface, an effect by stimulation due to injection power or suction power of air through a nozzle or suction inlet, an effect by stimulation due to rubbing against a skin surface, an effect by stimulation due to electrode contact, an effect by stimulation due to static electricity, and an effect by cold and warm sense reproduction using a heat absorption or radiation device. The haptic module 157 may deliver haptic effects through direct contact and may be implemented to provide haptic effects through muscle sense such as, for example, a user's finger or arm. At least two haptic modules 157 may be provided according to one aspect of a configuration of the mobile terminal 100.

The memory 160 may store programs for processing and control of the controller 180 and may function to temporarily store input or output data (for example, a phonebook, a message, a still image, and a video).

The memory 160 may include at least one type of storage medium among a flash memory type, a hard disk type, a multimedia card micro type, a card type (for example, SD or XD memory), a RAM type, and a ROM type. In addition, the mobile terminal 100 may manage web storage for performing the storage function of the memory 160 on the Internet.

The interface unit 170 serves as an interface with all external devices connected to the mobile terminal 100. Examples of an external device connected to the mobile terminal 100 include a wired/wireless headset, an external charger, a wired/wireless data port, a card socket (for example, a memory card, a Subscriber Identification Module (SIM) card, and a User Identity Module (UIM) card), an audio Input/Output (I/O) terminal, a video I/O terminal, and an earphone. The interface unit 170 may receive data from such an external device or power and then transmit the same to each component in the mobile terminal 100, or may transmit data in the mobile terminal 100 to an external device through the interface unit 170.

When the mobile terminal 100 is connected to an external cradle, the interface unit 170 may be a path through which power from the connected cradle is supplied to the mobile terminal 100, or a path through which various command signals input by a user from the cradle are transmitted to the mobile terminal 100.

The controller 180 typically controls an operation of each of the above-described components in order to control overall operations of the mobile terminal 100. For example, the controller 180 performs control and processing operations related to, for example, a voice call, data communication, and video call. In addition, the controller 180 may include a multimedia playback module 181 for multimedia playback. The multimedia playback module 181 may be configured into hardware in the controller 180, or may be configured into software separated from the controller 180.

Moreover, the power supply unit 190 may receive external power or internal power according to control of the controller 180 in order to supply power necessary for operations of the respective components.

The mobile terminal 100 having the above-described configuration includes a wired/wireless communication system and a satellite based communication system in order to be operable in a communication system that is capable of transmitting data through a frame or a packet.

Figure 3:
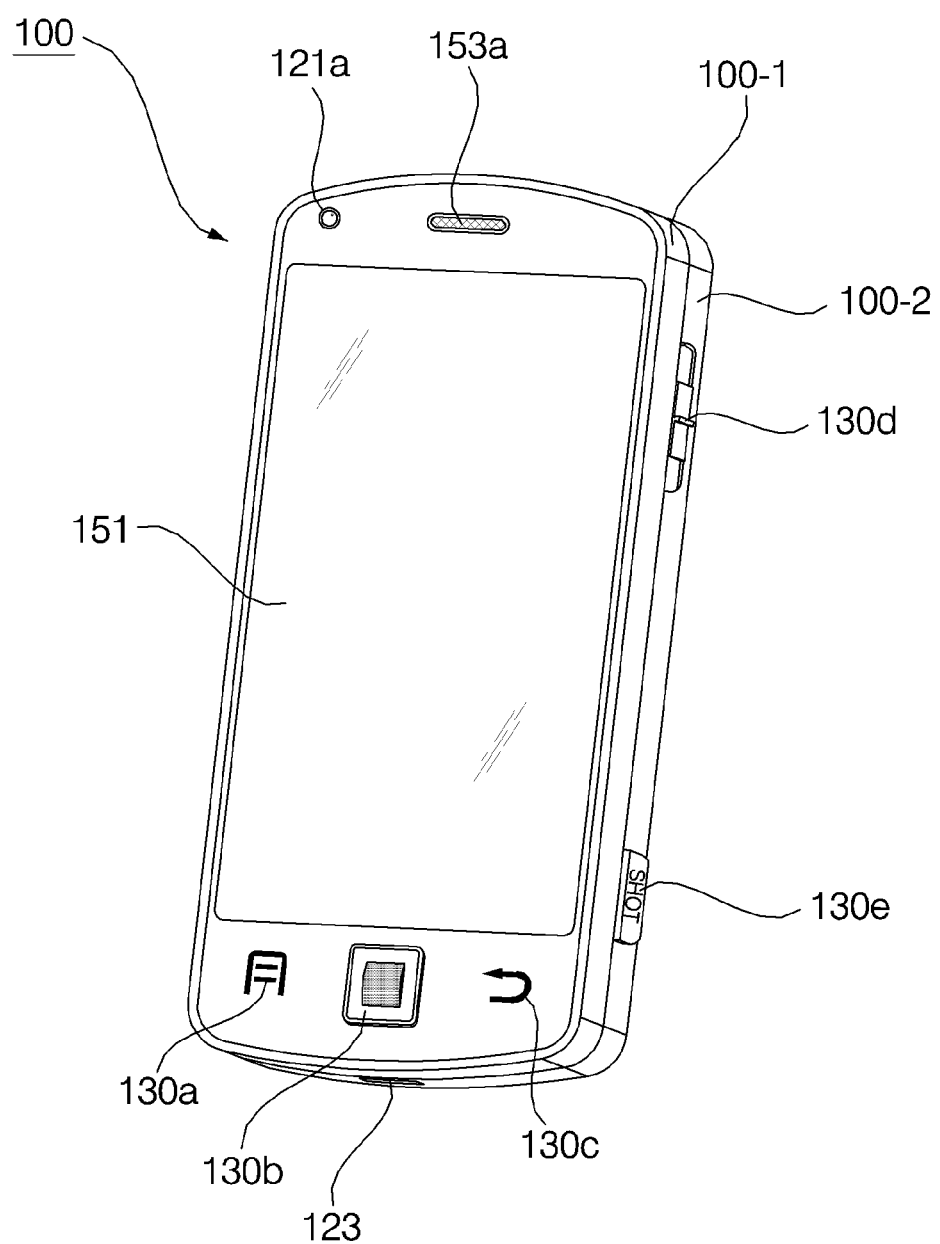
FIG. 3 is a front perspective view illustrating the mobile terminal illustrated in FIG. 2.
Figure 4:
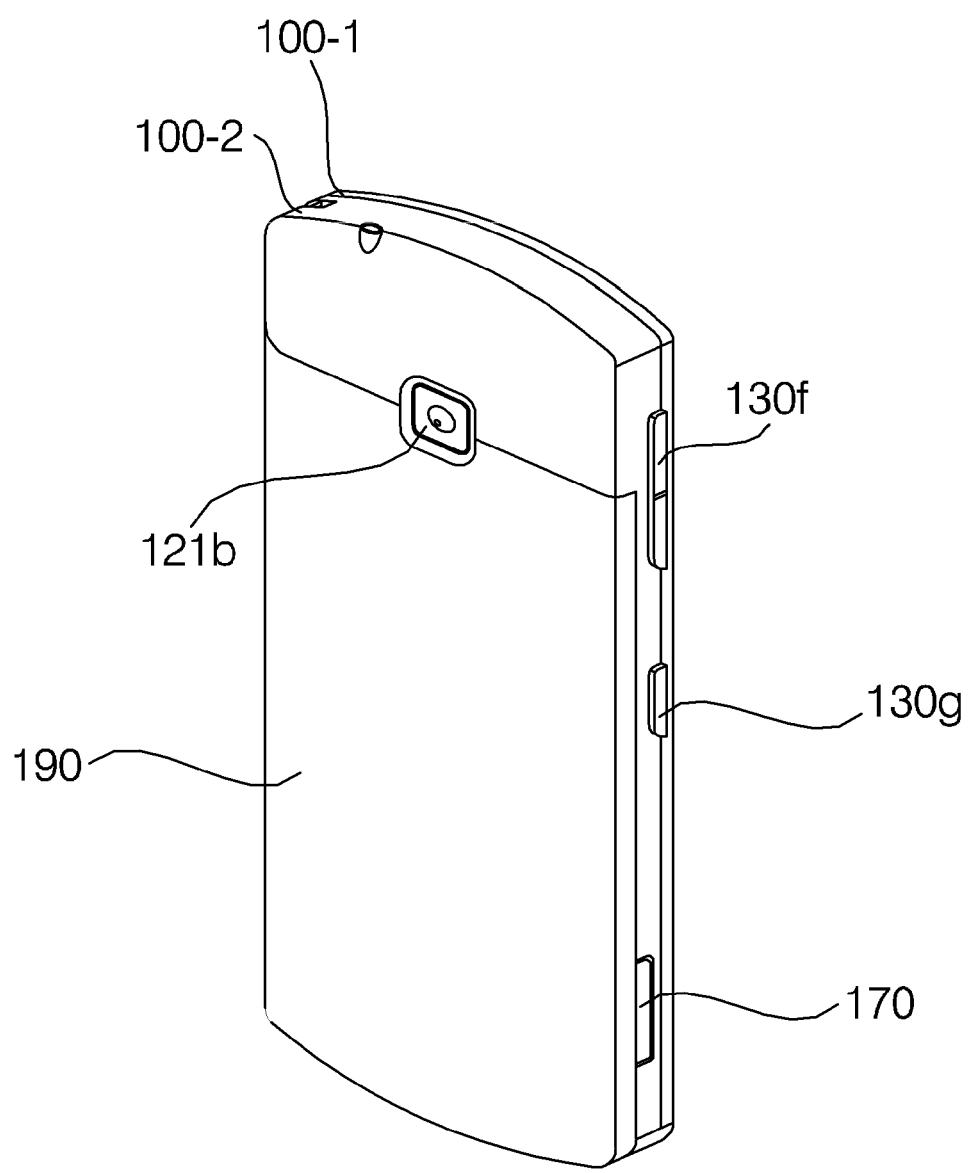
FIG. 4 is a rear perspective view illustrating the mobile terminal of FIG. 3.

FIG. 3 is a front perspective view of the mobile terminal illustrated in FIG. 2 and FIG. 4 is a rear perspective view of the mobile terminal illustrated in FIG. 3. Hereinafter, the mobile terminal according to the present invention will be described with reference to FIGS. 3 and 4 in terms of components according to the external appearance of the mobile terminal. In addition, for convenience of description, among various types of mobile terminals such as, for example, folder type, bar type, swing type, and slider type mobile terminals, a bar type mobile terminal having a front touchscreen will be described below by way of example. However, the present invention is not limited to the bar type mobile terminal and may be applied to all of the aforementioned mobile terminals.

Referring to FIG. 3, a case constituting the external appearance of the mobile terminal 100 includes a front case 100-1 and a rear case 100-2. Various electronic components are accommodated in a space defined by the front case 100-1 and the rear case 100-2.

A display unit 151, a first sound output module 153a, a first camera 121a, and first to third user input units 130a, 130b, and 130c may be mounted to a main body, more particularly, the front case 100-1. In addition, a fourth user input unit 130d, a fifth user input unit 130e, and a microphone 123 may be arranged at a side surface of the rear case 100-2.

The display unit 151 is configured such that a touch pad is layered onto the display unit 151. As such, the display unit 151 may operate as a touchscreen to enable input of information by a user touch.

The first sound output module 153a may be implemented into a receiver or a speaker. The first camera 121a may be implemented into a form suitable for capturing a still image or moving image of a user. The microphone 123 may be implemented into a form suitable for receiving user voice and other sounds.

The first to fifth user input units 130a, 130b, 130c, 130d, and 130e as described above and sixth and seventh user input units 130f and 130g as described below may be referred to, individually or collectively, as the user input unit 130 and may adopt any method so long as they are manipulated by a user in a tactile manner.

For example, the user input unit 130 may be implemented into a dome switch or a touch pad which is capable of receiving a command or information through a user push or touch operation, or may be implemented into a jog wheel or jog type based on rotation of a key or a joystick type. On the functional aspect, the first to third user input units 130a, 130b, and 130c are for inputting commands such as start, end, and scroll, and the fourth user input unit 130d is for inputting the selection of an operation mode. In addition, the fifth user input unit 130e may operate as a hot-key for activating a specific function of the mobile terminal 100.

Referring to FIG. 4, a second camera 121b may be additionally mounted on a rear surface of the rear case 100-2, and the sixth and seventh user input units 130f and 130g and the interface unit 170 may be disposed at a side surface of the rear case 100-2.

The second camera 121b may have an image capture direction that is substantially opposite to that of the first camera 121a, and may have different pixels than the first camera 121a. A flash (not illustrated) and a mirror (not illustrated) may be additionally disposed adjacent to the second camera 121b. In addition, another camera may be further installed adjacent to the second camera 121b in order to capture a 3 D image.

The flash emits light toward an object when the second camera 121b captures an image of the object. The mirror is used to reflect a user's face when the user shoots himself/herself (i.e. self-shooting) by using the second camera 121b.

A second sound output module (not illustrated) may be additionally mounted to the rear case 100-2. The second sound output module may implement a stereo function together with the first sound output module 153a, and may be used for a call in a speaker phone mode.

The interface unit 170 may be used as a path for exchange of data with an external device. In addition to an antenna for a call, an antenna (not illustrated) for reception of a broadcast signal may be disposed at a region of the front case 100-1 or the rear case 100-2. The antenna may be installed so as to be pulled from the rear case 100-2.

The power supply unit 190 may be mounted on the rear case 100-2 in order to supply power to the mobile terminal 100. For example, the power supply unit 190 as a rechargeable battery may be detachably coupled to the rear case 100-2 for charging.

Although, for example, the second camera 121b has been described above as being disposed at the rear case 100-2, the present invention should not be limited thereto. In addition, even when the second camera 121b is not additionally equipped, the first camera 121a may be configured to be rotatable in order to capture an image in the image capture direction of the second camera 121b.

FIGS. 5A to 18D are reference views illustrating various examples of an operating method of a mobile terminal according to an embodiment of the present invention.

Figure 5A:
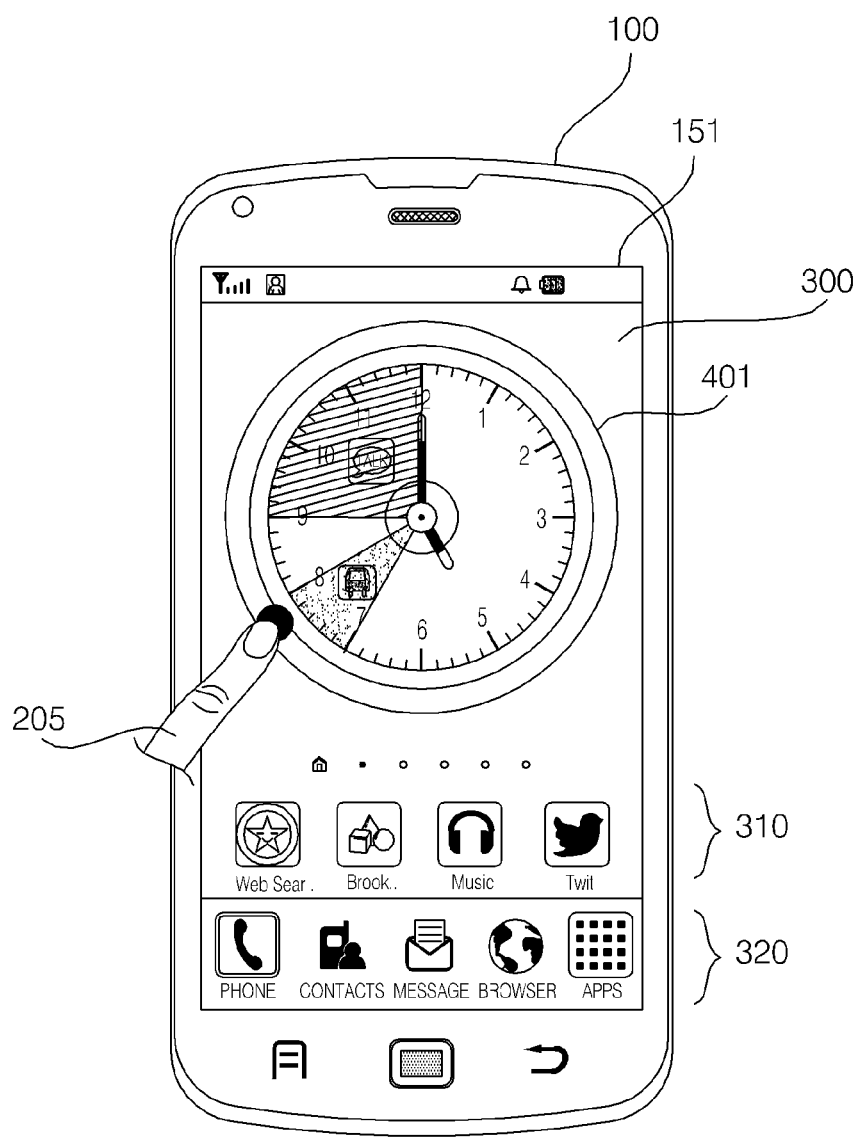
FIGS. 5A to 18D are reference views illustrating various examples of a method for operating a mobile terminal according to an embodiment of the present invention.

First, FIG. 5A illustrates that a home screen 300 including a watch object 401 is displayed on the display unit 151.

The home screen 300 may include the watch object 401 as a widget, an application list 310, and a preferred application list 320.

The watch object 401 is similar to the watch object 400 as described above in FIG. 1, but differs in terms of size.

As described above, the watch object 401 may include the first region 420a and the second region 410a, each of which is associated with at least one of schedule information and an application, the hour hand, the minute hand, and the day and night object that represents daytime and nighttime.

The controller 180 may control the home screen 300 such that the watch object 401, the application list 310, and the preferred application list 320 are displayed in the home screen 300.

When the user touches the first region (a region between 7:00 and 8:00) or the second region (a region between 9:00 and 12:00) of the watch object 401 with the user's finger 205, the controller 180 may control display of corresponding schedule information.

When a current time reaches a specific time (7:00 or 9:00), the controller 180 may automatically execute an application item, linked to the first region or the second region, and display an executed application screen on the display unit 151.

The controller 180 may display the watch object 401 such that a plurality of regions, each of which is associated with at least one of schedule information and an application, is distinguished from the other regions. This may assist the user in simply and rapidly checking schedule information or in executing a corresponding application.

Figure 5B:
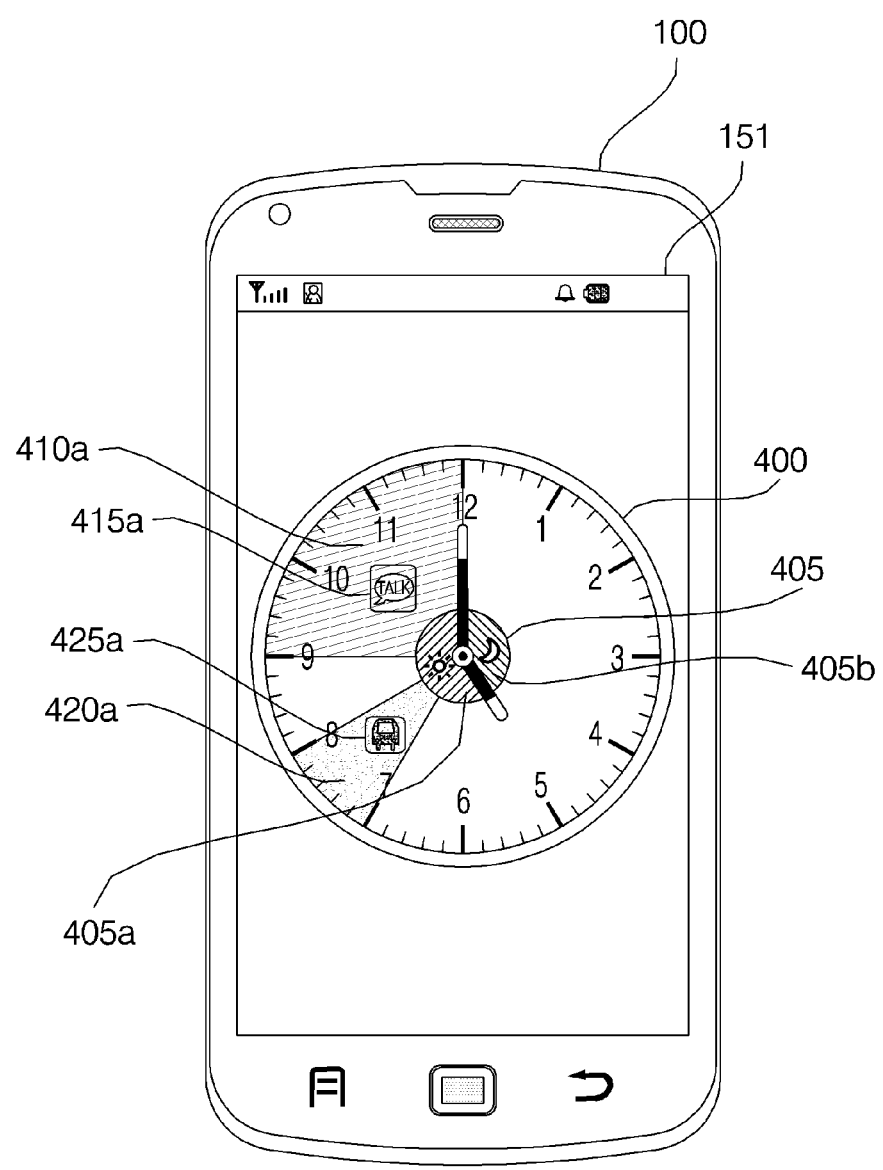

Next, FIG. 5B illustrates that the watch object 400 is displayed on the display unit 151.

The controller 180 may control the watch object 400 so as to be displayed as a lock screen or a standby screen.

The controller 180 may control the first region 420a and the second region 410a, which are associated respectively with different pieces of schedule information or different application items, so as to be distinguished by, for example, different colors and brightnesses.

In a state in which the watch object 400 is displayed as a lock screen or a standby screen, when the user touches the first region 420a (a region between 7:00 and 8:00) or the second region 410a (a region between 9:00 and 12:00) of the watch object 400 with the finger 205, the controller 180 may control display of corresponding schedule information.

On the other hand, when a current time reaches a specific time (7:00 or 9:00) in a state in which the watch object 400 is displayed as a lock screen or a standby screen, the controller 180 may automatically execute an application item, linked to the first region 420a or the second region 410a, and control to display an executed application screen on the display unit 151.

Meanwhile, in a state in which the watch object 400 is displayed as a lock screen, when there is an input for selecting at least one of numbers (1 to 12) in the watch object 400 in order to release the lock screen, the controller 180 may control the lock screen so as to be released and the home screen 300 so as to be displayed as exemplarily illustrated in FIG. 5A.

On the other hand, in a state in which the watch object 400 is displayed as a lock screen, when the user touches a region except for the watch object 400 in order to release the lock screen, the controller 180 may control display of a screen for unlocking. For example, in the case of unlocking using numbers, the controller 180 may control display of a number input window. In another example, in the case of unlocking via facial recognition, the controller 180 may control a camera so as to be operated and a display window for displaying an image captured by the camera so as to be displayed.

Figure 6A:
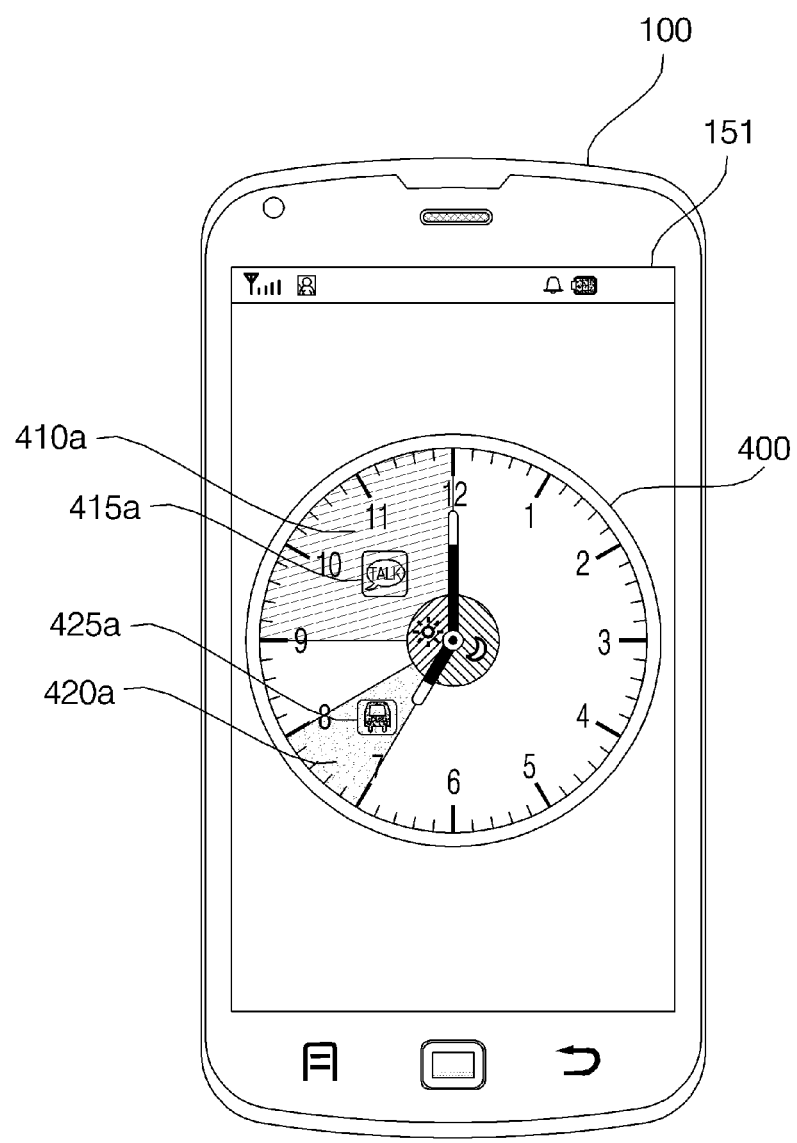

Next, FIG. 6A illustrates the case where time has passed as compared to FIG. 5B and a time indicated in the watch object 400 reaches 7:00 corresponding to a start point of the first region 420a.

In a state in which the watch object 400 is displayed as a lock screen or a standby screen, the controller 180 may control output of an alarm message via vibration when a current time reaches a specific time (seven o'clock) corresponding to the first region 420a.

Figure 6B:
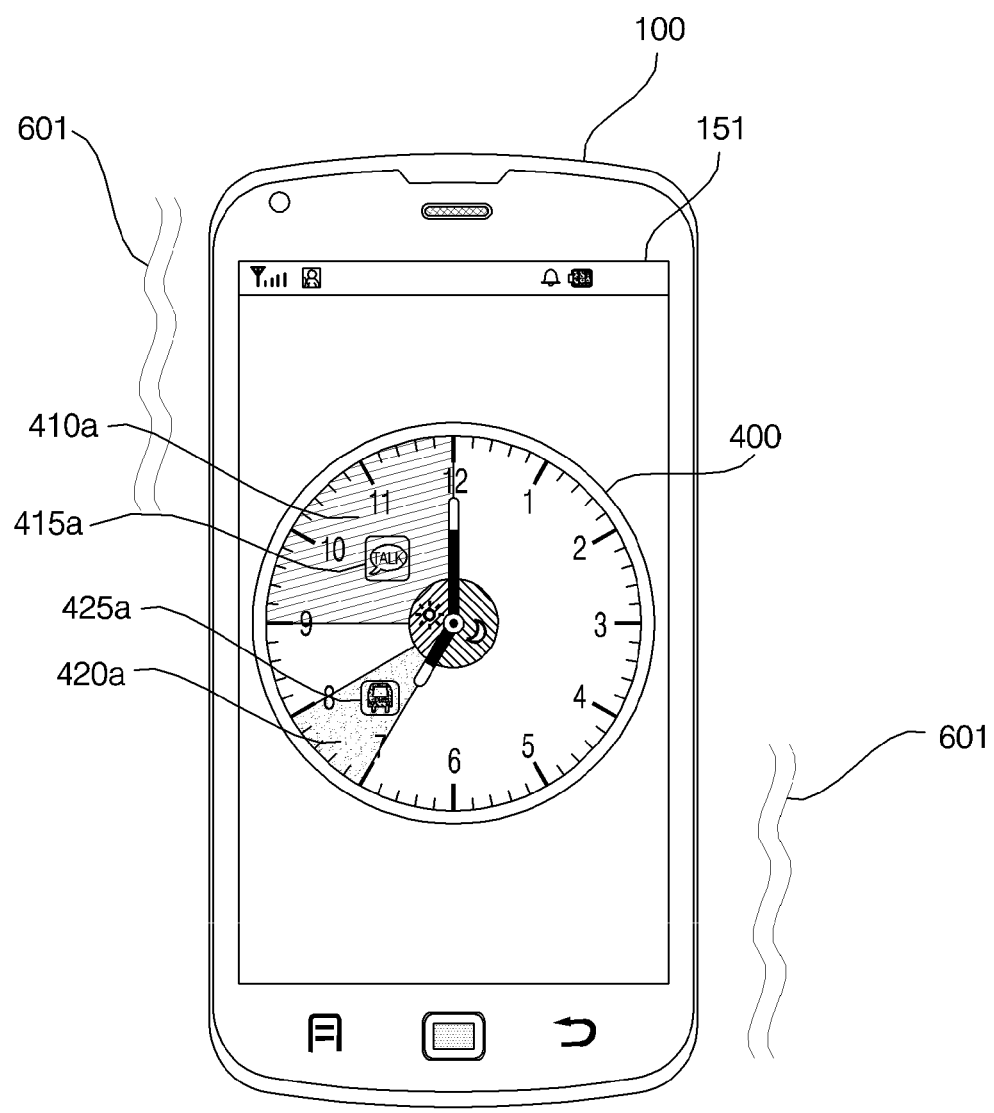

FIG. 6B illustrates output of vibration 601.

Meanwhile, when a current time reaches a specific time (7:00) corresponding to the first region 420a in a state in which the watch object 400 is displayed as a lock screen or a standby screen, the controller 180 may control an application, corresponding to the first region 420a, so as to be displayed and a shortened message, indicating the executed application, so as to be displayed while outputting an alarm message via vibration.

In particular, the controller 180 may control the shortened message so as to overlap with and be displayed at the first region 420a.

Figure 6C:
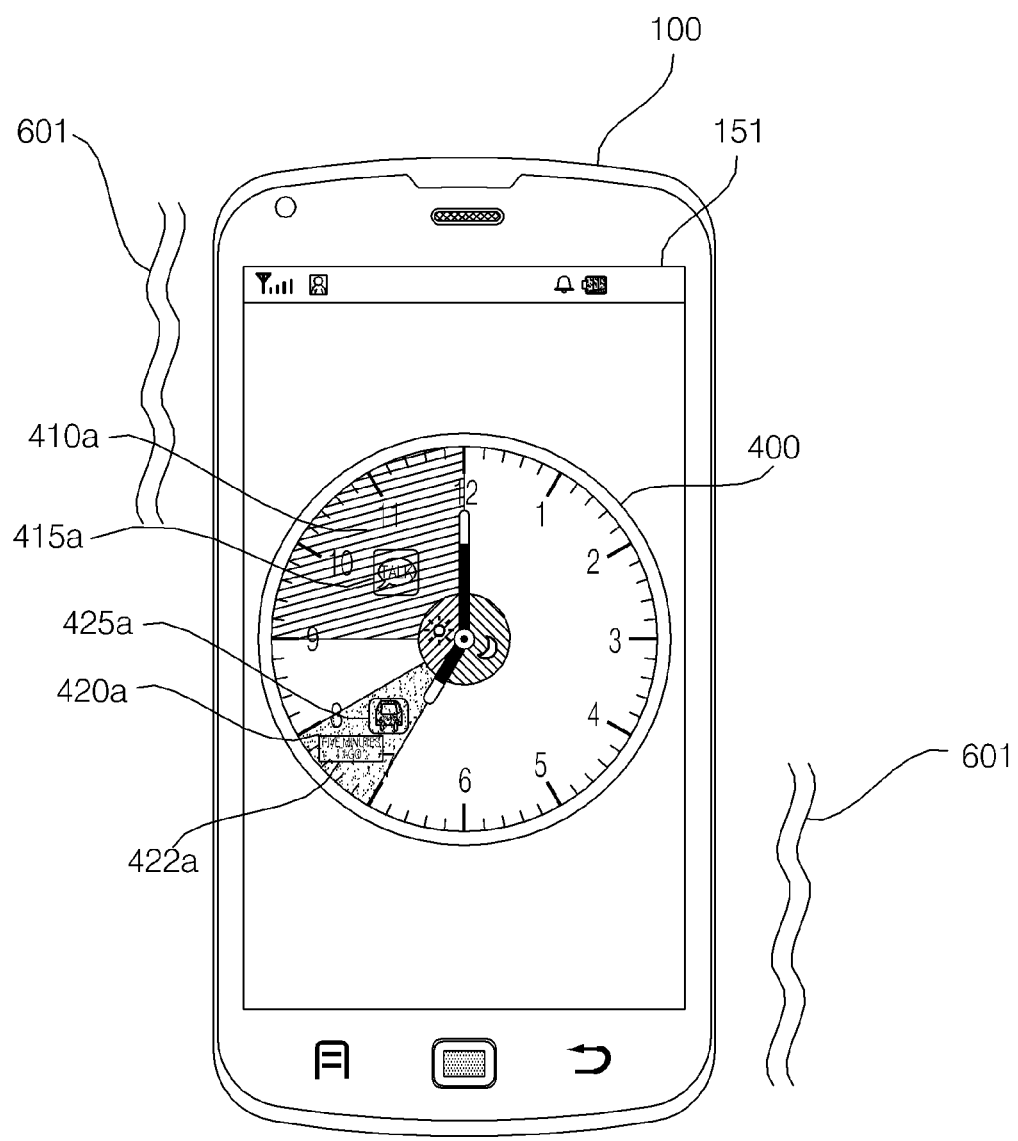

FIG. 6C illustrates the case where the first application item 425a corresponding to the first region 420a is executed and a message 422a related to a bus arrival time such as "five minutes ago" is displayed as a first application is executed. As a result, the user can directly check a current time and a message related to an application corresponding to the current time while viewing the watch object 400.

Meanwhile, when a current time reaches a specific time (7:00) corresponding to the first region 420a in a state in which the watch object 400 is displayed as a lock screen or a standby screen, the controller 180 may control the first application, corresponding to the first region 420a, so as to be executed and a first application screen so as to be displayed.

Figure 6D:
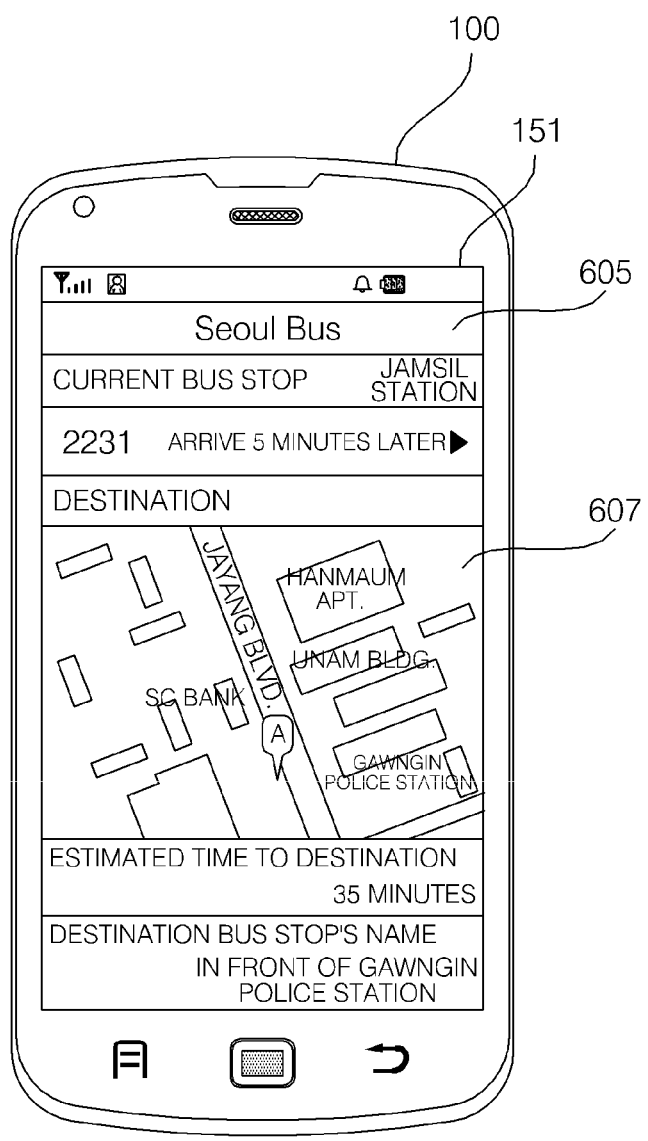

FIG. 6D illustrates the case where a traffic related application corresponding to the first application item 425a is executed and an application screen 605 is displayed.

The application screen 605 may include, for example, an estimated bus arrival time, current position information, bus number information, and a map image 607.

In a state in which the watch object 400 is displayed as a lock screen or a standby screen, when a current time is a time after the first region 420a, the controller 180 may control the first region 420a so as to disappear. Alternatively, the controller 180 may control a first region so as to be distinguished from that in the case where a current time is a time before the first region 420a.

Figure 6E:
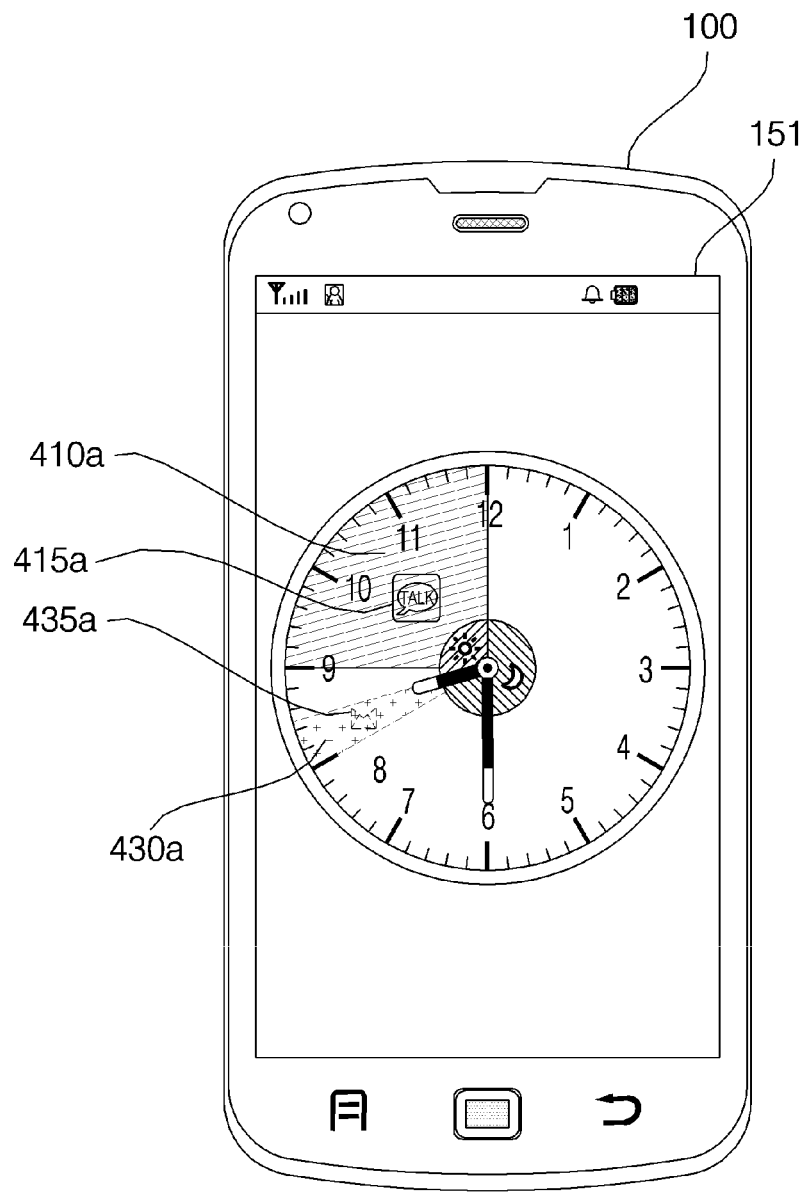

Next, FIG. 6E illustrates that time has passed as compared to FIG. 6B and a time indicated in the watch object 400 reaches 8:30 that is later than an end point of the first region 420a.

As exemplarily illustrated in FIG. 6E, since the current time (8:30) is later than a first region 430a (a region between 7:00 and 8:00), the first region 430a is displayed at a lower brightness or a lighter hue as compared to FIG. 6B so as to be distinguished from that in FIG. 6B.

That is, the first region 430a and a first application item 435a of FIG. 6E may be displayed differently from the first region 420a and the first application item 425a of FIG. 6B.

When a current time reaches a specific time (9:00) corresponding to the second region 410a in a state in which the watch object 400 is displayed as a lock screen or a standby screen, the controller 180 may control output of an alarm message via vibration 601.

Figure 6F:
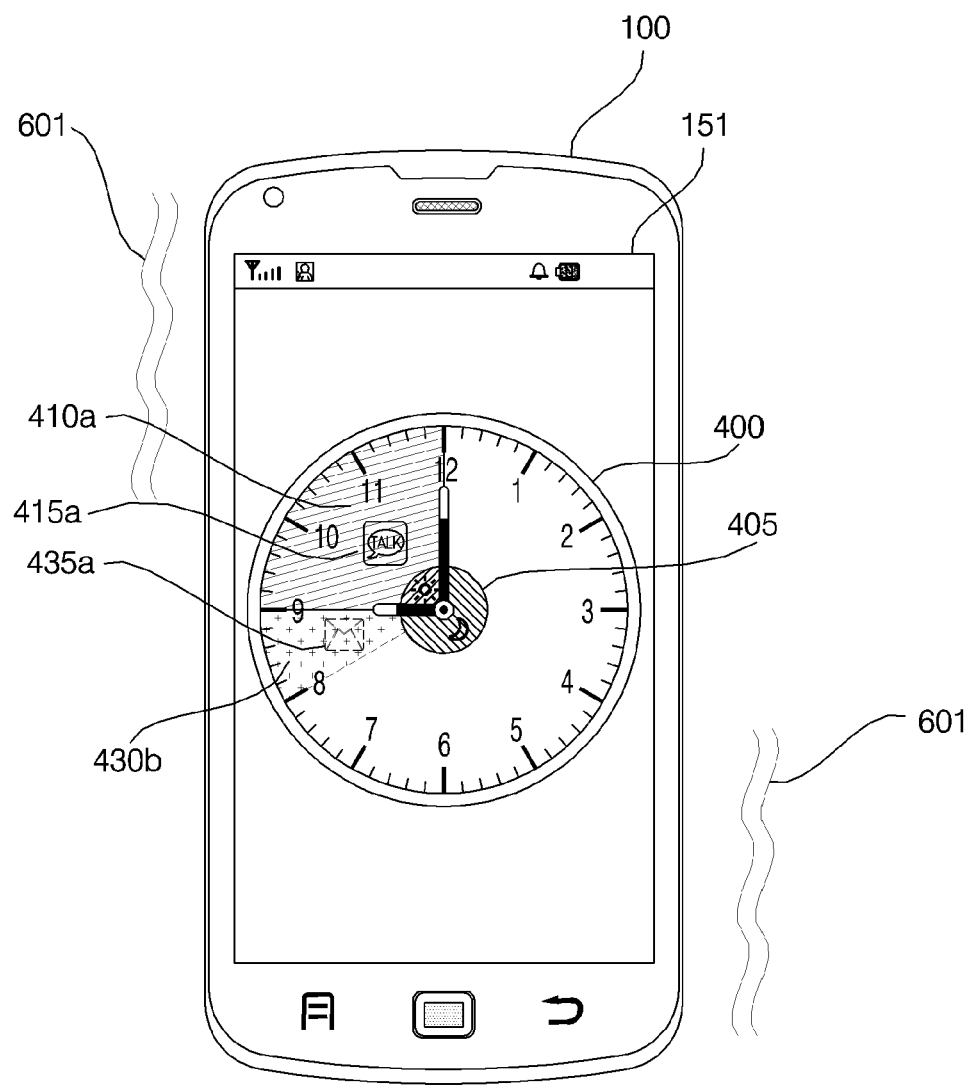

FIG. 6F illustrates that time has passed as compared to FIG. 6E and vibration 601 is output when a time indicated in the watch object 400 reaches 9:00 corresponding to a start point of the second region 410a.

Meanwhile, when a current time reaches a specific time (9:00) corresponding to the second region 410a in a state in which the watch object 400 is displayed as a lock screen or a standby screen, the controller 180 may control a second application, corresponding to the second region 410a, so as to be executed and a second application screen so as to be displayed.

Figure 6G:
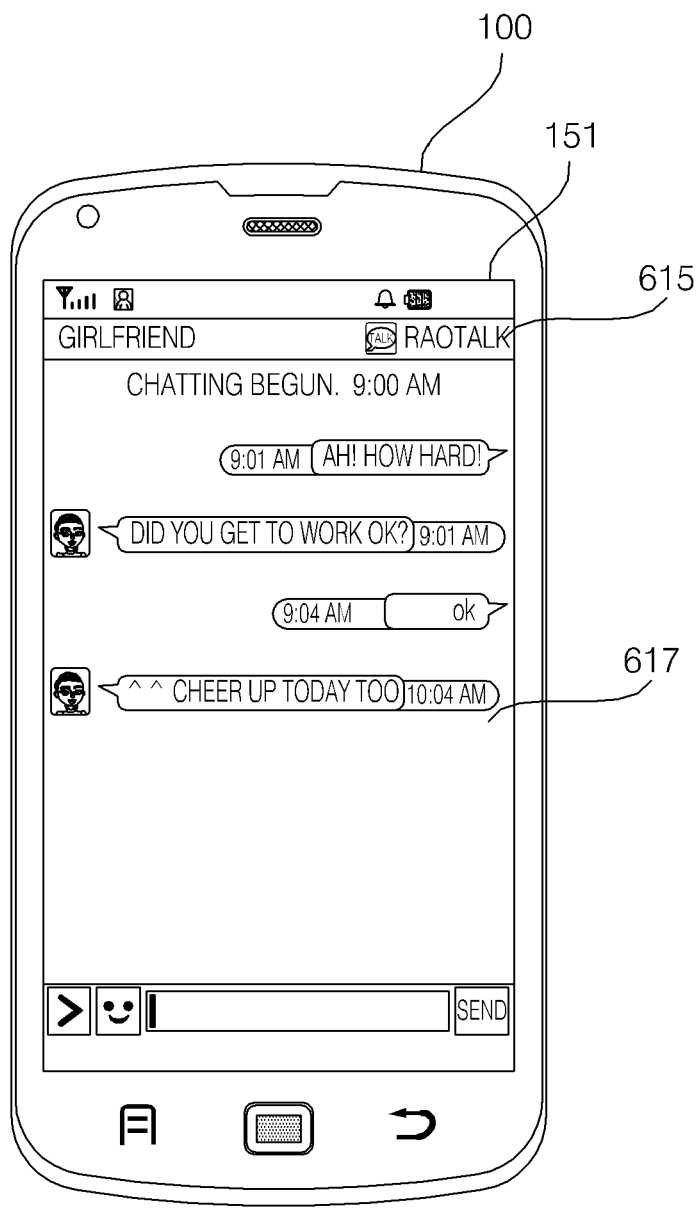

FIG. 6G illustrates that an SNS related application corresponding to the second application item 415a is executed and an application screen 615 is displayed.

The application screen 615 may include a conversation window 617.

In a state in which the watch object 400 is displayed as a lock screen or a standby screen, when a current time is a time later than a portion of the second region 410a, the controller 180 may control the corresponding portion so as to be distinguished from FIG. 6F.

For example, in a state in which a third region 430c is present between 8:00 PM to 10:00 PM, when a current time is a time later than a portion of the second region 410a, the controller 180 may control the third region 430c so as to be displayed in the watch object 400.

That is, the controller 180 may control a region related to a next schedule or application item so as to be successively displayed according to the lapse of time.

Figure 6H:
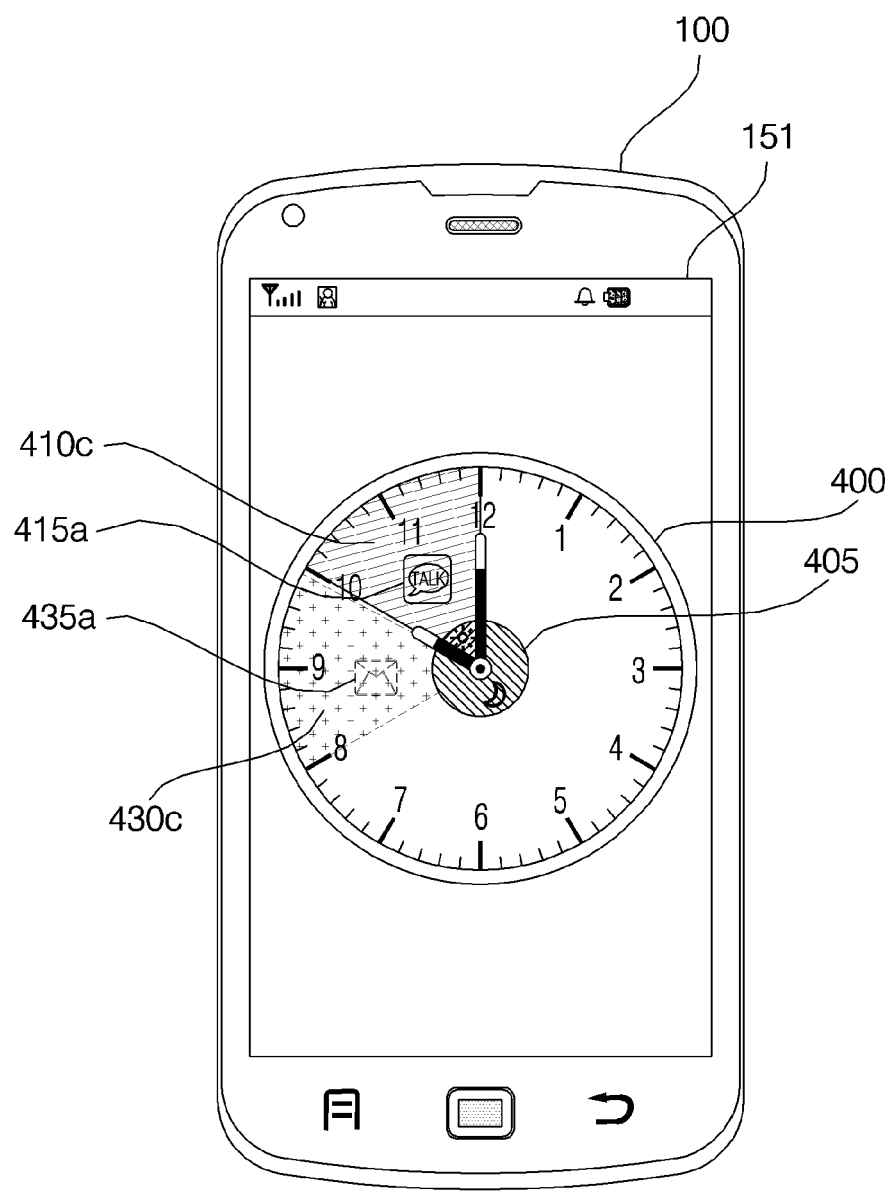

FIG. 6H illustrates that, based on a current time (10:00), a second region 410c is reduced in size and the newly added third region 430c is displayed.

The third region 430c is a region between 8:00 and 10:00 and may be related to a schedule or an application item between 8:00 PM and 10:00 PM. FIG. 6H illustrates that a third application item 435a is displayed in the third region 430c.

Meanwhile, in a state in which the watch object 400 is displayed as a lock screen or a standby screen, when a current time is an end point of the second region 410a, the controller 180 may control the second region 410a so as to disappear.

Meanwhile, the controller 180 may control a fourth region 440a, related to a next schedule or application item, so as to be displayed at a position where the second region was displayed.

Figure 6I:
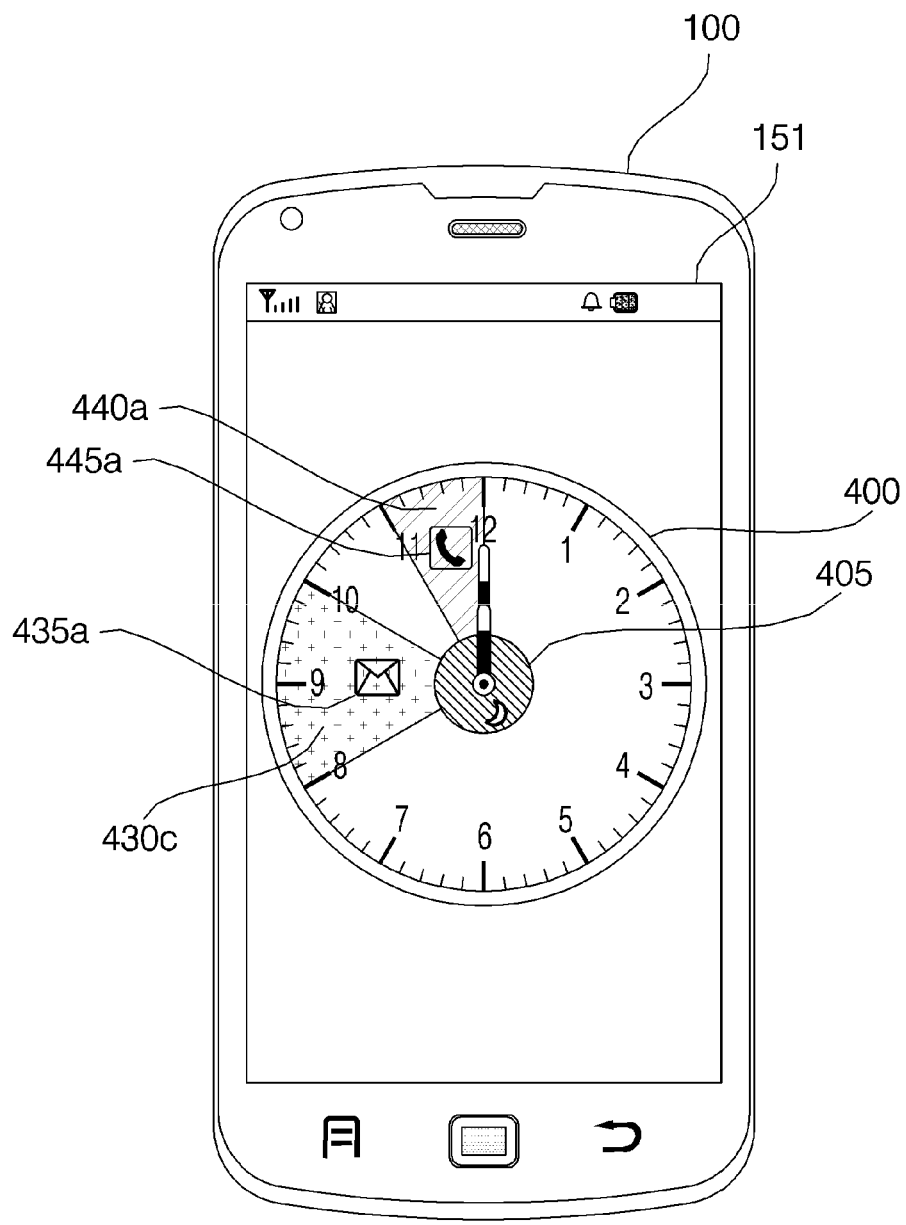

FIG. 6I illustrates that, based on a current time (12:00), the second region disappears and the third region 430c and the newly added fourth region 440a are displayed at a position where the second region was displayed.

The fourth region 440a is a region between 11:00 PM to 12:00 PM and may include a fourth application item 445a.

When a current time reaches a specific time (11:00 PM) corresponding to the fourth region 440a in a state in which the watch object 400 is displayed as a lock screen or a standby screen, the controller 180 may control an alarm message Si so as to be output via vibration Si.

Figure 6J:
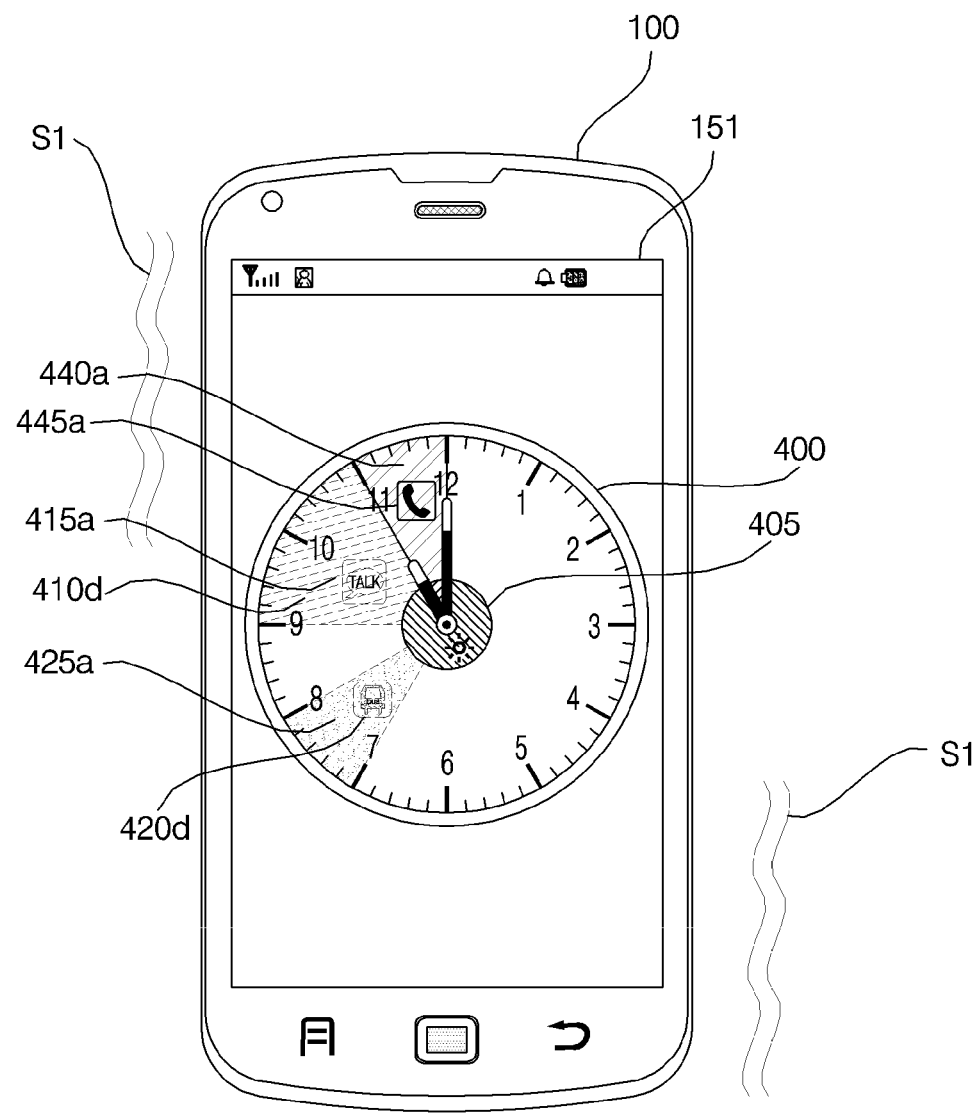

FIG. 6J illustrates that, based on a current time (11:00 PM), the vibration message Si related to the fourth region 440a is output in a state in which a third region disappears and a first region 420d and a second region 410d are displayed.

Meanwhile, when a current time reaches a specific time (11:00 PM) corresponding to the fourth region 440a in a state in which the watch object 400 is displayed as a lock screen or a standby screen, the controller 180 may control a fourth application, corresponding to the fourth region 440a, so as to be executed and a fourth application screen so as to be displayed.

Figure 6K:
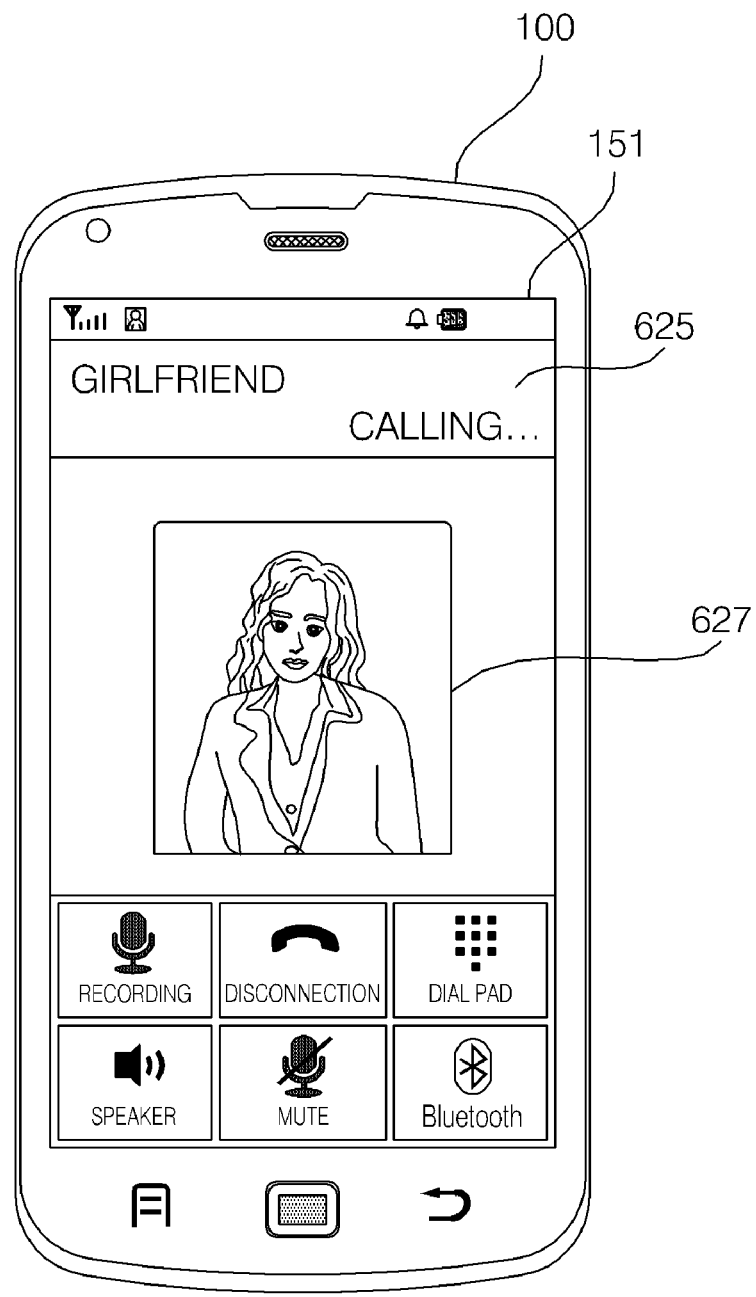

FIG. 6K illustrates that a phone call application as the fourth application is executed and a phone call application screen 625 is displayed. The phone call application screen 625 may include an image 627 of the other party.

Meanwhile, although FIGS. 6A to 6K illustrate that a related application is automatically or manually executed at a reserved time, various other alterations are possible.

In a state in which both schedule information and an application are reserved and stored in a prescribed time region of the watch object 400, when a current time reaches a start point of the time region, the controller 180 may automatically display schedule information in a pop-up window. On the other hand, when there is a touch input to a prescribed time region of the watch object 400, the controller 180 may execute a corresponding application.

Alternatively, in a state in which both schedule information and an application are reserved and stored in a prescribed time region of the watch object 400, when there is a short touch input to the prescribed time region, the controller 180 may execute a corresponding application. When there is a long touch input to the prescribed time region, the controller 180 may display a sub menu related to the corresponding time region. Then, when a schedule information view item of the sub menu is selected, the controller 180 may display schedule information reserved in a corresponding time zone.

Figure 7A:
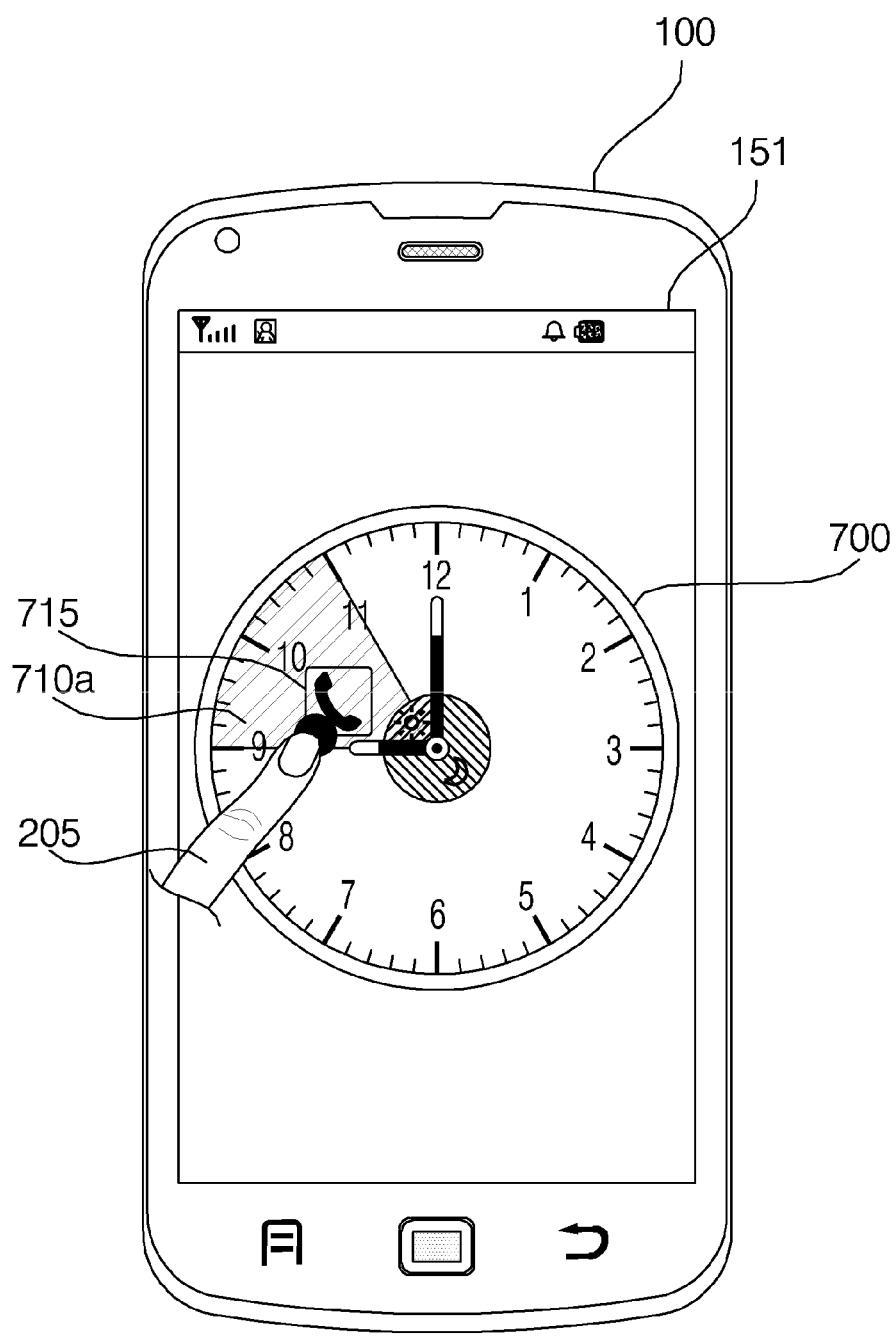

FIG. 7A illustrates another exemplary watch object 700.

Referring to FIG. 7A, the watch object 700 may be displayed alone on the display unit 151 without other objects and include a region 710a between 9:00 and 11:00, and the region 710a between 9:00 and 11:00 may include a phone call application item 715 related to a corresponding time region.

In addition to the region 710a, the watch object 700 may further include an hour hand, a minute hand, and a day and night object that represents daytime and nighttime.

Figure 7B:
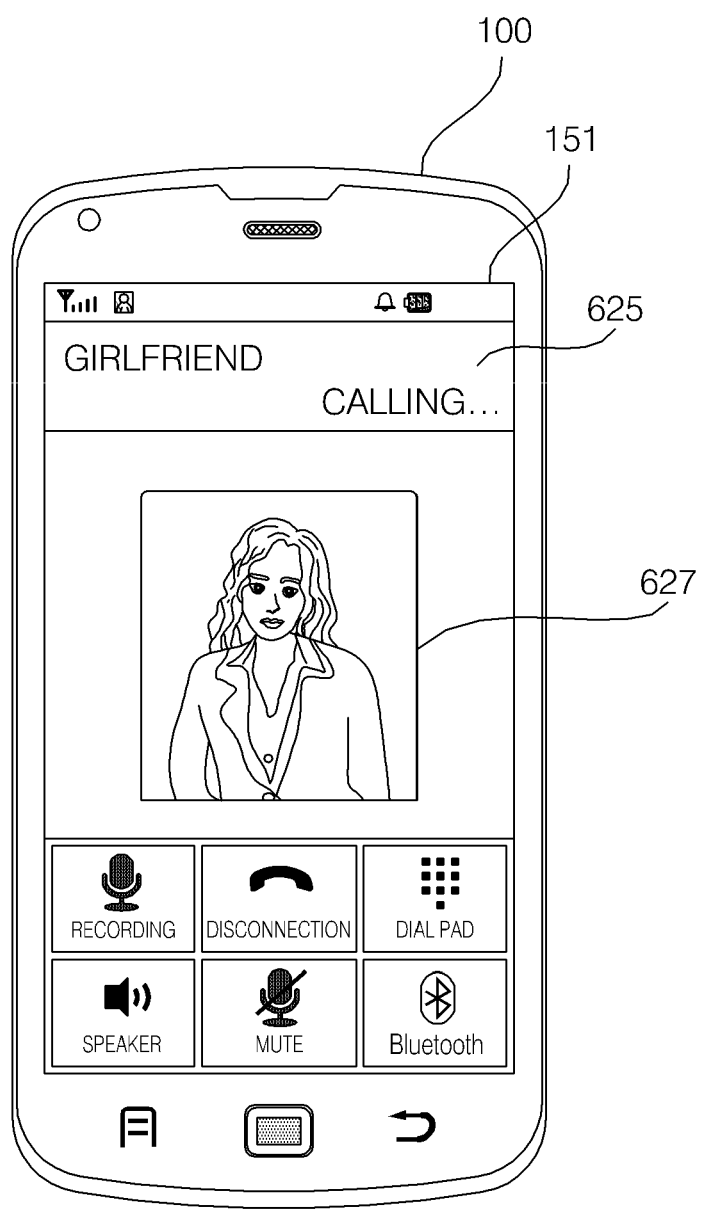

FIG. 7B illustrates that, when the user's finger 205 inputs a short touch to the region 710a or the phone call application item 715, a phone call application is executed and a phone call application screen 625 is displayed. The phone call application screen 625 may include an image 627 of the other party.

Figure 8A:
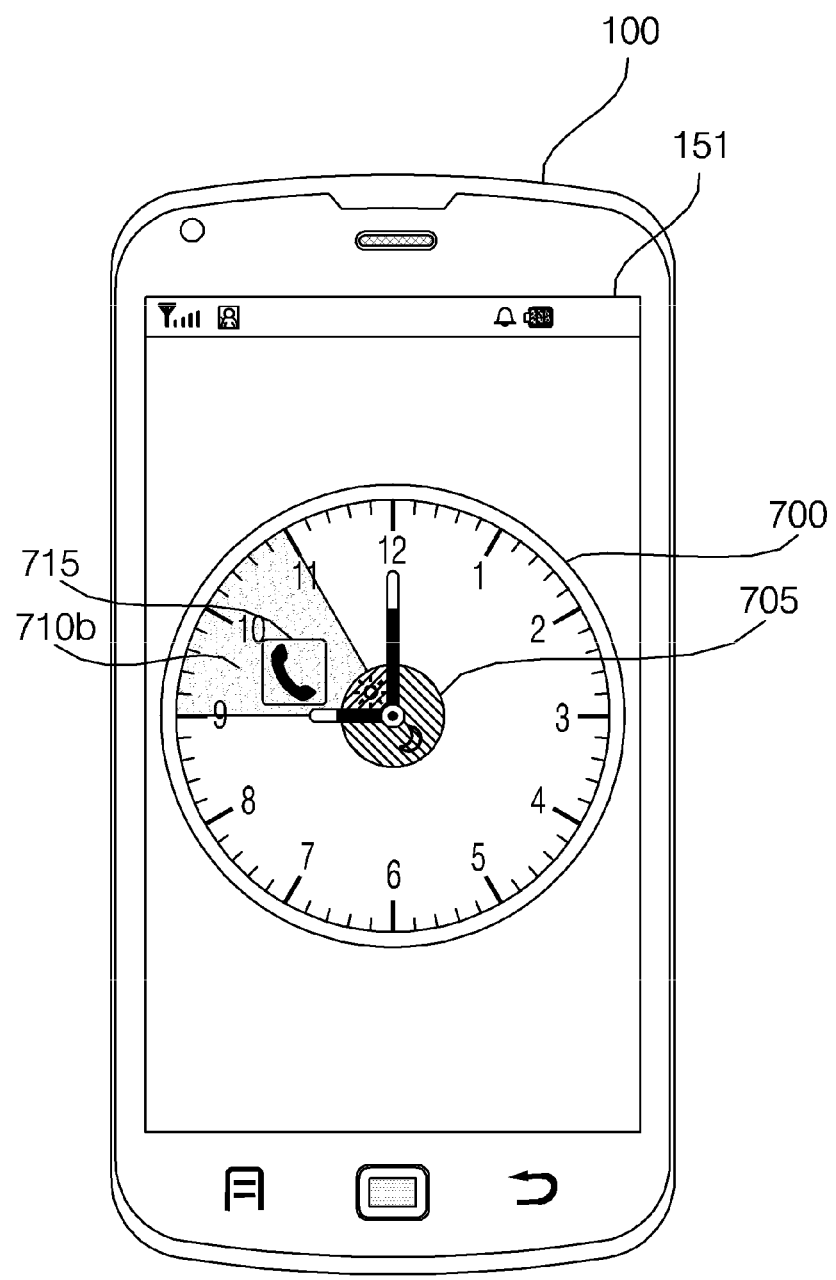

FIG. 8A illustrates a watch object 700 similar to that of FIG. 7A.

Referring to FIG. 8A, the watch object 700 may be displayed as a full screen on the display unit 151 and include a region 710b between 9:00 and 11:00 and the region 710b between 9:00 and 11:00 may include a phone call application item 715 related to a corresponding time region.

In addition to the region 710b, the watch object 700 may further include an hour hand, a minute hand, and a day and night object 705 that represents daytime and nighttime.

Figure 8B:
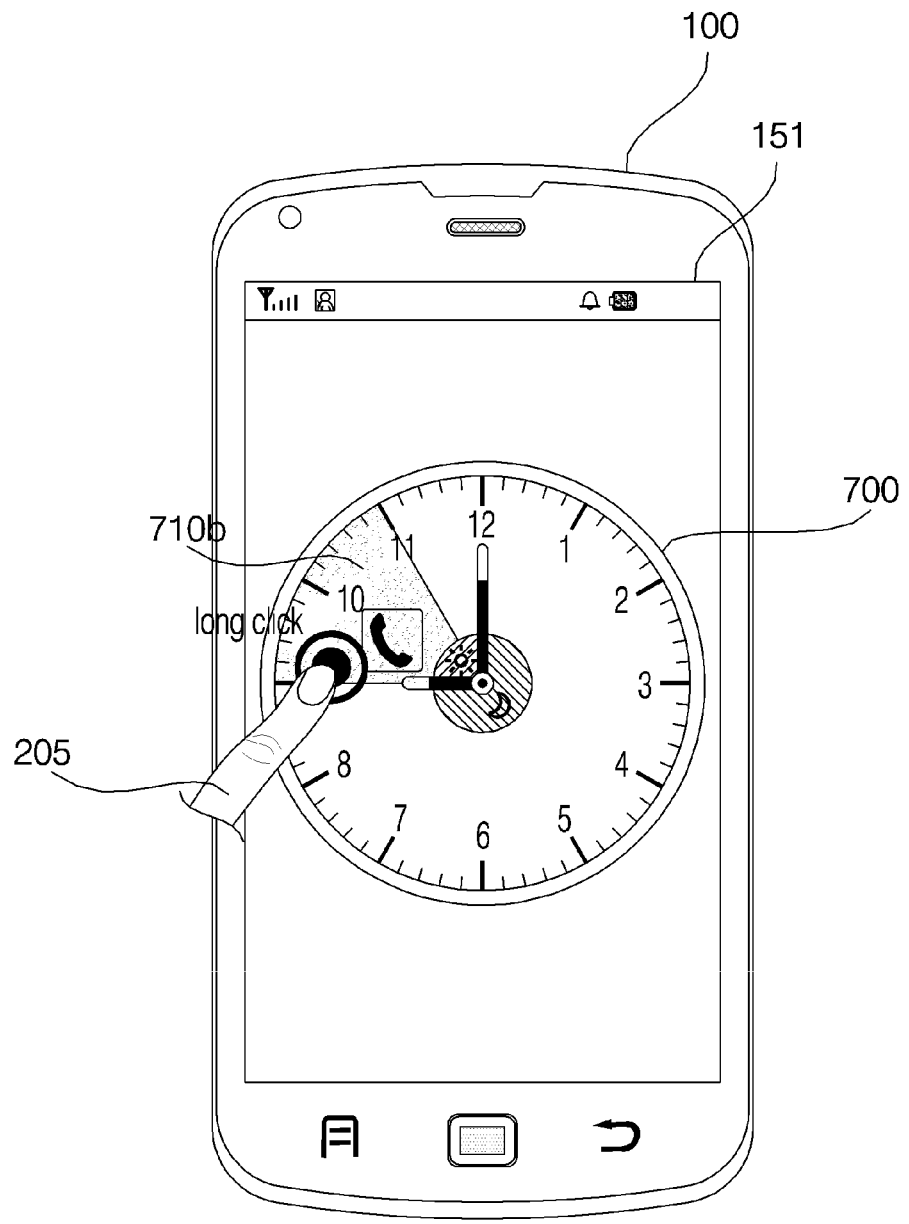

FIG. 8B illustrates the case where the user's finger 205 inputs a long touch to the region 710b or the phone call application item 715.

In response to the long touch input, the controller 180 may control display of a sub menu related to the region 710b.

Figure 8C:
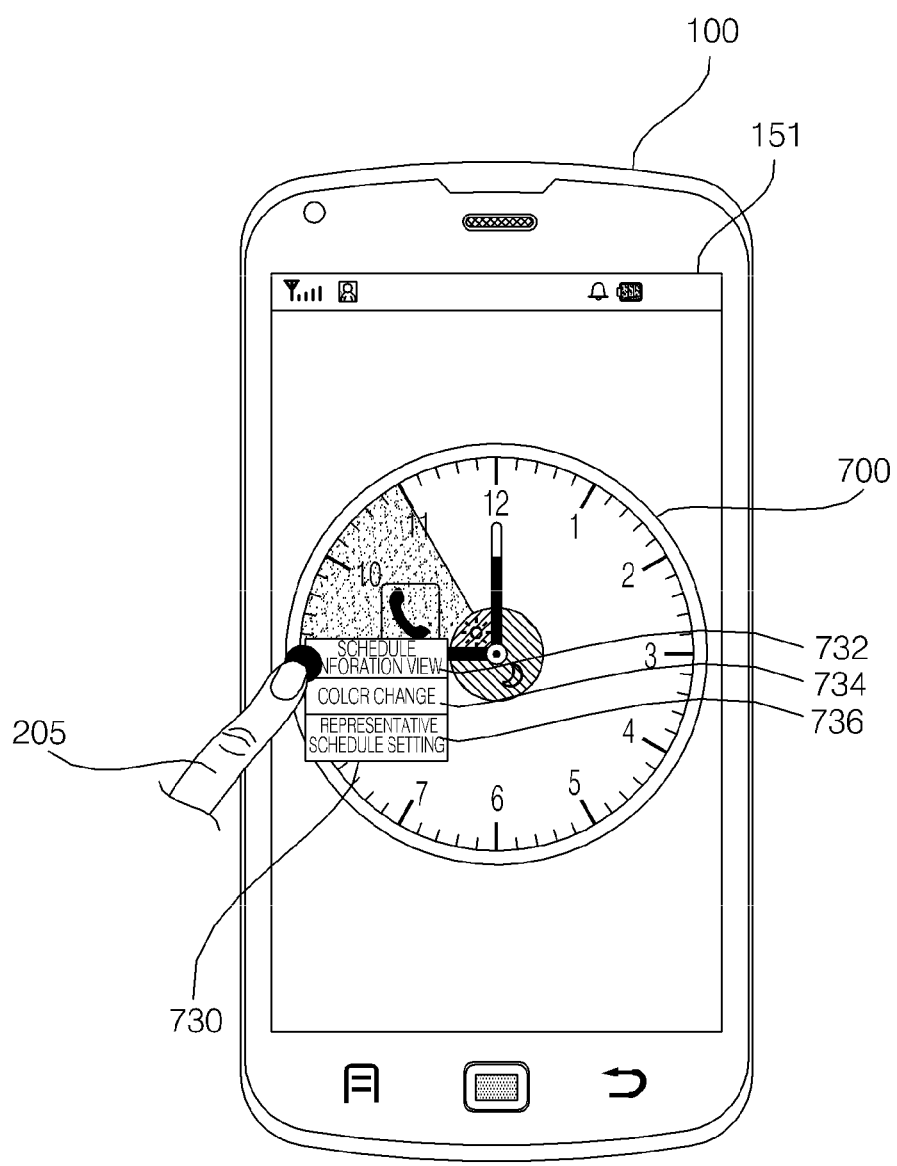

FIG. 8C illustrates display of a sub menu 730 related to the region 710b.

The sub menu 730 may include a schedule information view item 732 to view a schedule reserved in the region 710b, a color change item 734 to change color of the region 710b, and a representative schedule setting item 736 to set a representative schedule when there is a plurality of schedule information.

When the user's finger 205 selects the schedule information view item 732 of the sub menu 730, the controller 180 controls schedule information reserved in the region 710b so as to be displayed.

Figure 8D:
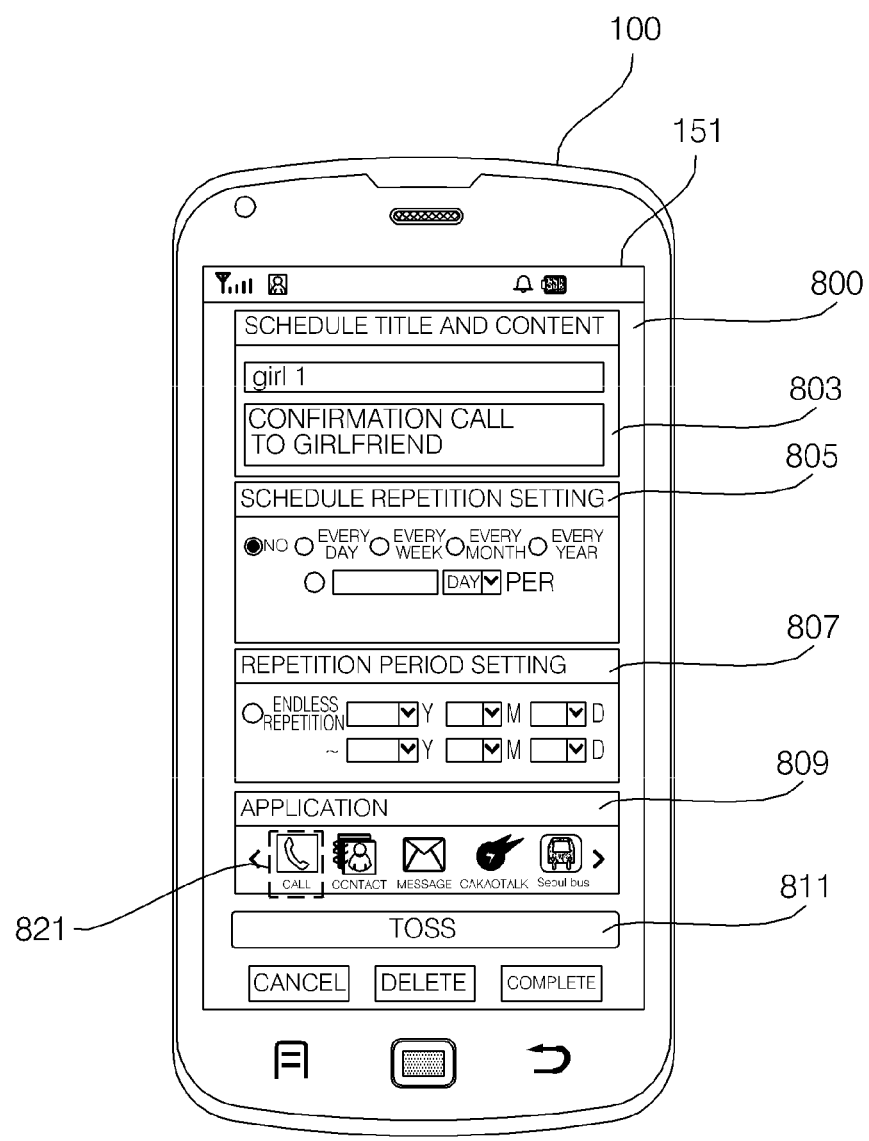

FIG. 8D illustrates that a schedule screen 800 including reserved schedule information is displayed.

The schedule screen 800 may include a schedule title and content item 803, a schedule repetition setting item 805, a repetition period setting item 807, an application list 809 including a phone call application item 821, and a toss item 811.

Schedule repetition setting may be performed via the schedule repetition setting item 805, and an application to be executed in the corresponding time region 710b may be set via selection of the application on the application list 809.

In addition, a schedule of the user of the mobile terminal 100 may be transmitted to other users via the toss item 811. In particular, schedule information related to the corresponding time region 710b may be transmitted to other users. In this way, the user can share their schedule information with others.

Meanwhile, in addition to the schedule information related to the corresponding time region 710b, related application item information may also be transmitted upon selection of the toss item 811. In this way, the user can share related application information as well as their schedule information with others.

For example, in the case where a shared application is a phone call application or an SNS application, a toss function enables automated execution of a corresponding application between different users. In this way, rapid execution of the related application between the users is possible.

Meanwhile, the user can receive schedule information, or both schedule information and application information from other users. Based on a user approval, the controller 180 may control schedule information or both schedule information and application information received from other users so as to be reflected in a corresponding time region of the watch object 700 thereof.

FIGS. 9A to 9E illustrate implementation of color change with respect to a prescribed time region.

Figure 9A:
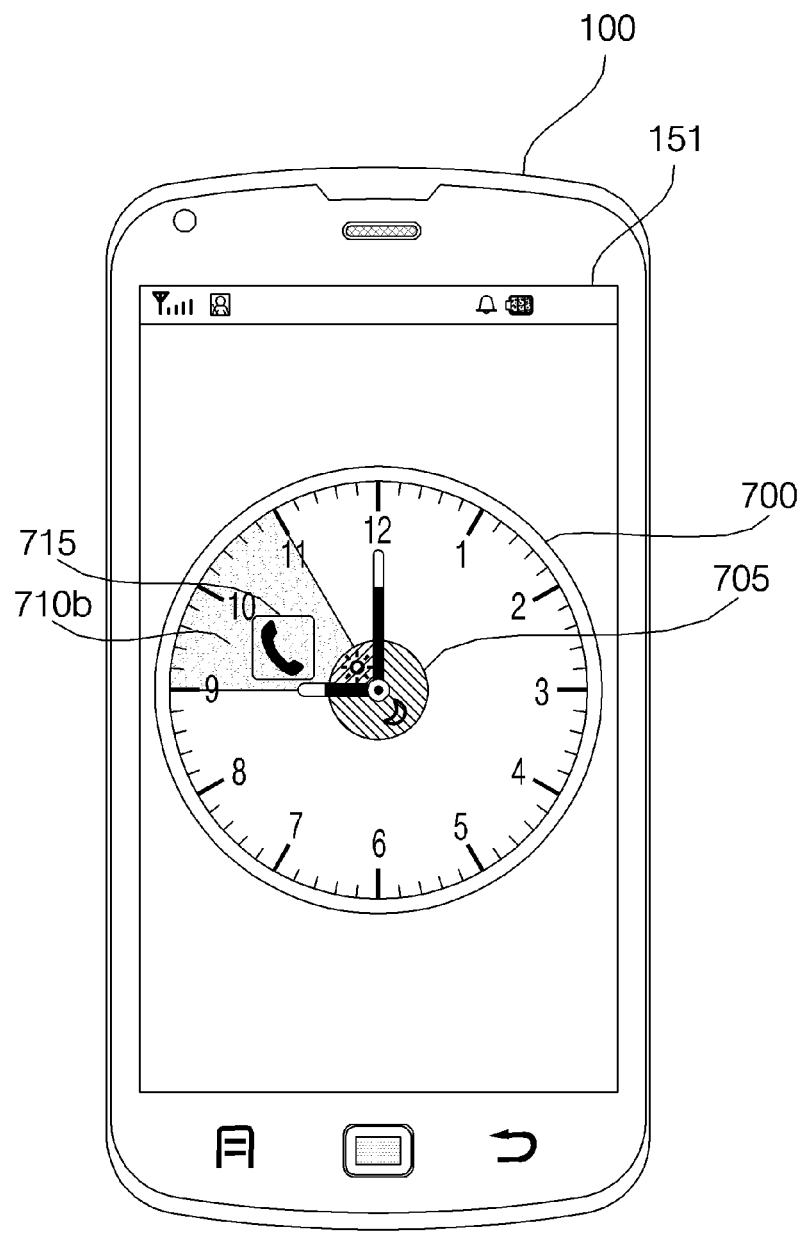
Figure 9B:
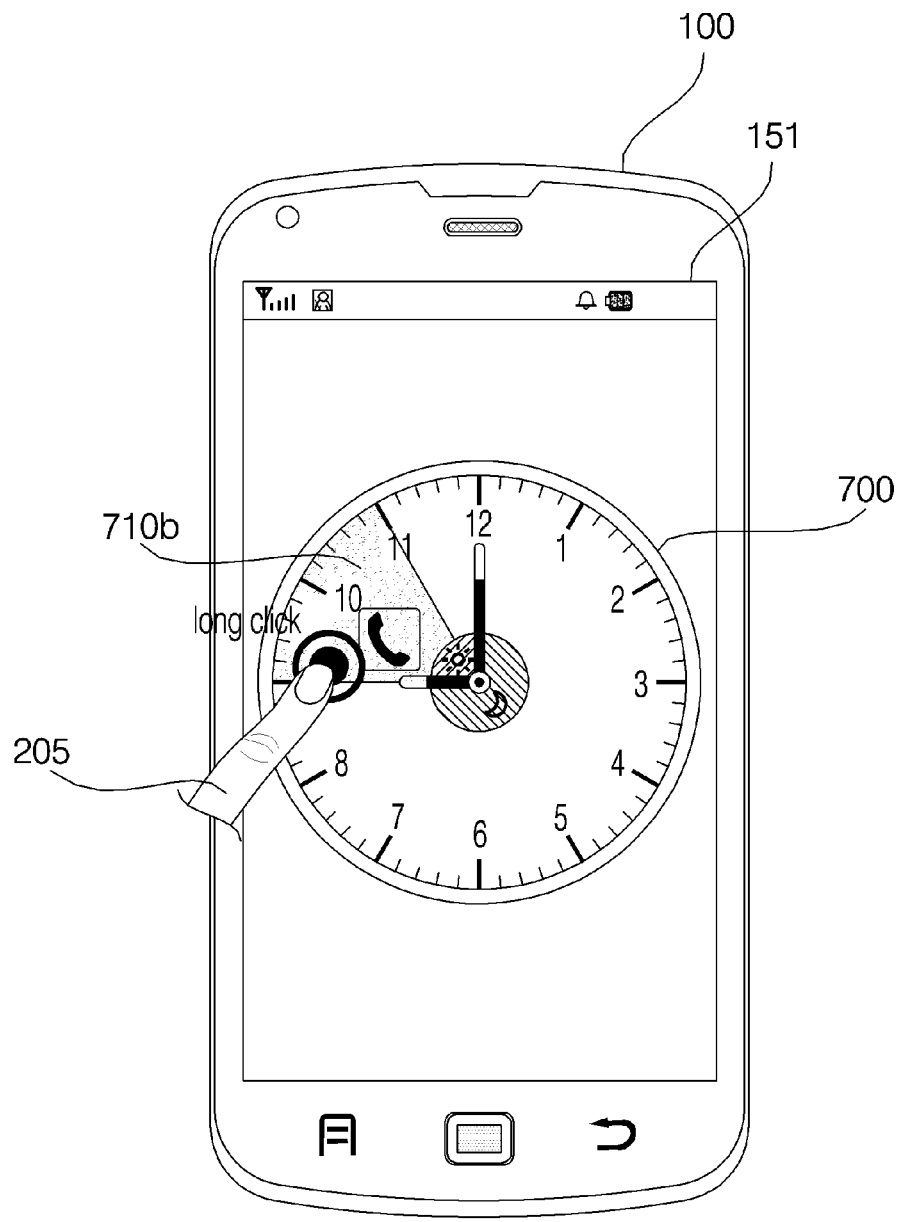

FIGS. 9A and 9B correspond to FIGS. 8A and 8B and, thus, a description thereof will be omitted herein.

Figure 9C:
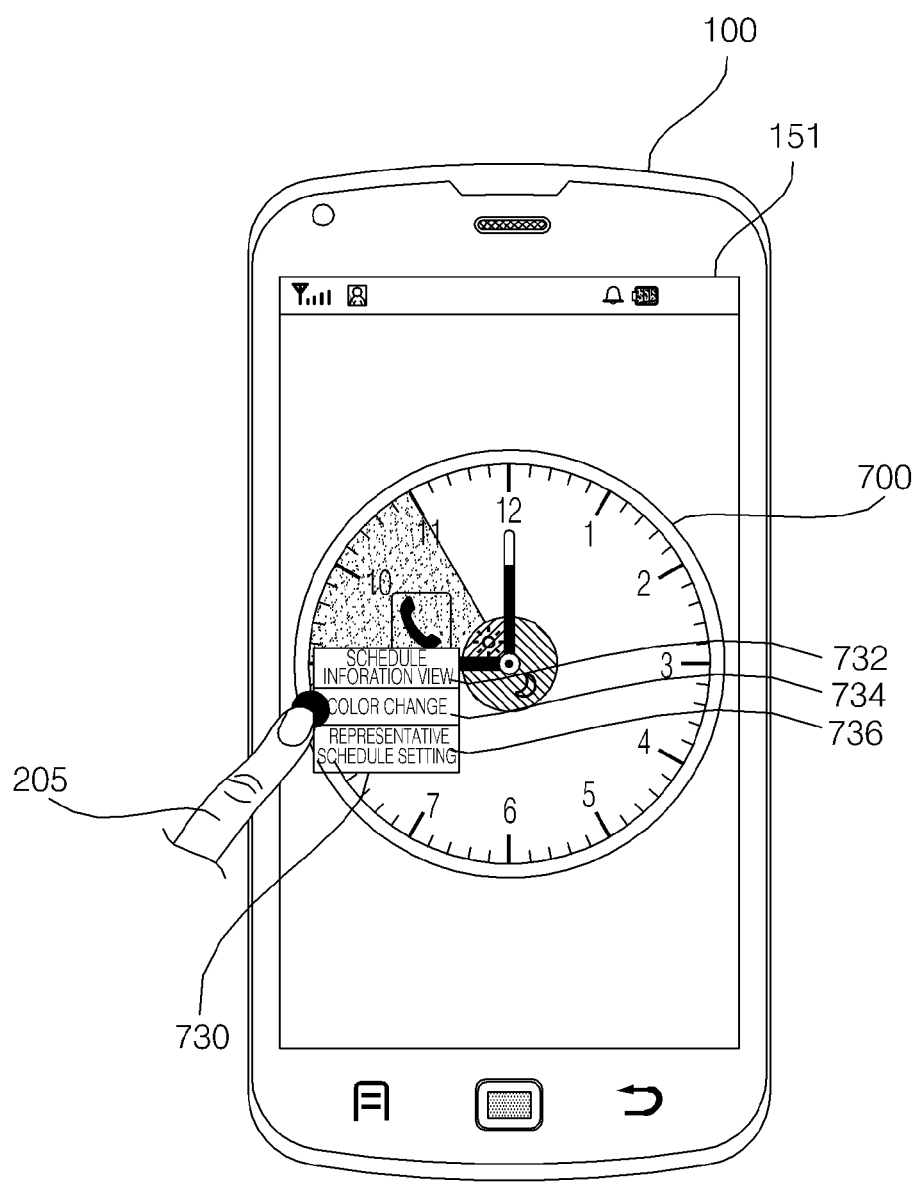

FIG. 9C illustrates that the sub menu 730 related to the region 710*b* is displayed in response to a long touch input.

When the user's finger 205 selects the color change item 734 among the items 732, 734 and 736 of the sub menu 730, the controller 180 controls the region 710*b* so as to be subjected to color change.

Figure 9D:
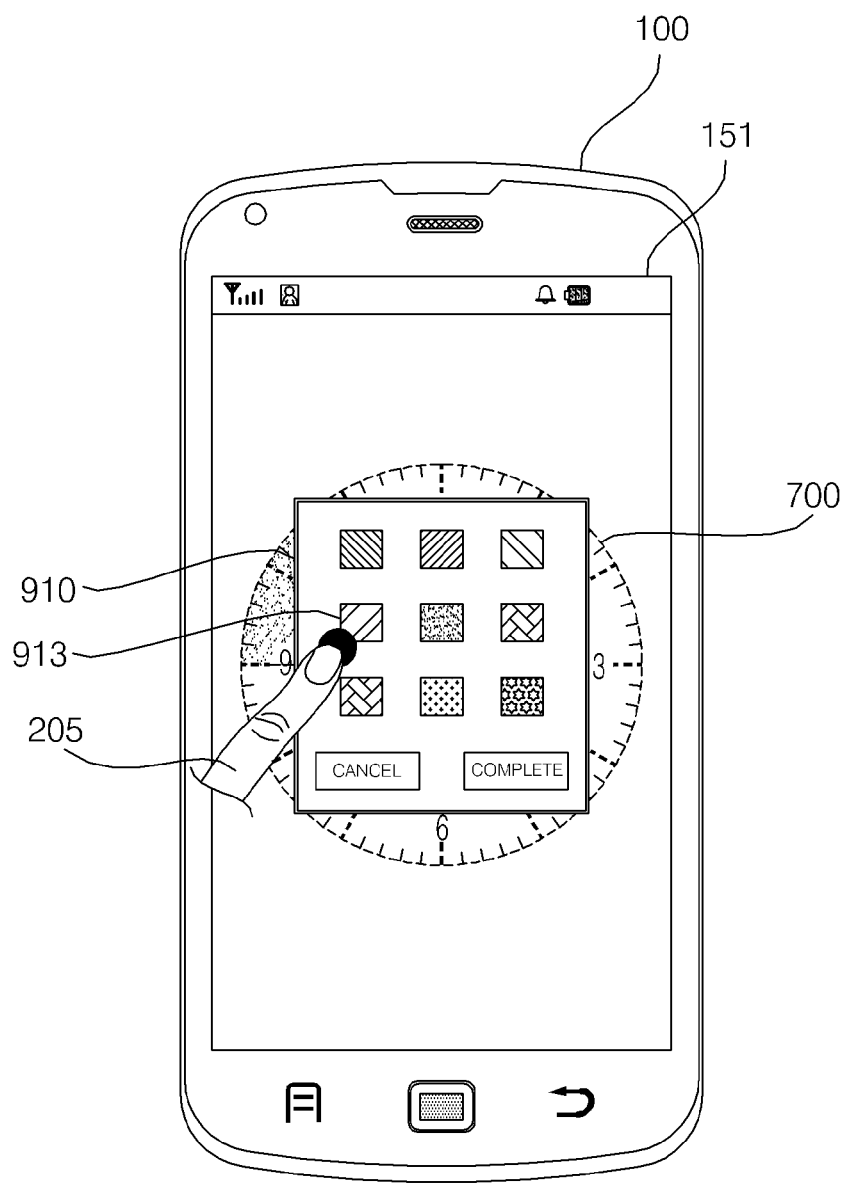

FIG. 9D illustrates that a color list 910 including a plurality of color items for color change is displayed on the watch object 700.

Figure 9E:
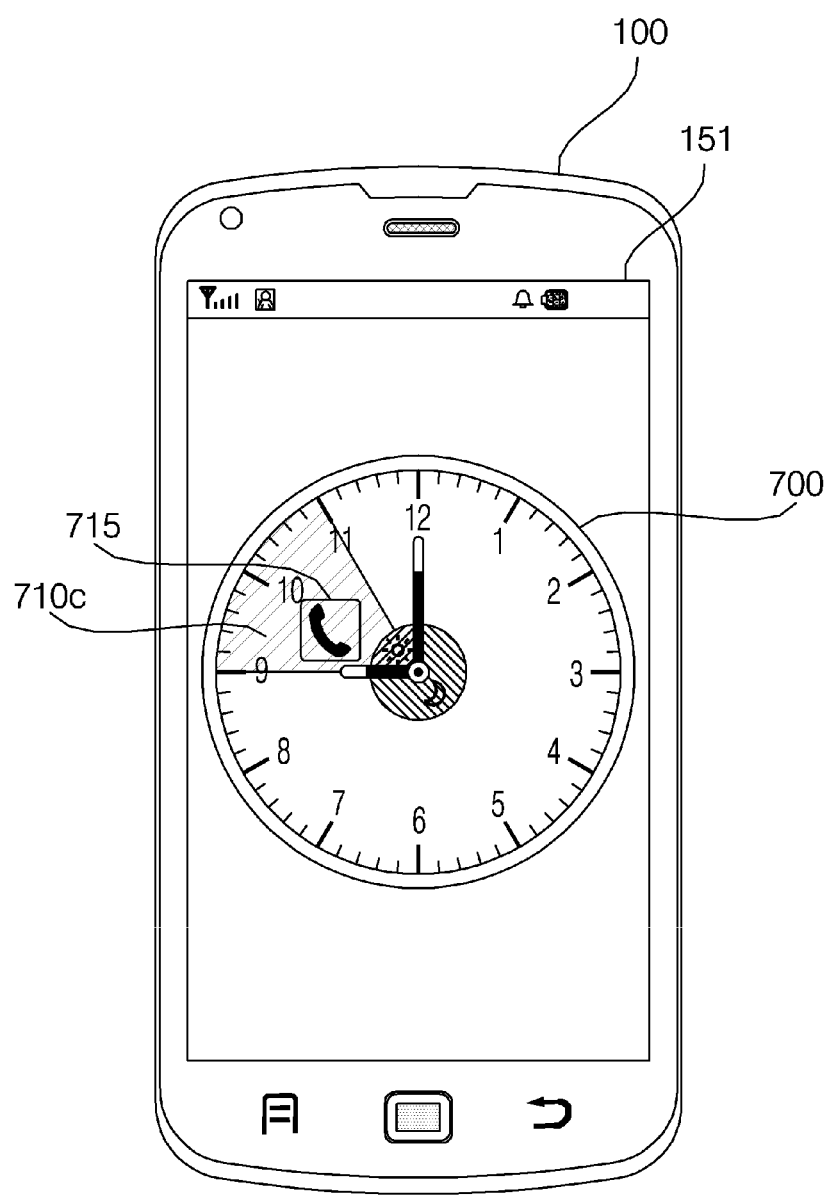

When the user's finger 205 selects any one color item 913 among the color items, the color of a region between 9:00 and 11:00 is changed as illustrated in FIG. 9E. As exemplarily illustrated in FIG. 9E, the color changed region 710*c* is distinguished from the region 710*b* of FIG. 9A.

Next, FIGS. 10A to 10F illustrate implementation of representative schedule setting with respect to a prescribed time region.

Figure 10A:
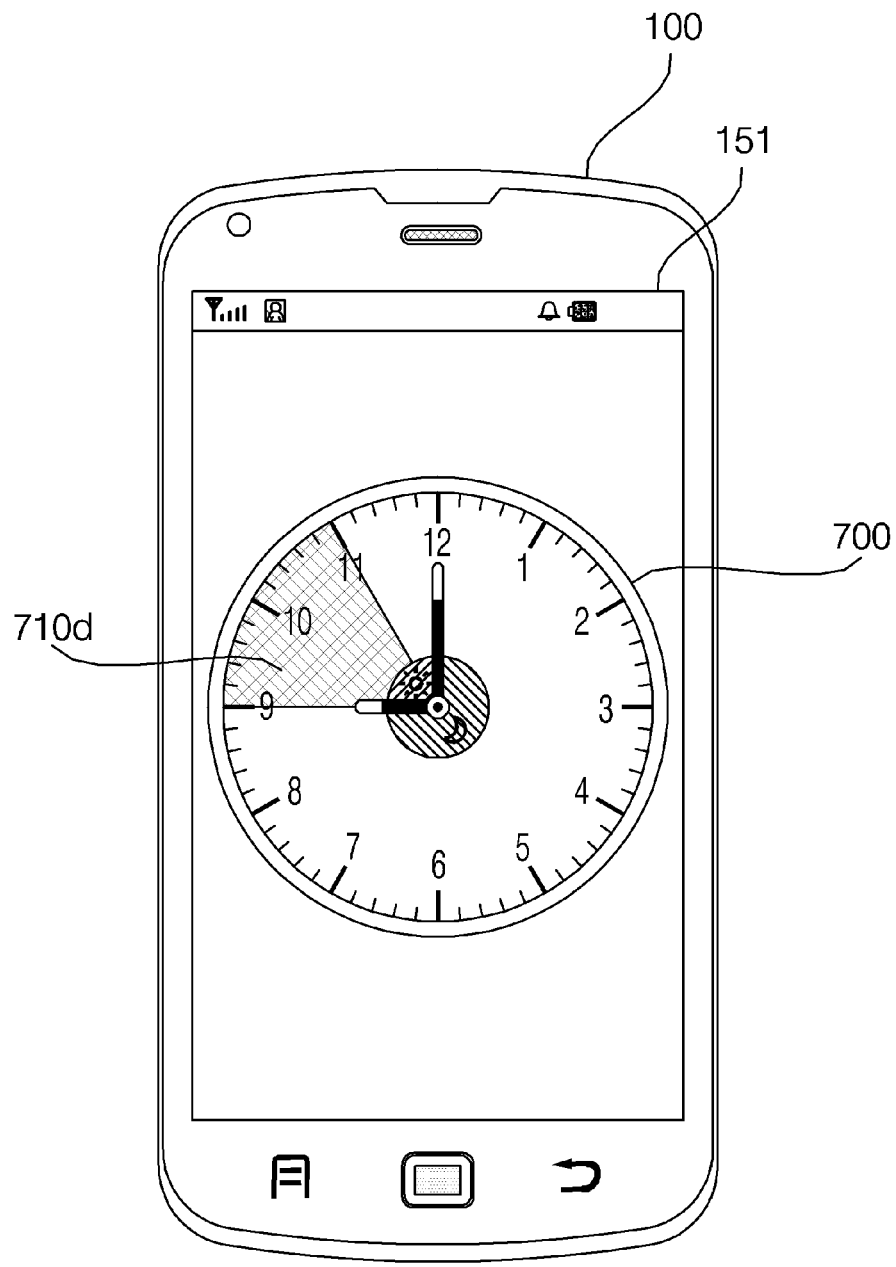

FIG. 10A illustrates that a region 710*d* between 9:00 and 11:00 is set in the watch object 700.

For example, when the user selects a region 710*d* between 9:00 and 11:00 using two fingers, as exemplarily illustrated in FIG. 10A, the selected region 710*d* may be displayed in a highlighted state.

Meanwhile, a plurality of schedule information may be set in the region 710*d* between 9:00 and 11:00 within the watch object 700. In this case, setting a representative schedule is preferable and, thus, an application item related to the setting of a representative schedule may be displayed.

Figure 10B:
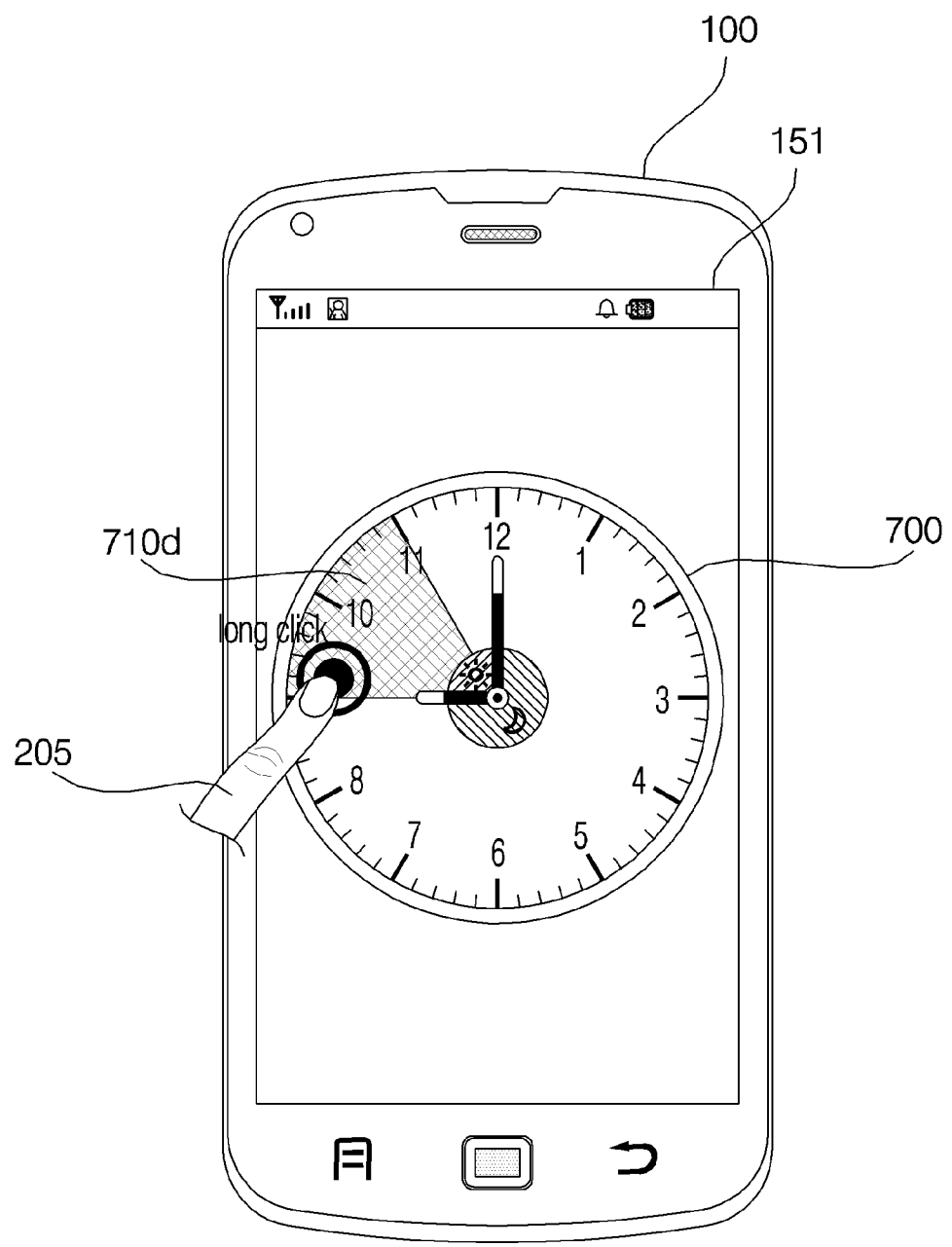

FIG. 10B illustrates the case where the user's finger inputs a long touch to the region 710*d* between 9:00 and 11:00 within the watch object 700.

Figure 10C:
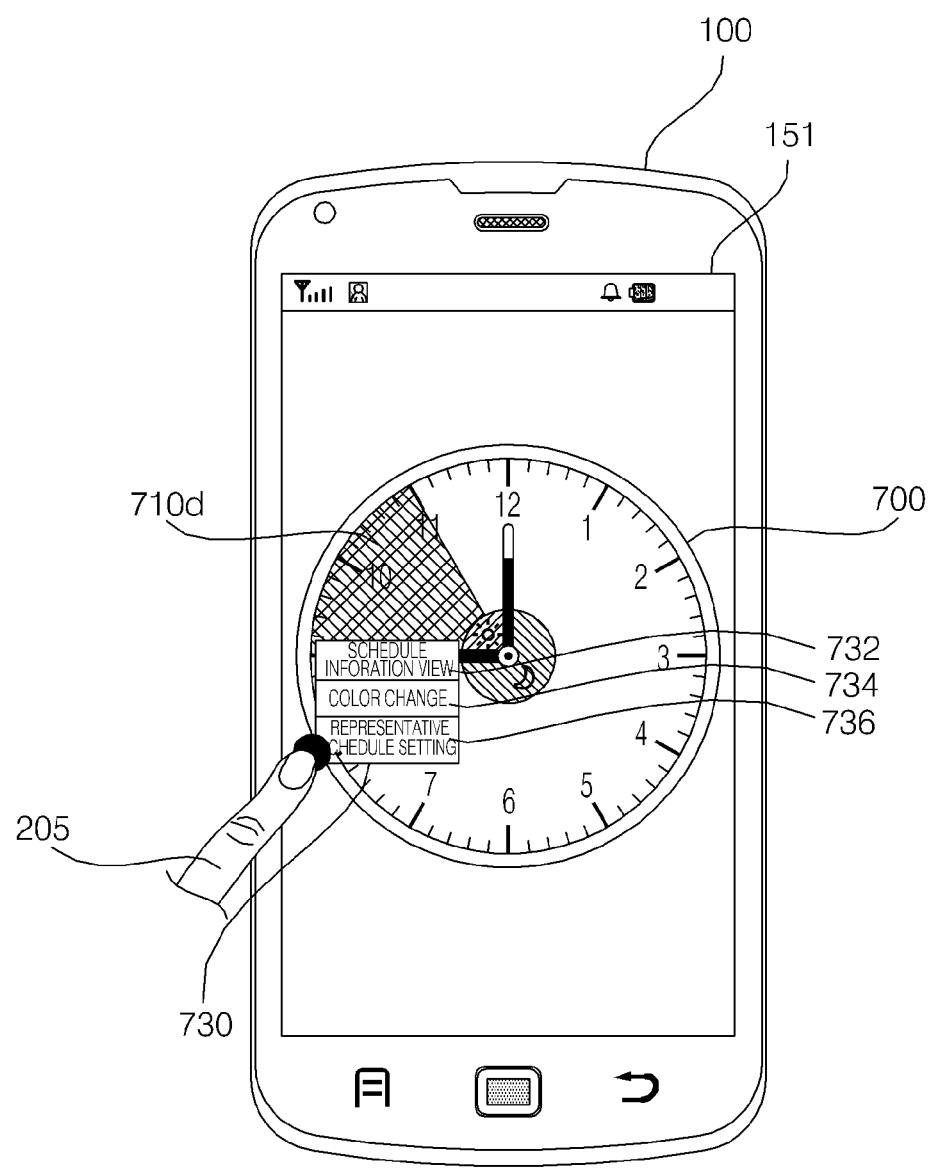

FIG. 10C illustrates that a sub menu 730 related to the region 710*d* is displayed in response to the long touch input of FIG. 10B.

When the user's finger 205 selects the representative schedule setting item 736 among the items 732, 734 and 736 of the sub menu 730, the controller 180 controls the region 710*d* so as to be subjected to representative schedule setting.

Figure 10D:
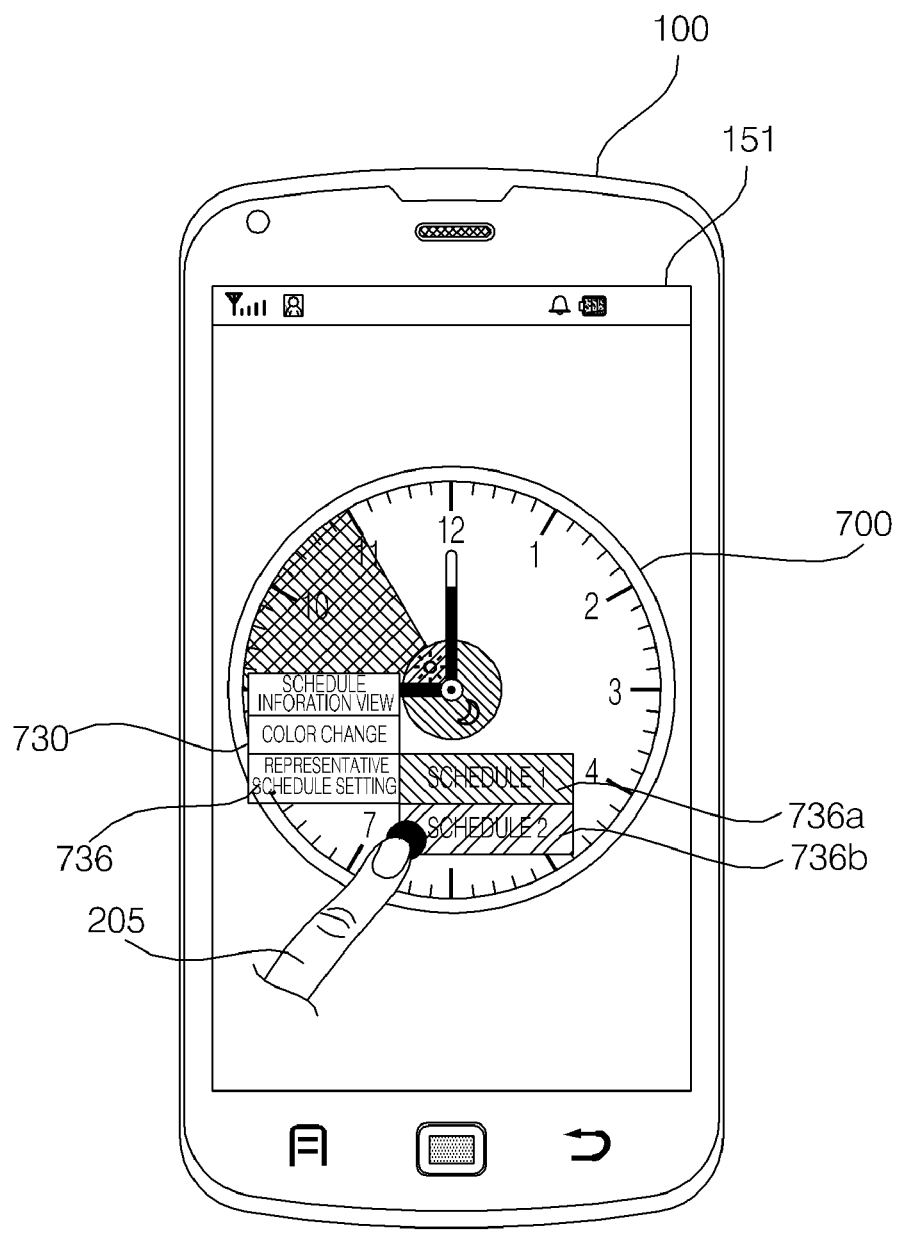

FIG. 10D illustrates that a plurality of schedule items 736*a* and 736*b* for representative schedule setting is additionally displayed on the watch object 700.

Figure 10E:
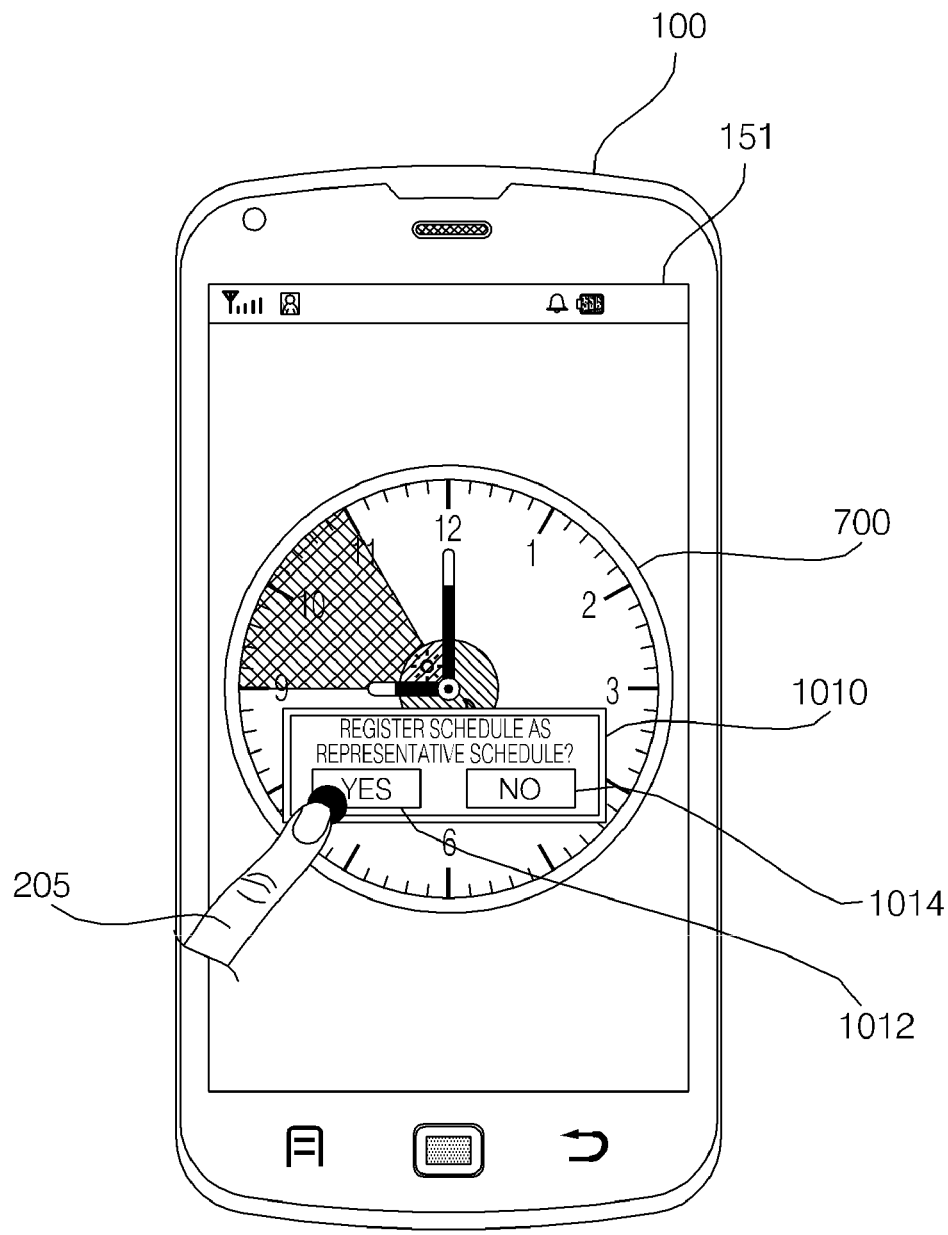

When the user's finger 205 selects a second schedule item 736*b*, as illustrated in FIG. 10E, an object 1010 that represents whether or not to set a selected schedule to a representative schedule may be displayed on the watch object 700.

Figure 10F:
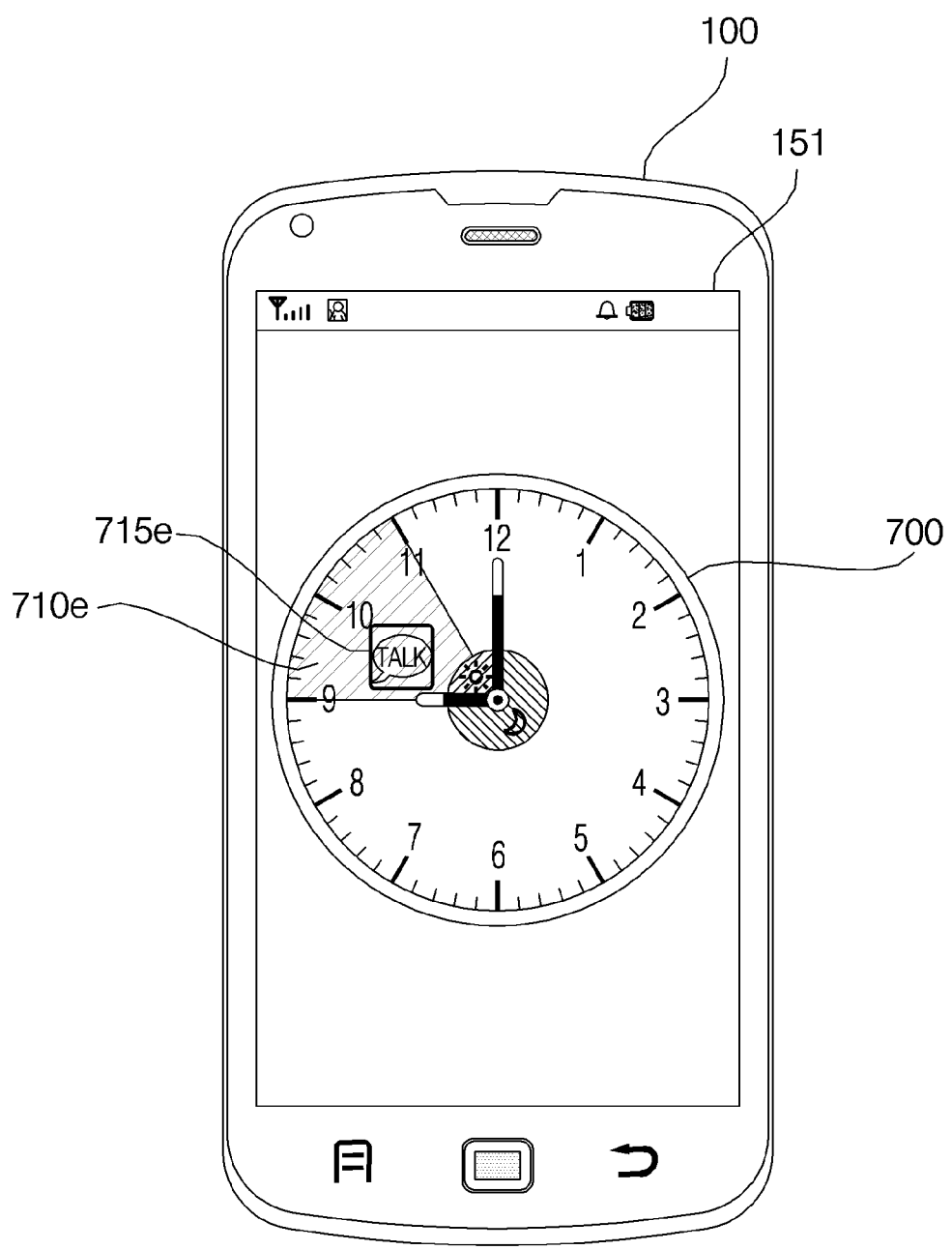

Then, when an approval item 1012 in the object 1010 is selected, as exemplarily illustrated in FIG. 10F, the second schedule item 736*b* is set to a representative schedule item. Upon this representative schedule setting, a corresponding region may be differentially displayed. FIG. 10F illustrates that a region 710*e* is distinguished from the region 710*b* of FIG. 9A. In addition, a related application linked to the schedule may be set or changed according to the representative schedule setting or change.

As exemplarily illustrated in FIG. 10F, the region 710*e* between 9:00 and 11:00 includes an SNS application item 715*e* according to representative schedule setting.

Meanwhile, in the case where the watch object includes a region where a plurality of schedules overlaps, the controller 180 may set a representative schedule according to a user input.

Next, FIGS. 11A to 11F illustrate implementation of representative schedule setting with respect to a schedule overlapping region.

Figure 11A:
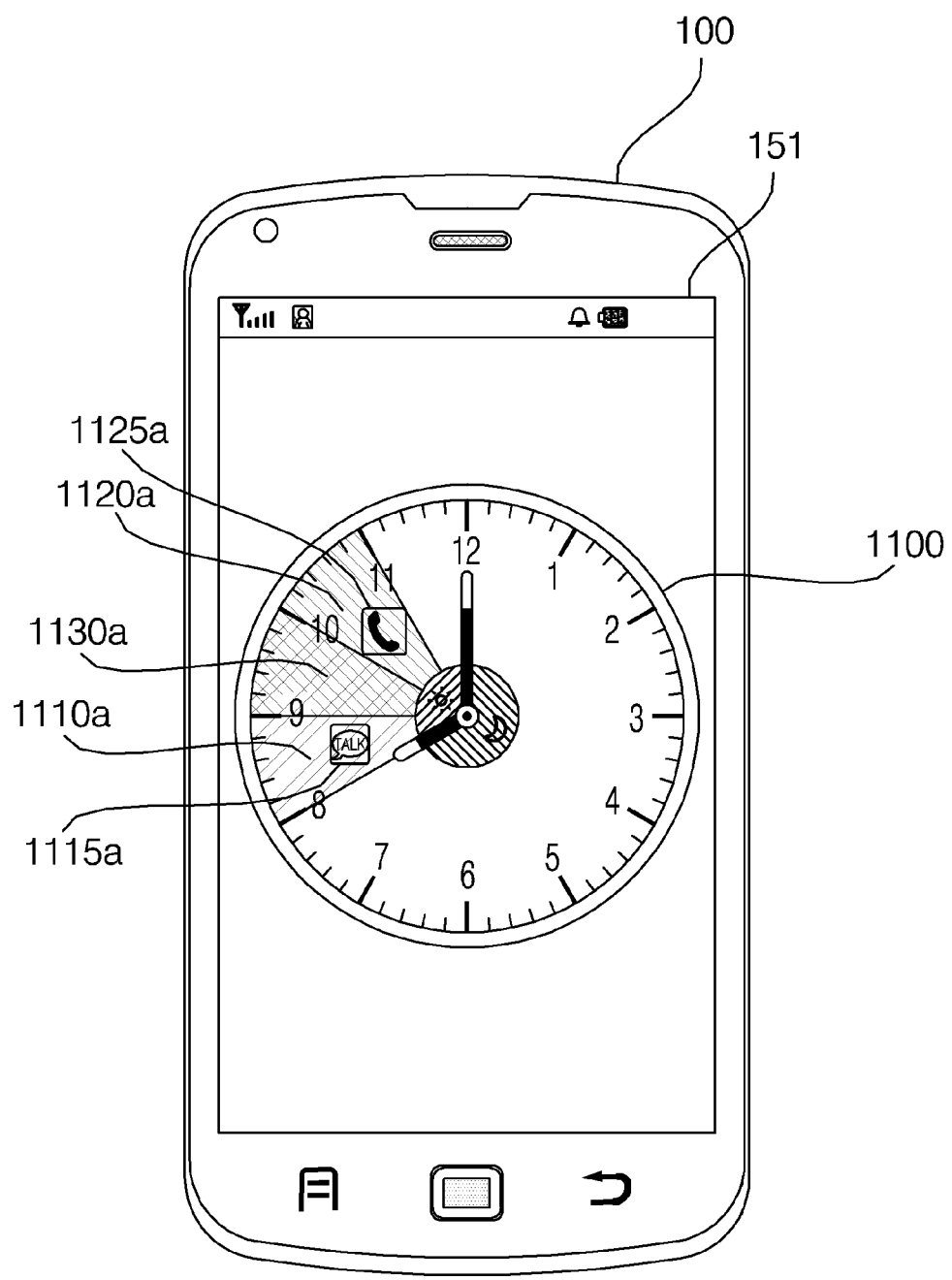

FIG. 11A illustrates that a watch object 1100 includes a first region 1120*a* between 10:00 and 11:00 associated with a first schedule, a second region 1110*a* between 8:00 and 9:00 associated with a second schedule, and a third region 1130*a* between 9:00 and 10:00 where the first and second schedules overlap.

That is, the first schedule is associated with a region between 9:00 and 11:00, and the second schedule is associated with a region between 8:00 and 10:00.

Meanwhile, a phone call application item 1125*a* corresponding to the first schedule may be displayed and an SNS application item 1115*a* corresponding to the second schedule may be displayed.

Figure 11B:
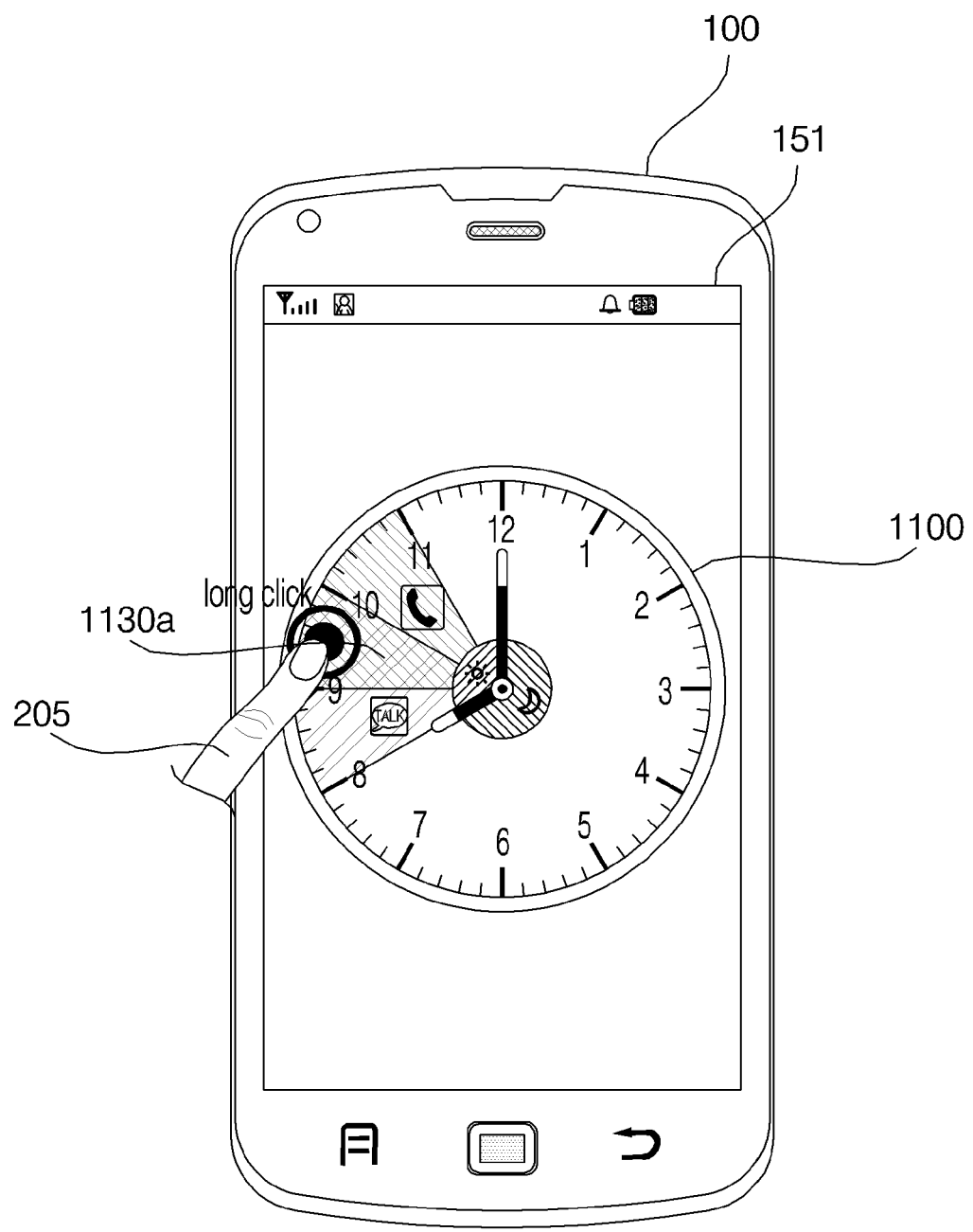

FIG. 11B illustrates that the user's finger 205 inputs a long touch to the third region 1130*a*.

As such, the controller 180 may control display of the sub menu 730 related to the third region 1103*a*.

Figure 11C:
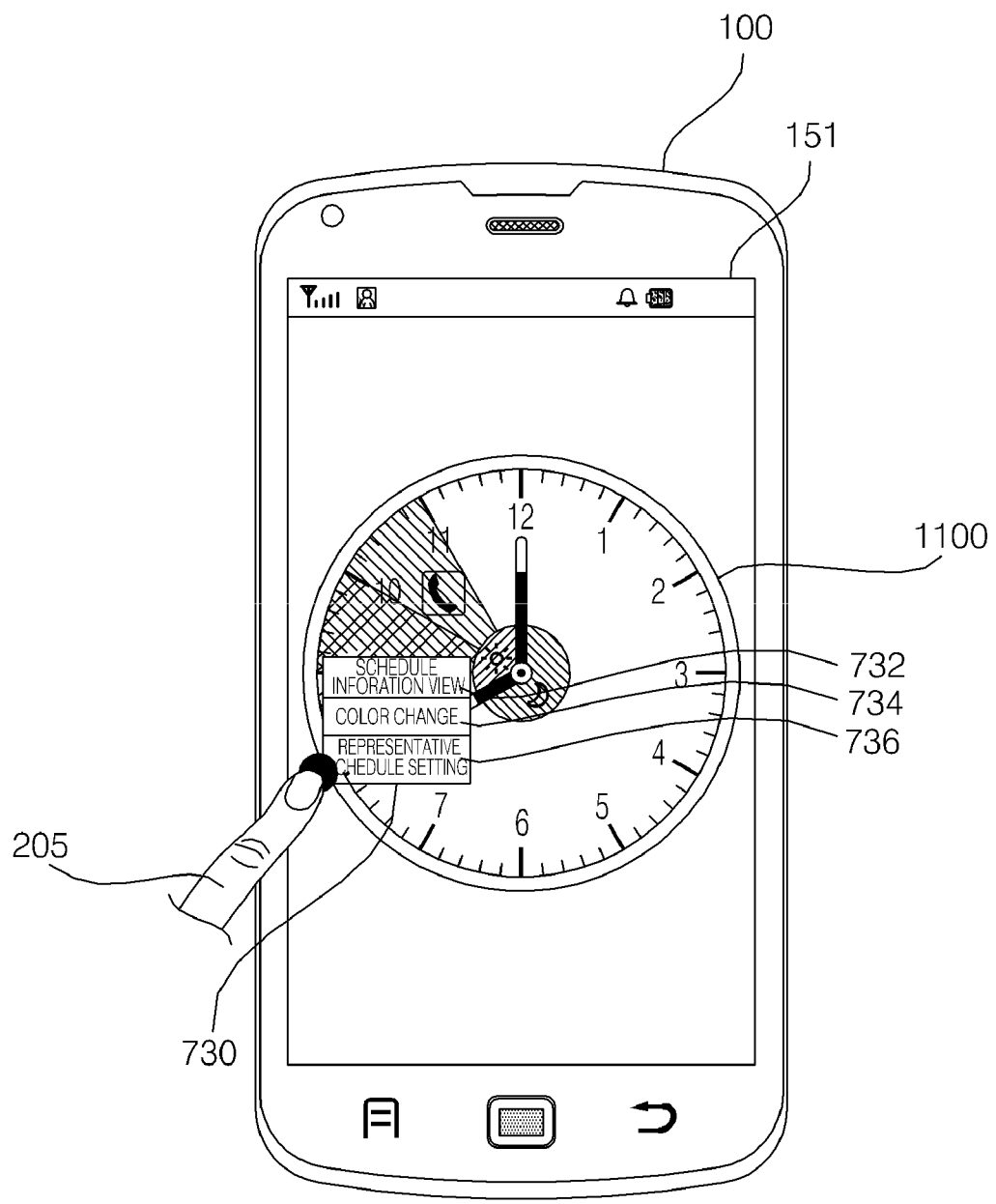

FIG. 11C illustrates display of the sub menu 730 and, more particularly, illustrates that the user's finger 205 selects the representative schedule setting item 736 in the sub menu 730.

Figure 11D:
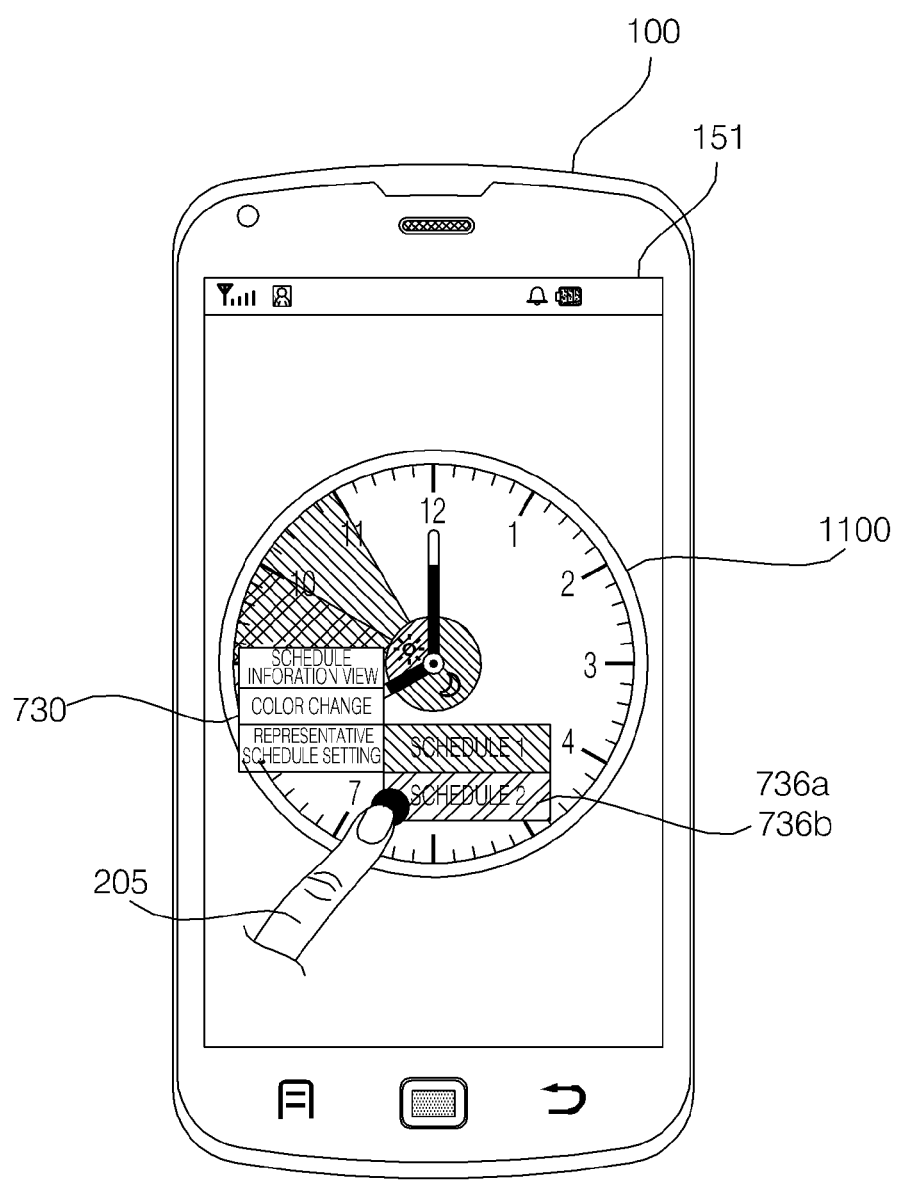

FIG. 11D illustrates that the schedule items 736*a* and 736*b* for representative schedule setting are additionally displayed on the watch object 1100.

Figure 11E:
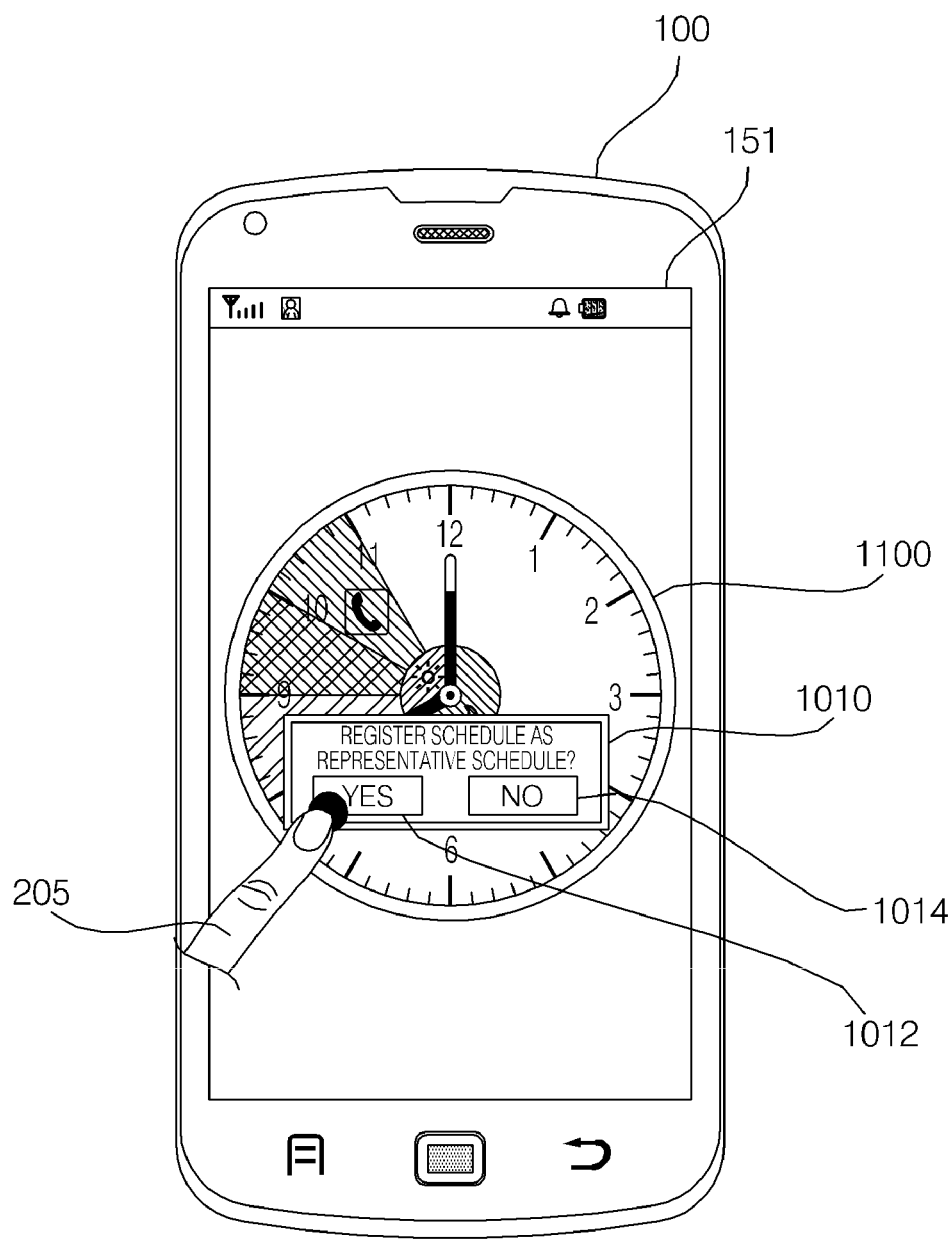

When the user's finger 205 selects the second schedule item 736*b*, as exemplarily illustrated in FIG. 11E, an object 1010 that represents whether or not to set a corresponding schedule to a representative schedule may be displayed on the watch object 1100.

Figure 11F:
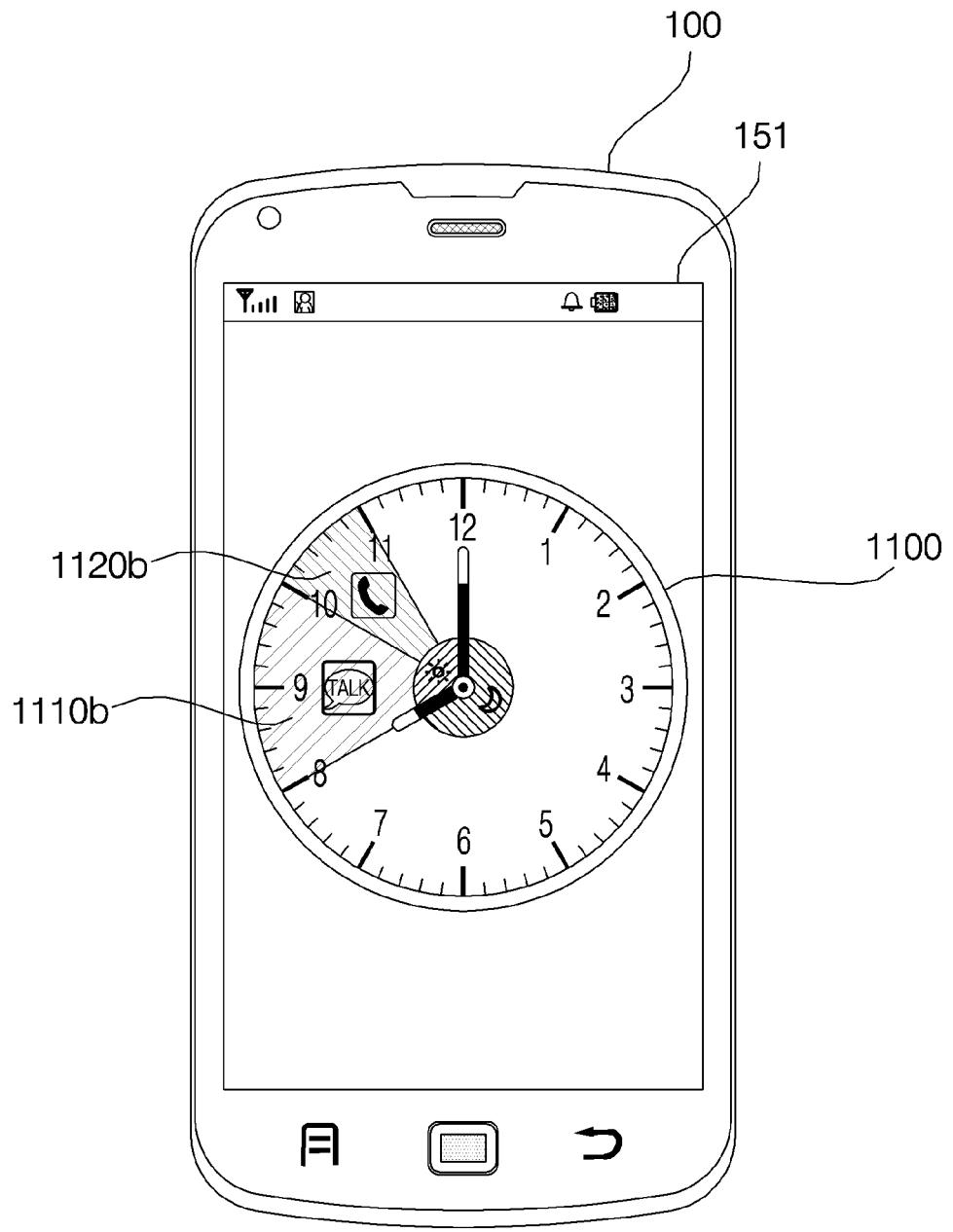

Then, when an approval item 1012 in the object 1010 is selected, as exemplarily illustrated in FIG. 11F, the second schedule item 736*b* is set to a representative schedule item between 9:00 and 10:00. That is, the second schedule region includes not only a region between 8:00 and 9:00, but also a region between 9:00 and 10:00. FIG. 11F illustrates the watch object 1100 including an increased second schedule region 1110*b* and a reduced first schedule region 1120*b*. In this way, the user can simply set a representative schedule related to a schedule overlapping region.

Meanwhile, the controller 180 of the mobile terminal 100 may receive, for example, schedule information from an external source and control the received schedule information so as to be reflected and displayed in the watch object.

FIGS. 12A to 12H illustrate reception of, for example, a schedule and a coupon from an external source.

Figure 12A:
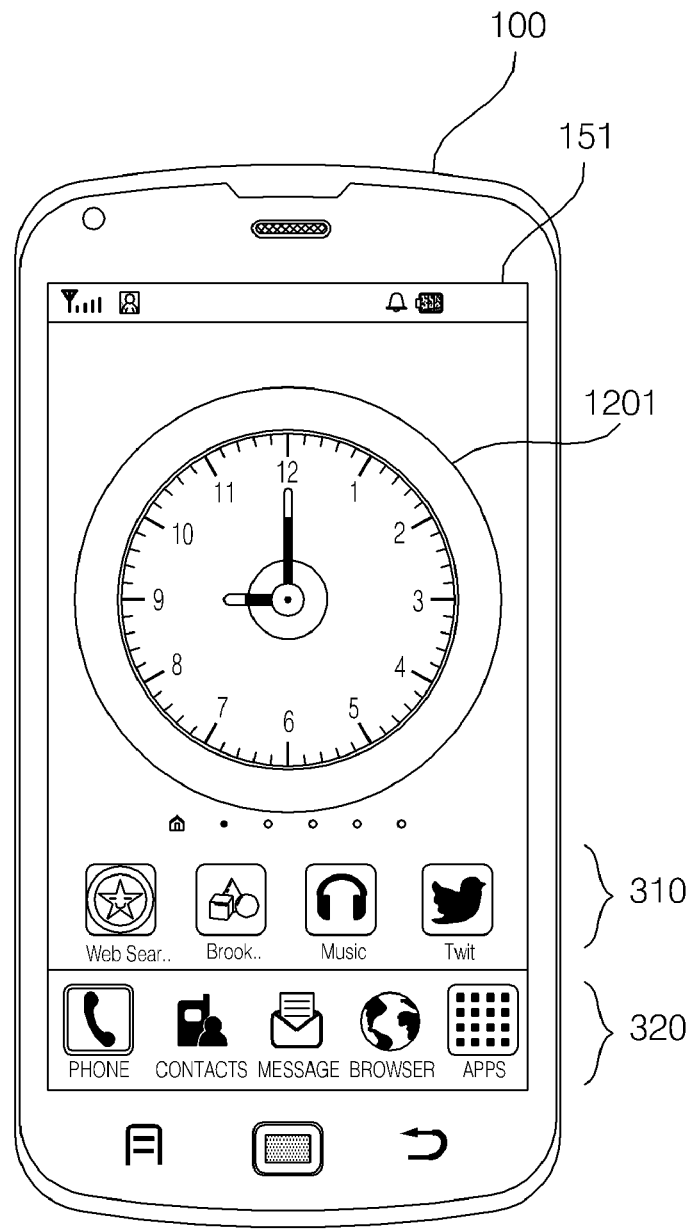

FIG. 12A illustrates a home screen including a watch object 1201, an application list 310, and a preferred application list 320.

In the case where schedule information and coupon information are tossed from, for example, an external server (not illustrated) or an external terminal (not illustrated) of another user in a state in which a home screen is displayed, the controller 180 of the mobile terminal 100 may receive the schedule information and the coupon information and control display of a notification message for the received schedule information and coupon information.

Figure 12B:
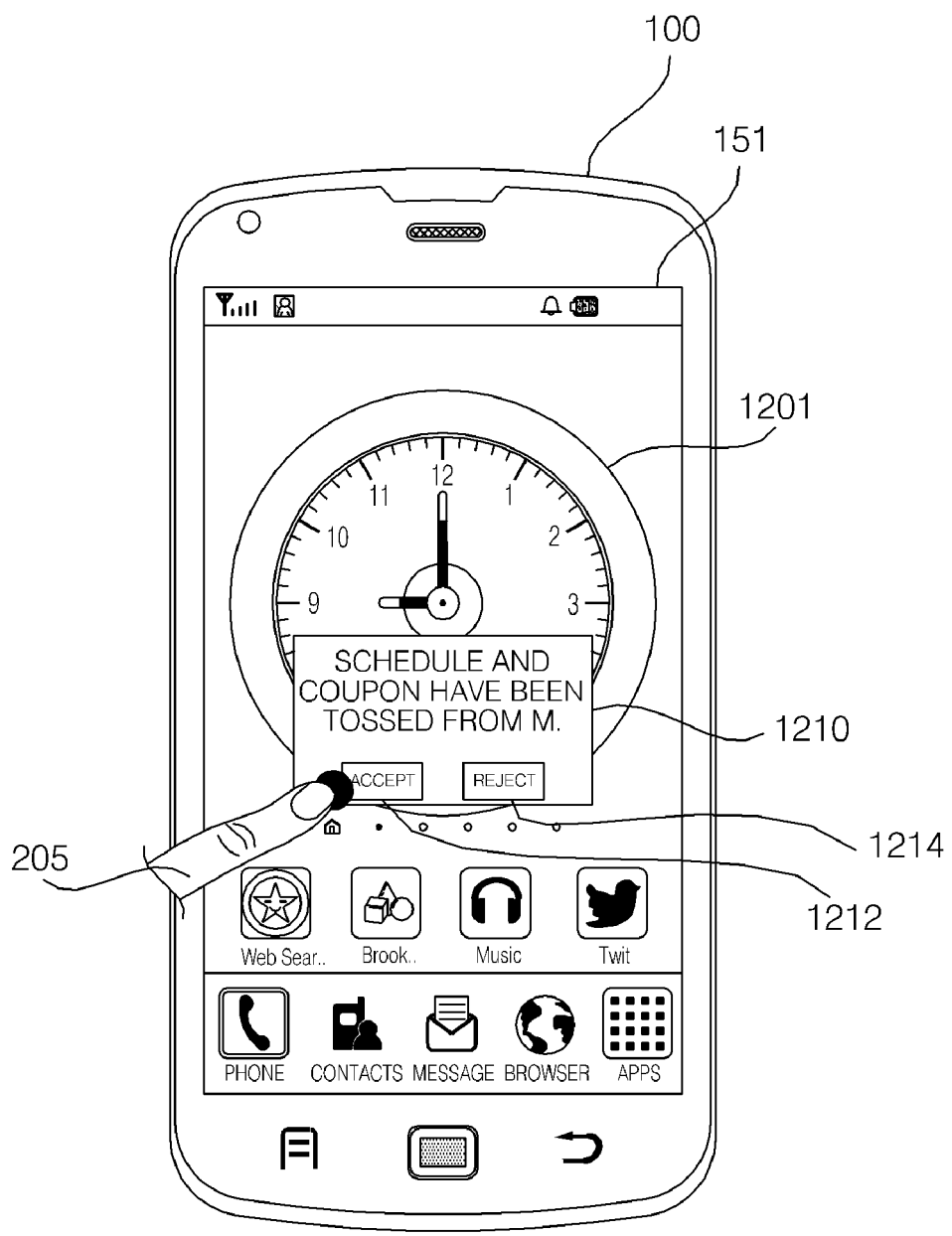

FIG. 12B illustrates that an object 1210 representing reception of schedule and coupon information from "M" is displayed, as a pop-up window, on a home screen.

The object 1210 may include an acceptance item 1212 and a rejection item 1214 with respect to schedule and coupon reception.

When the acceptance item 1212 is selected by a touch input of the user's finger 205, the controller 180 controls corresponding schedule information so as to be displayed in the watch object 1201.

Figure 12C:
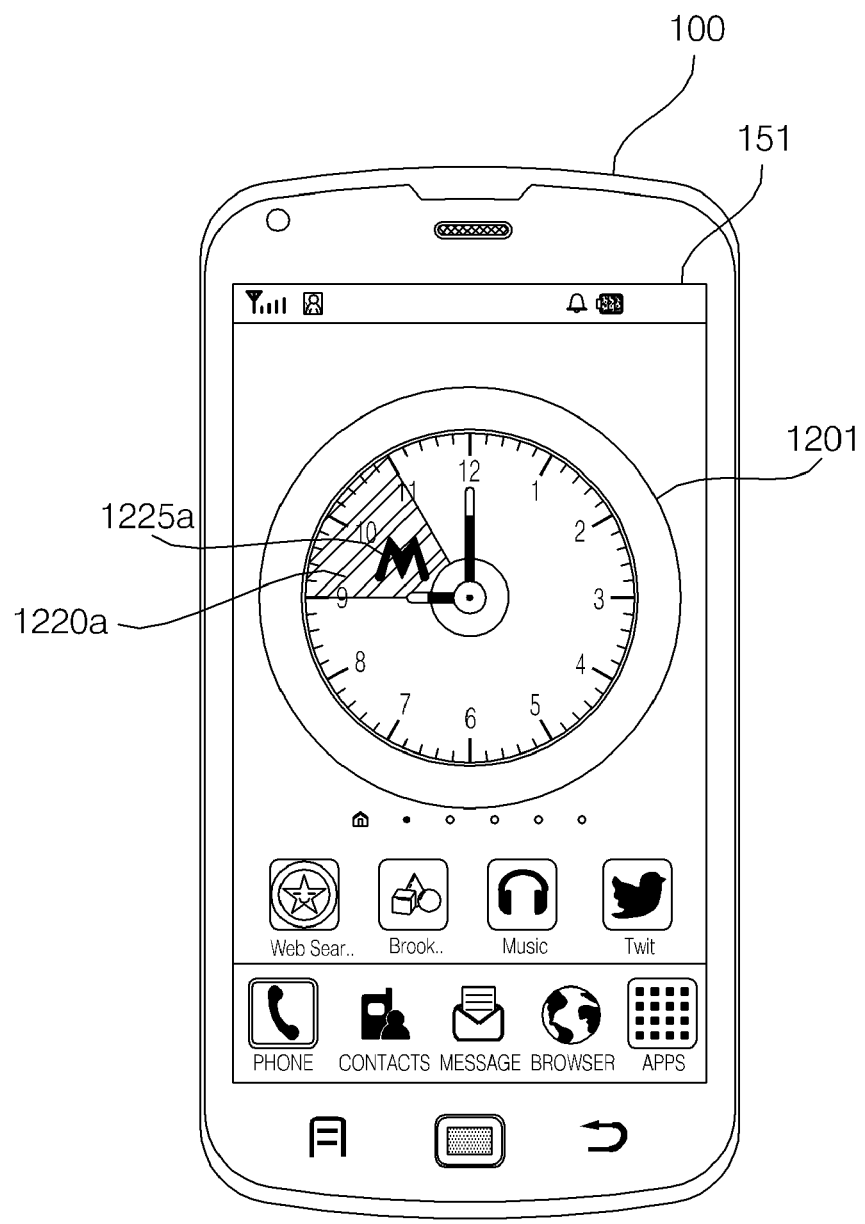

FIG. 12C illustrates that schedule information received from "M" is displayed on a region 1220a between 9:00 and 11:00. At this time, an icon 1225a representing a provider may also be displayed. This may allow the user in simply checking schedule information received from an external source via the watch object 1201.

Meanwhile, schedule information and coupons received from an external source may include sale schedule information and discount coupons from markets, stores, restaurants, and the like.

Meanwhile, when the user's finger 205 touches a prescribed point 1220b in a region 1220a between 9:00 and 11:00 to select schedule information that has been received from an external source and reflected in the watch object 1201, the controller 180 may control display of the corresponding schedule information on a screen.

Figure 12D:
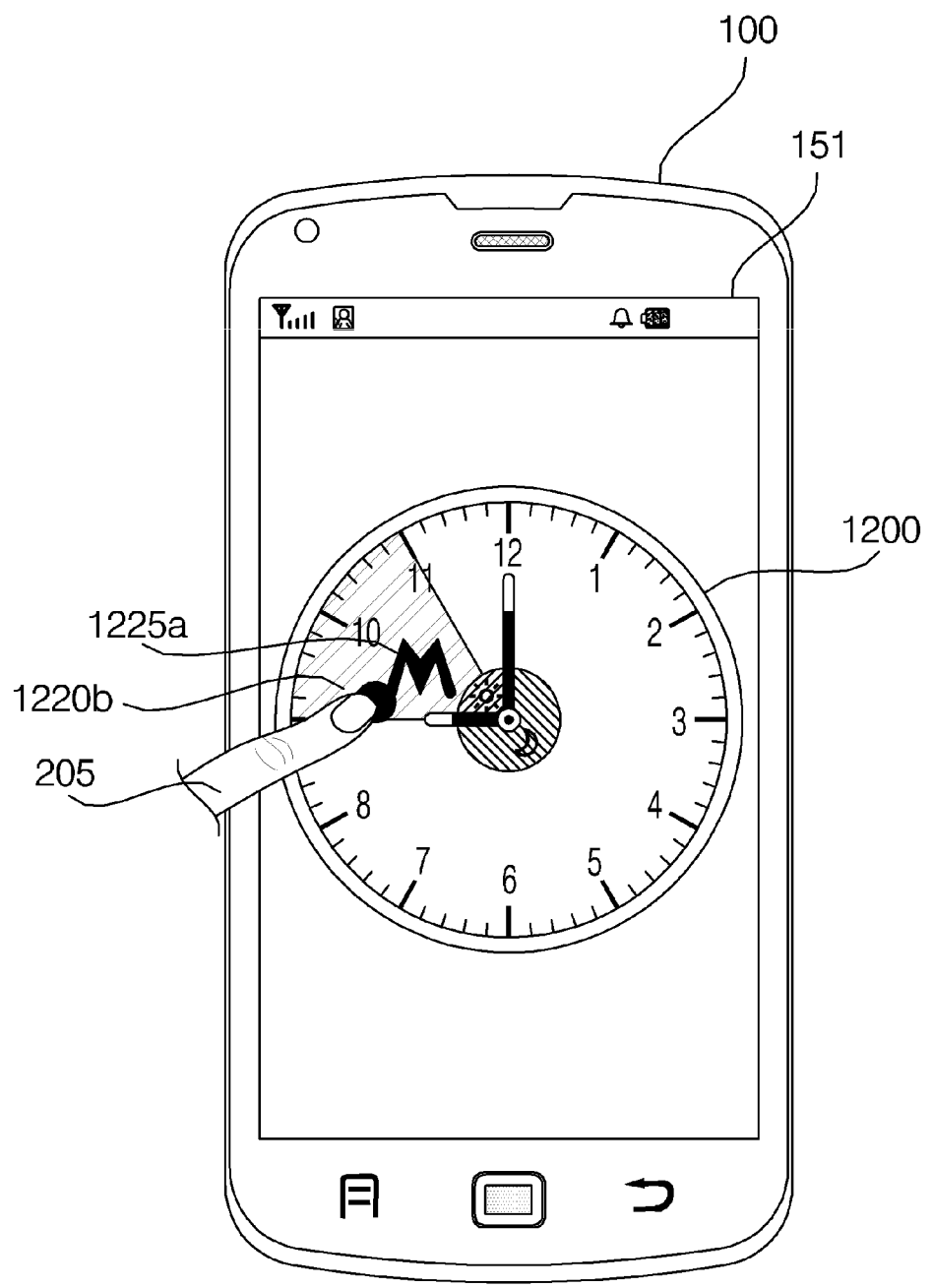

FIG. 12D illustrates that the user's finger 205 selects the region 1220a between 9:00 and 11:00 by a touch input.

Figure 12E:
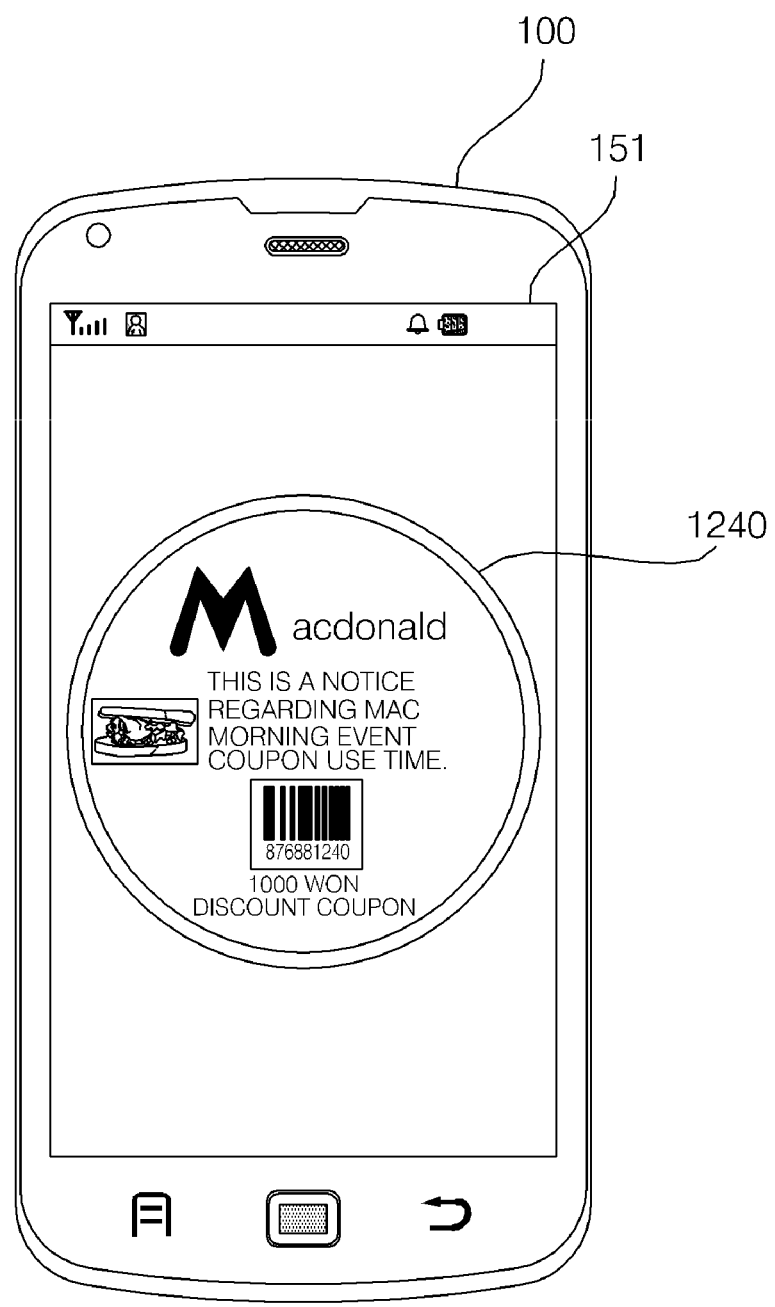

As such, as exemplarily illustrated in FIG. 12E, coupon information 1240 regarding a coupon having a limited use time may be displayed. At this time, the coupon information 1240 may be displayed in the same circular shape as the watch object 1200.

Figure 12F:
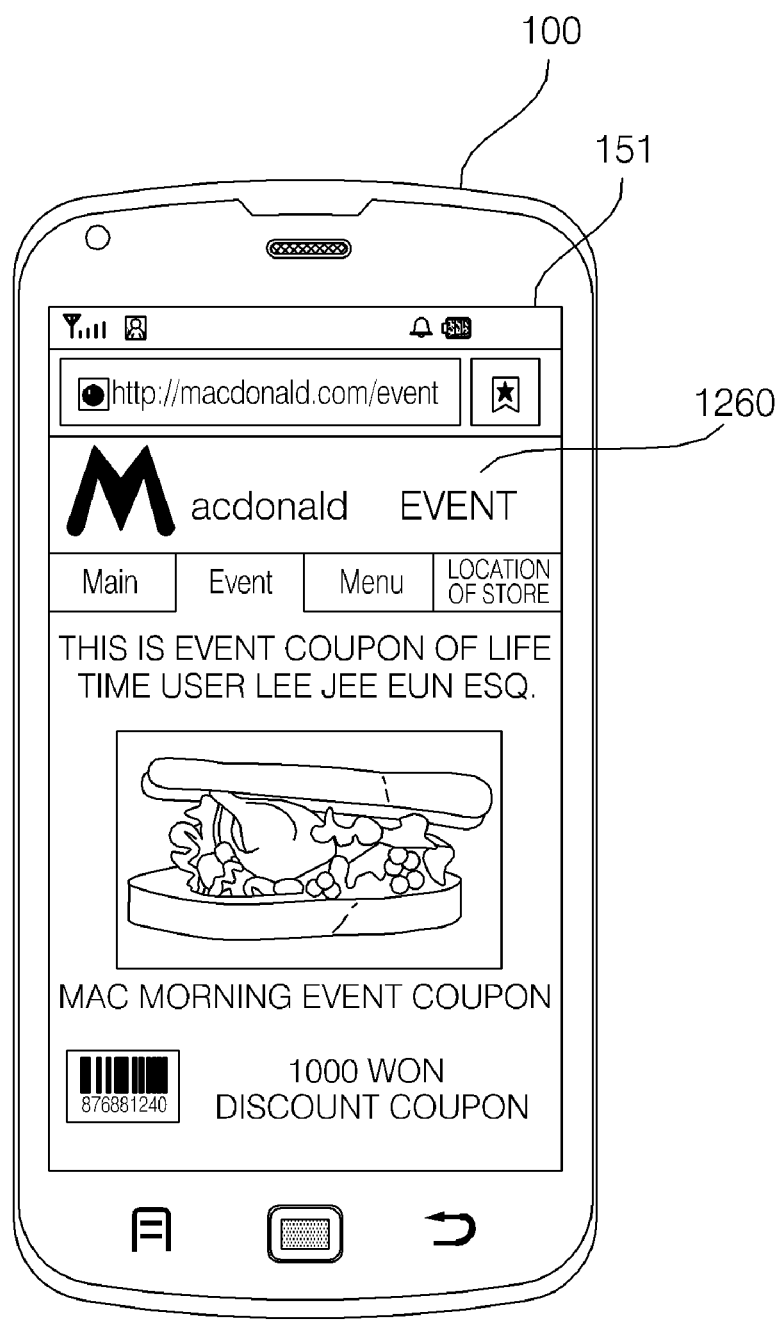

Alternatively, when the region 1220a between 9:00 and 11:00 is selected by a touch input of the user's finger 205, as exemplarily illustrated in FIG. 12F, a screen 1260 including coupon information may be displayed. At this time, the screen may be a web screen provided by a provider of the corresponding coupon.

Upon display of the coupon information 1240 of FIG. 12E or upon display of the screen 1260 including coupon information of FIG. 12F, information regarding a location where the corresponding coupon is usable may be displayed according to user selection. In particular, the location where the corresponding coupon is usable may be displayed on a map.

The controller 180 may display a location where a coupon is usable on a map in consideration of coupon usable location information and location information of the mobile terminal 100.

In particular, when a difference between a coupon usable location and a location of the mobile terminal 100 is within a prescribed distance, the controller 180 may automatically display the coupon usable location on a map.

Figure 12G:
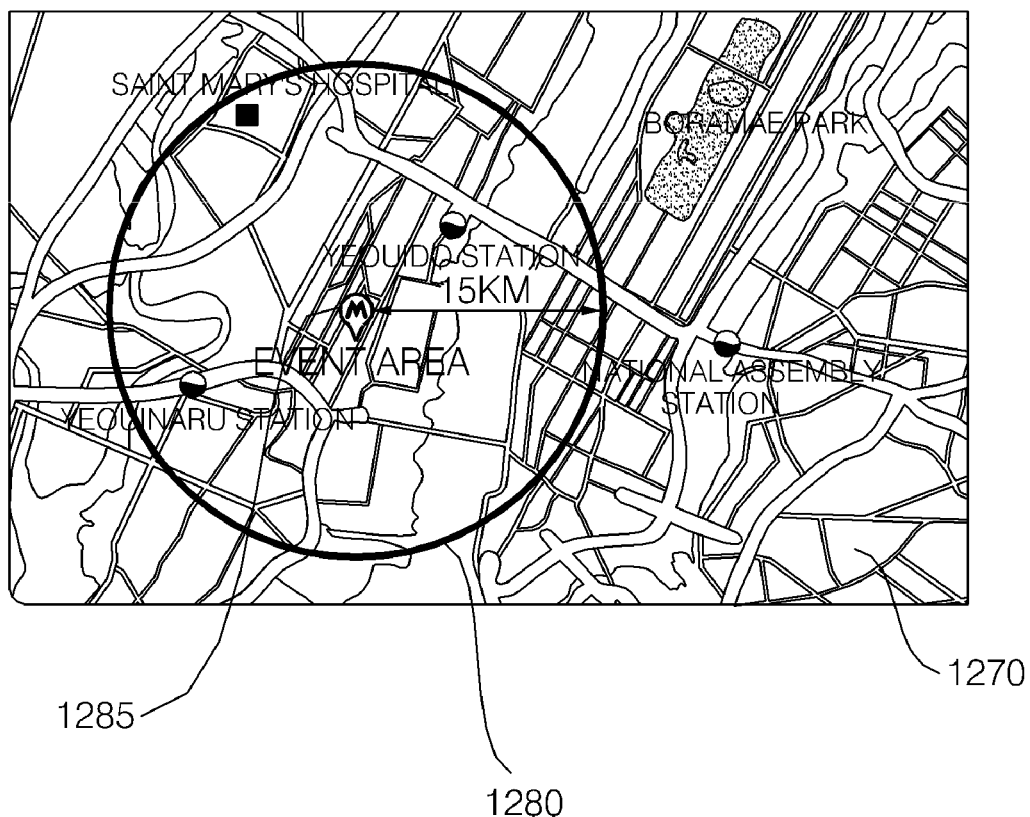

As exemplarily illustrated in FIG. 12G, a location 1285 representing an event area and an area 1280 within a usable distance of 15 Km are displayed in a map image 1270.

That is, when the mobile terminal 100 is located within a distance of 15 Km from a location representing an event area, the map image 1270 as exemplarily illustrated in FIG. 12G may be displayed.

On the other hand, when the mobile terminal 100 is located more than 15 Km from a location representing an event area, the map image 1270 as exemplarily illustrated in FIG. 12G may not be displayed.

Meanwhile, the controller 180 may control a message indicating the end of a schedule so as to be displayed before a prescribed time from an end time of schedule information.

Figure 12H:
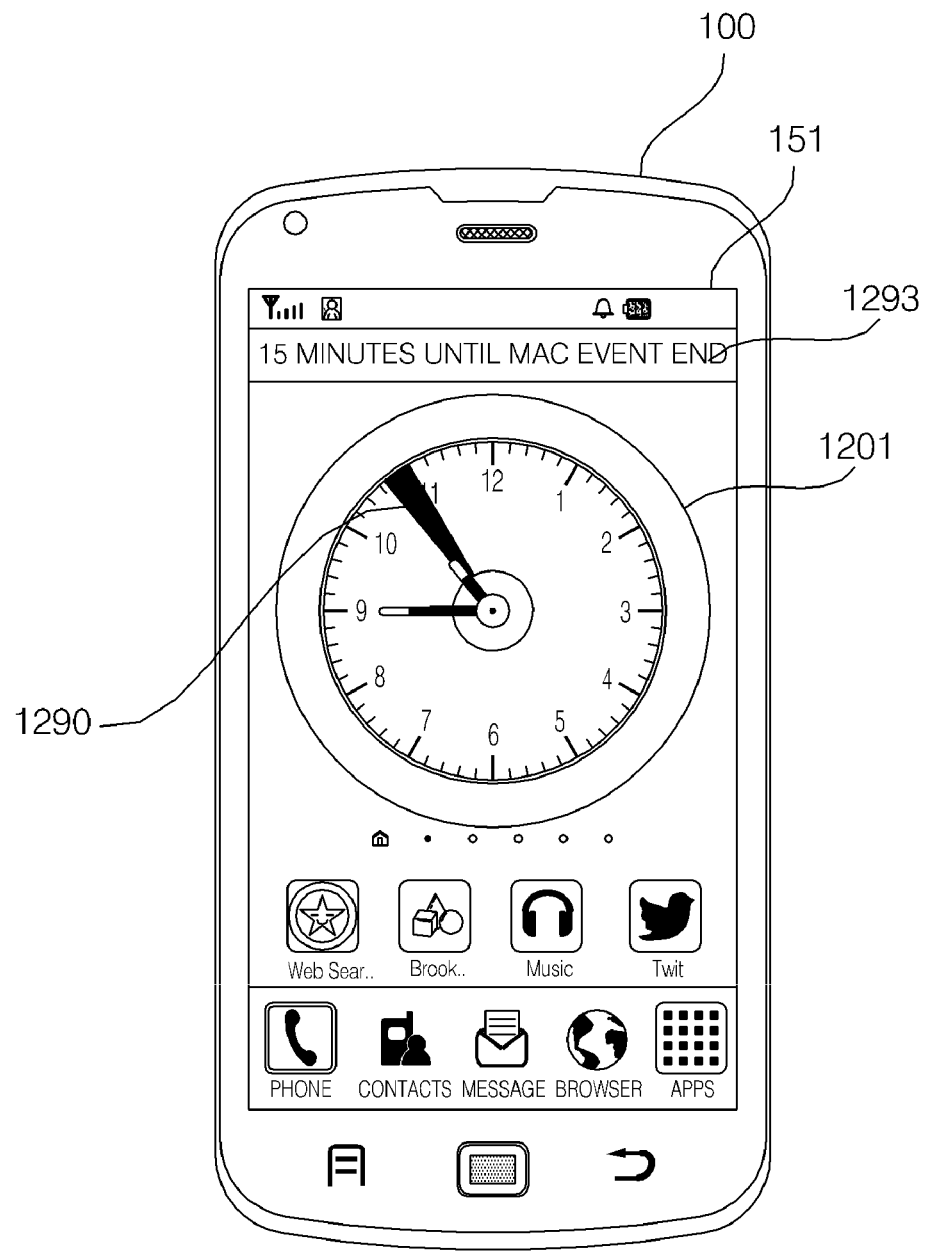

FIG. 12H illustrates that an event end message 1293 is displayed in a home screen when a current time is 10:45 which is 15 minutes before 11:00 as an end time of schedule information. Meanwhile, a region 1290 representing a residual time may also be displayed in the watch object 1201.

Meanwhile, differently from FIG. 12H, a message indicating that the end of an event is imminent may be output as vibration, sound, or a pop-up message on a lock screen or a standby screen.

Figure 13A:
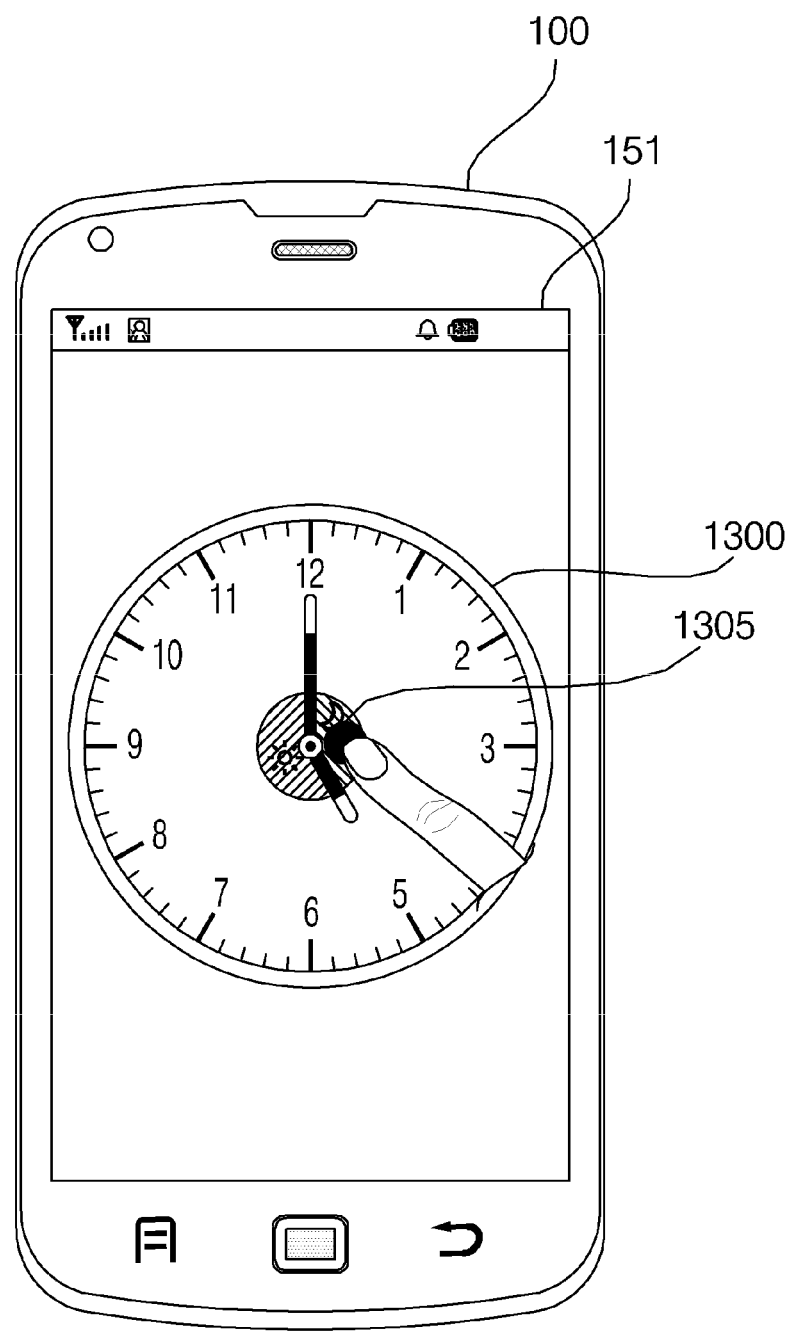
Figure 13B:
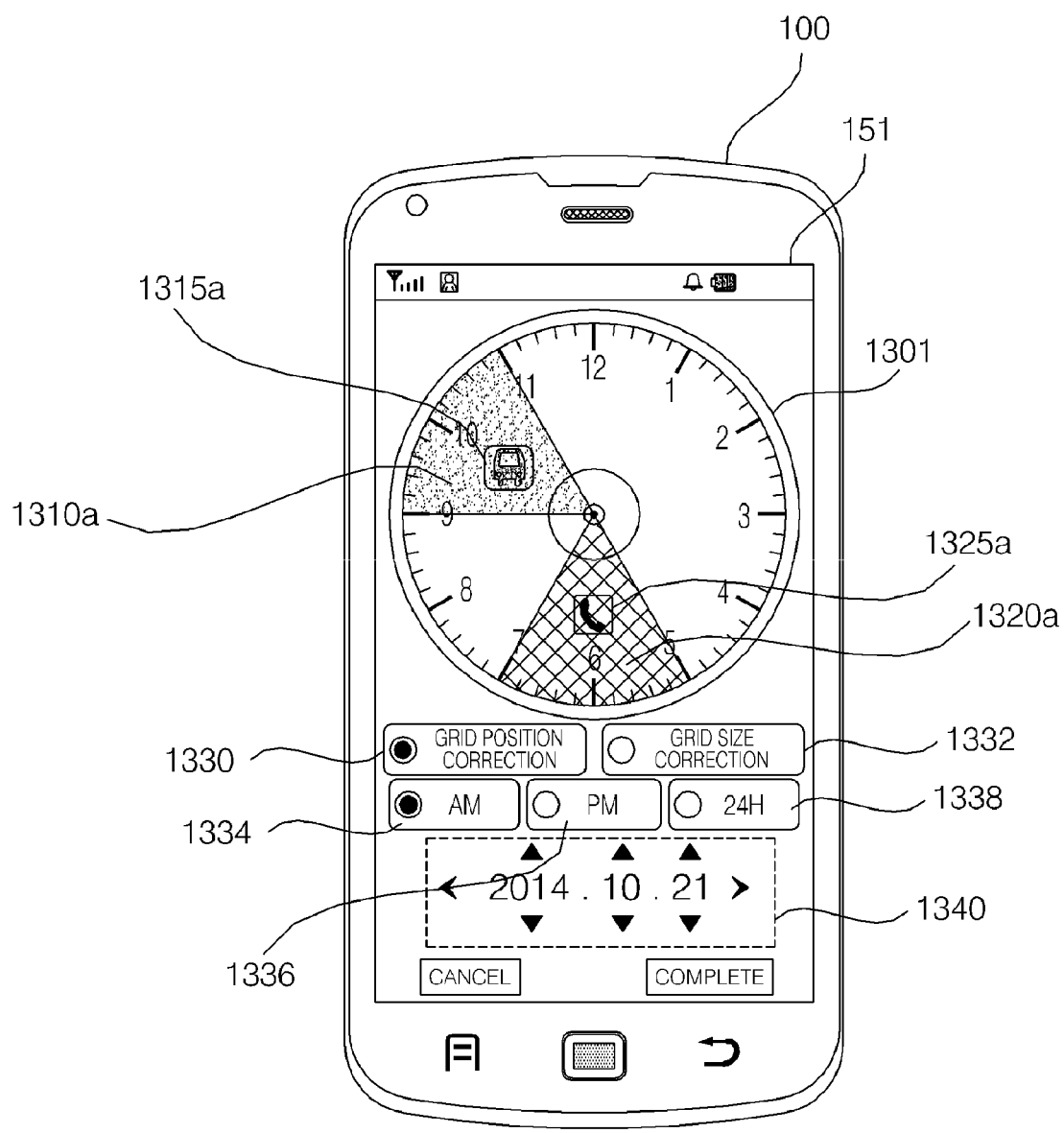
Figure 13C:
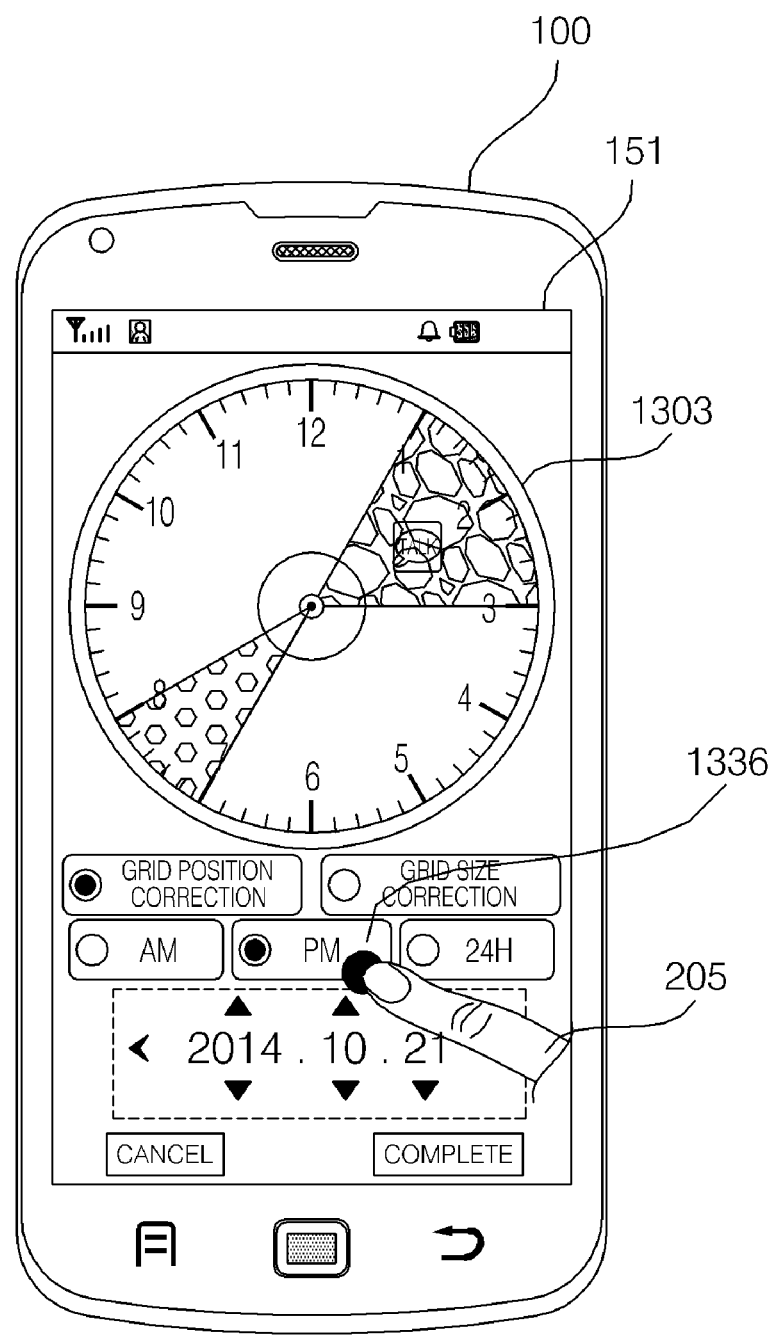
Figure 13D:
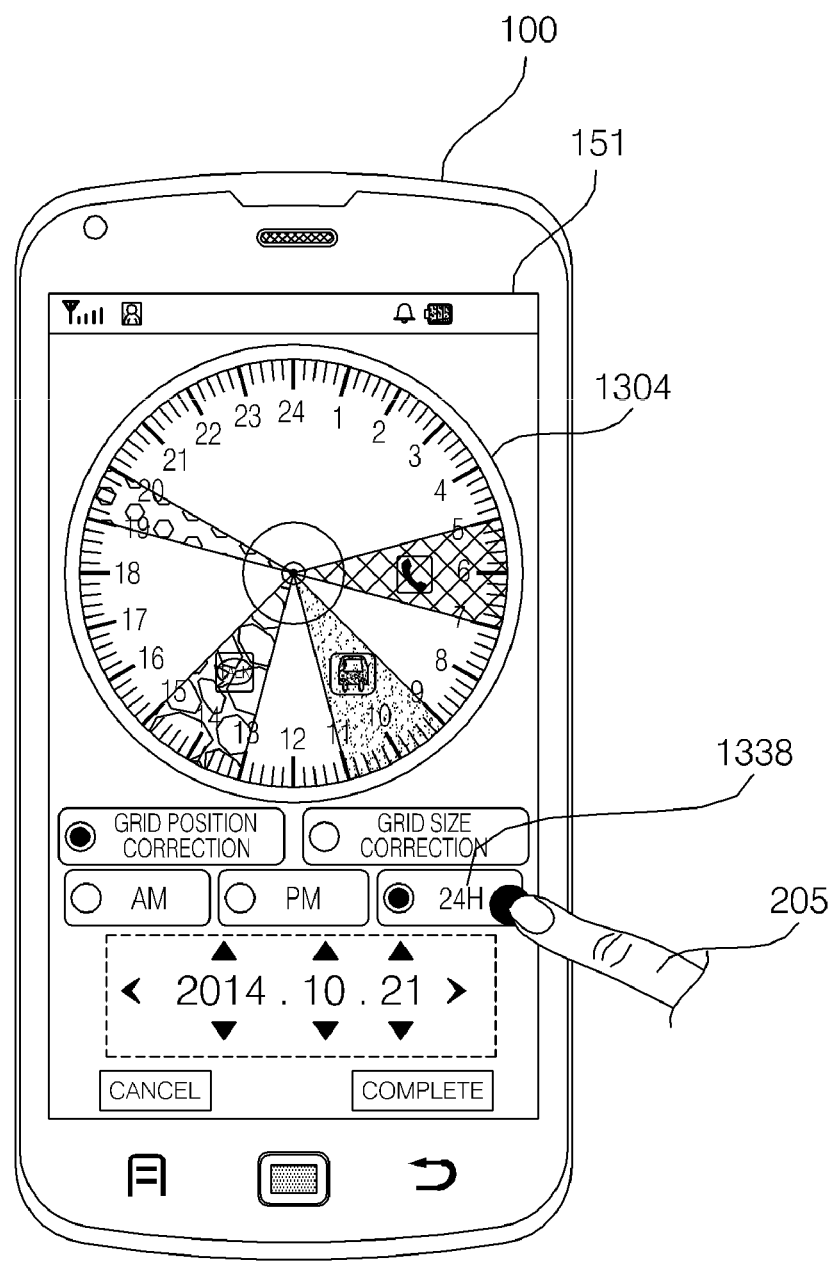
Figure 13E:
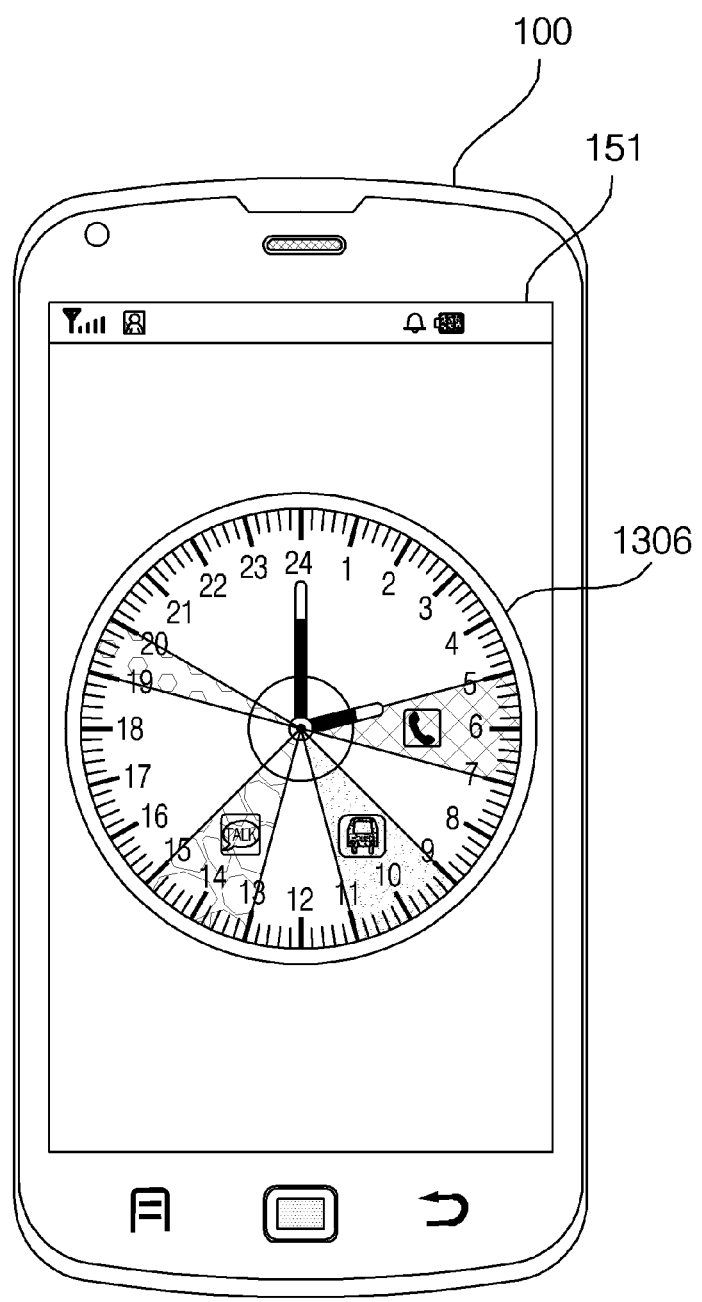
Figure 13F:
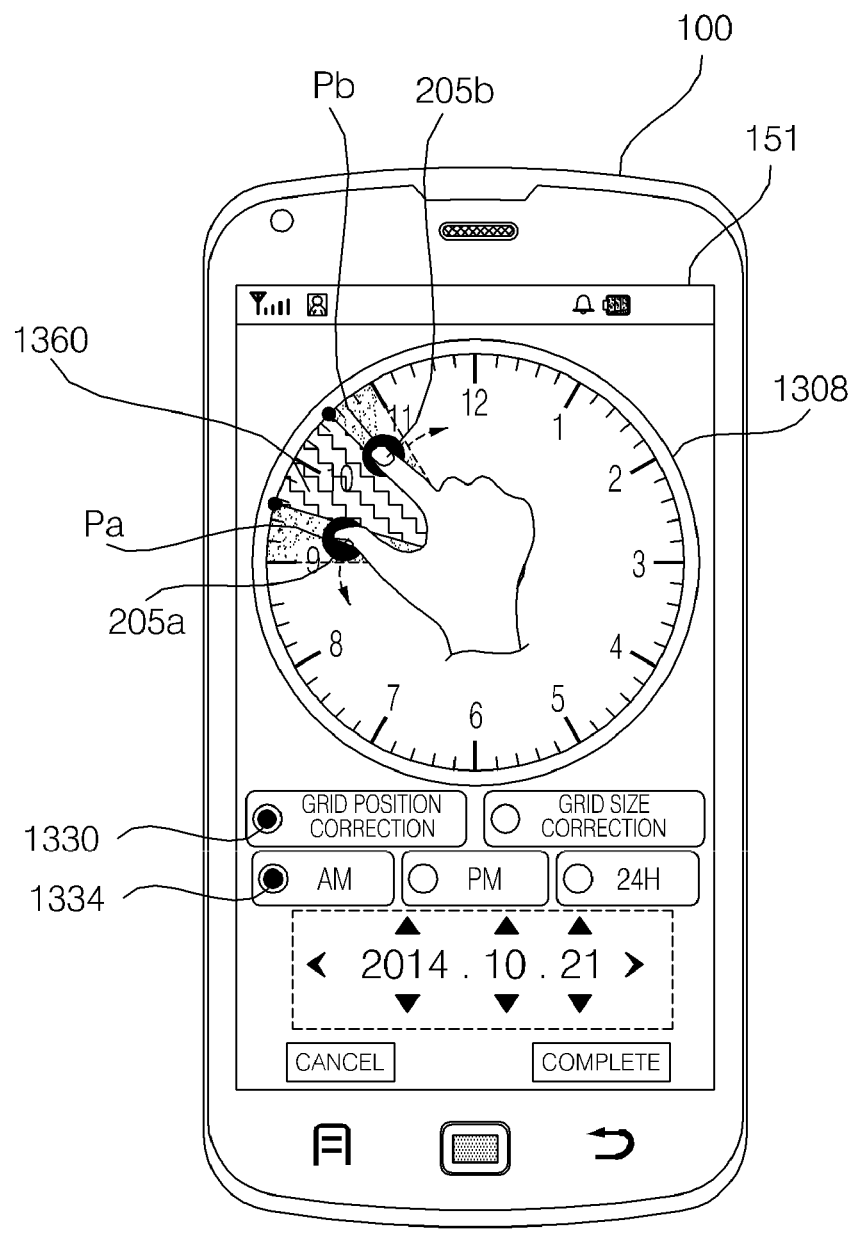
Figure 13G:
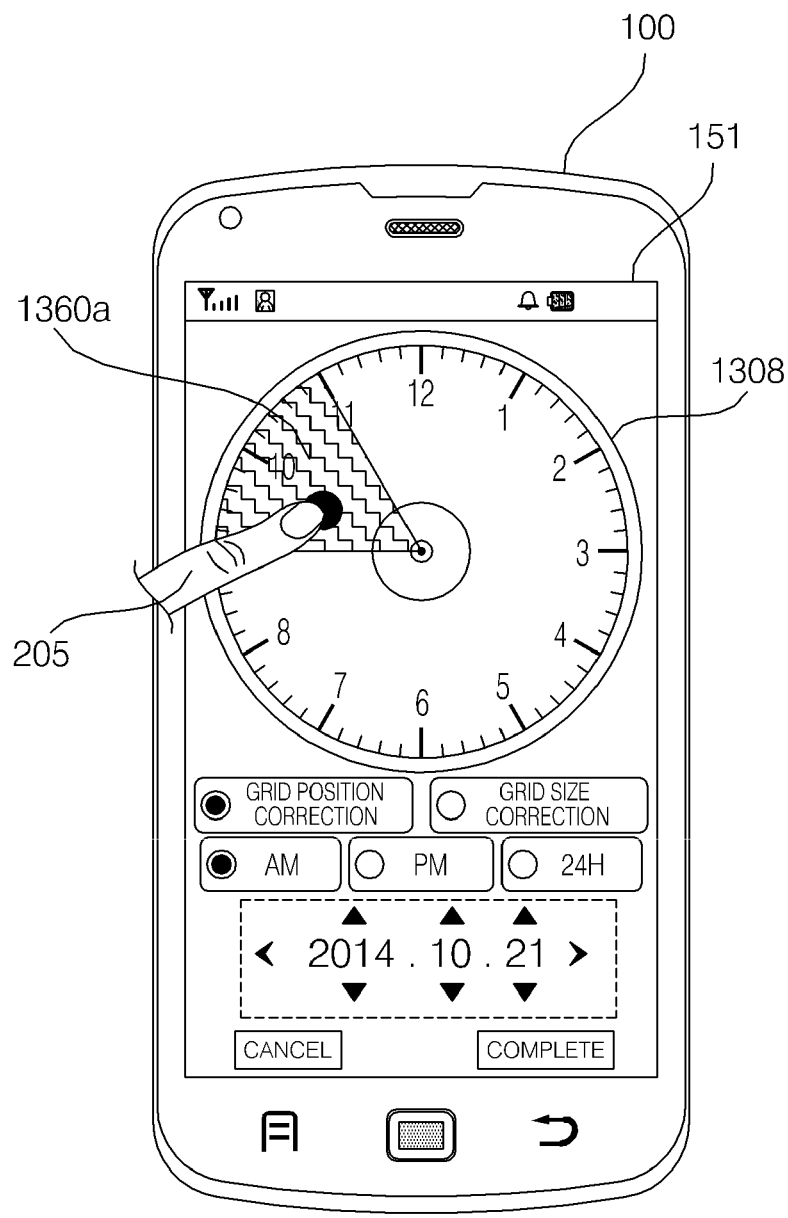
Figure 13H:
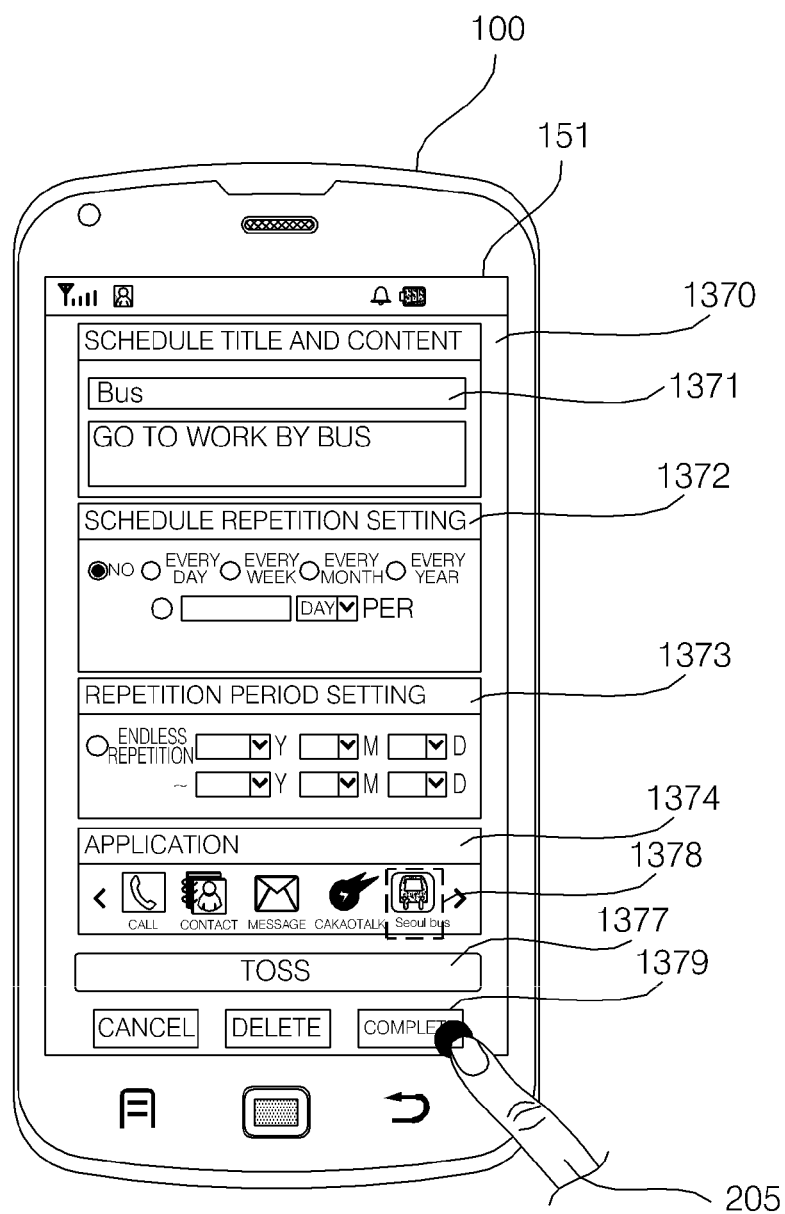
Figure 13I:
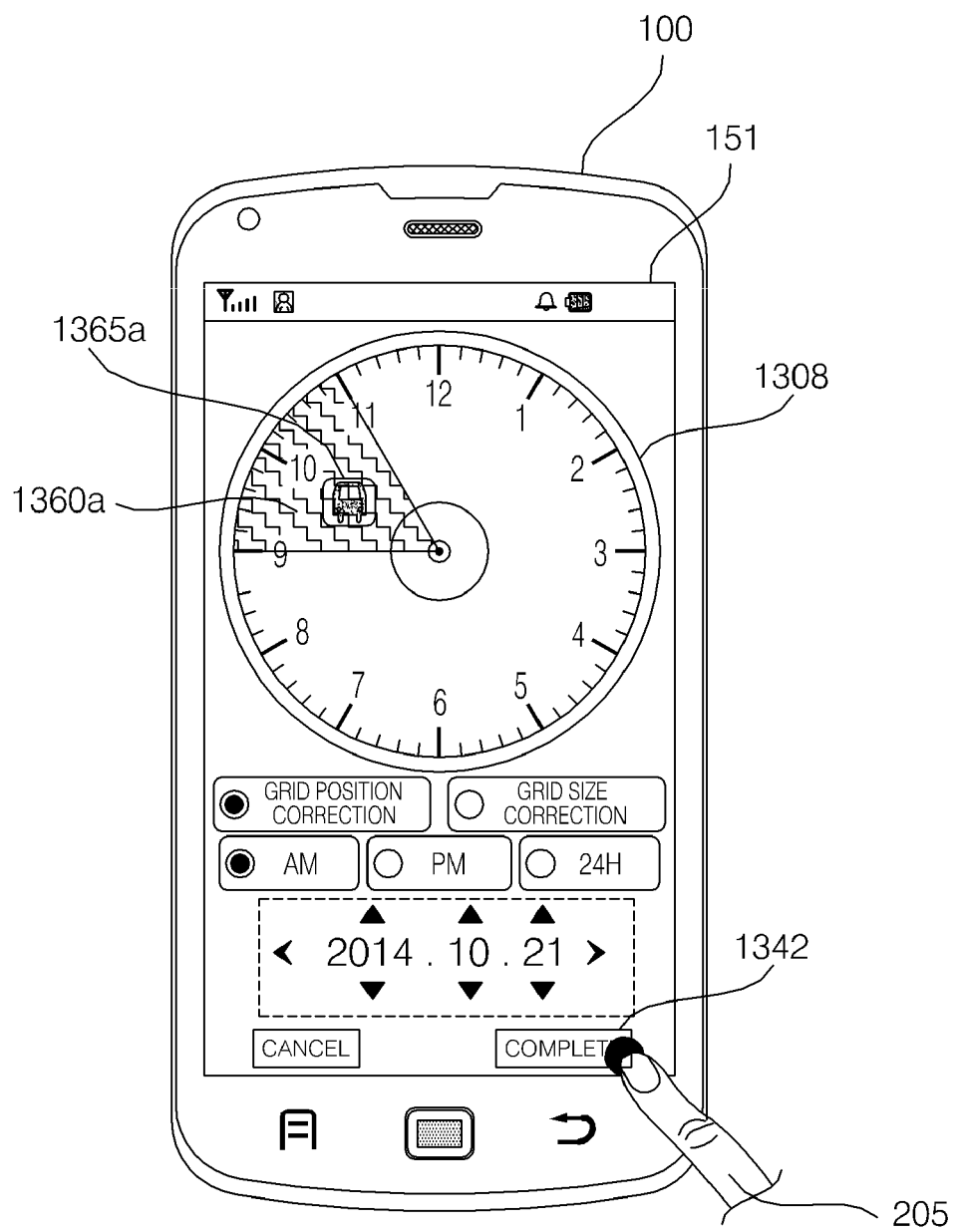
Figure 13J:
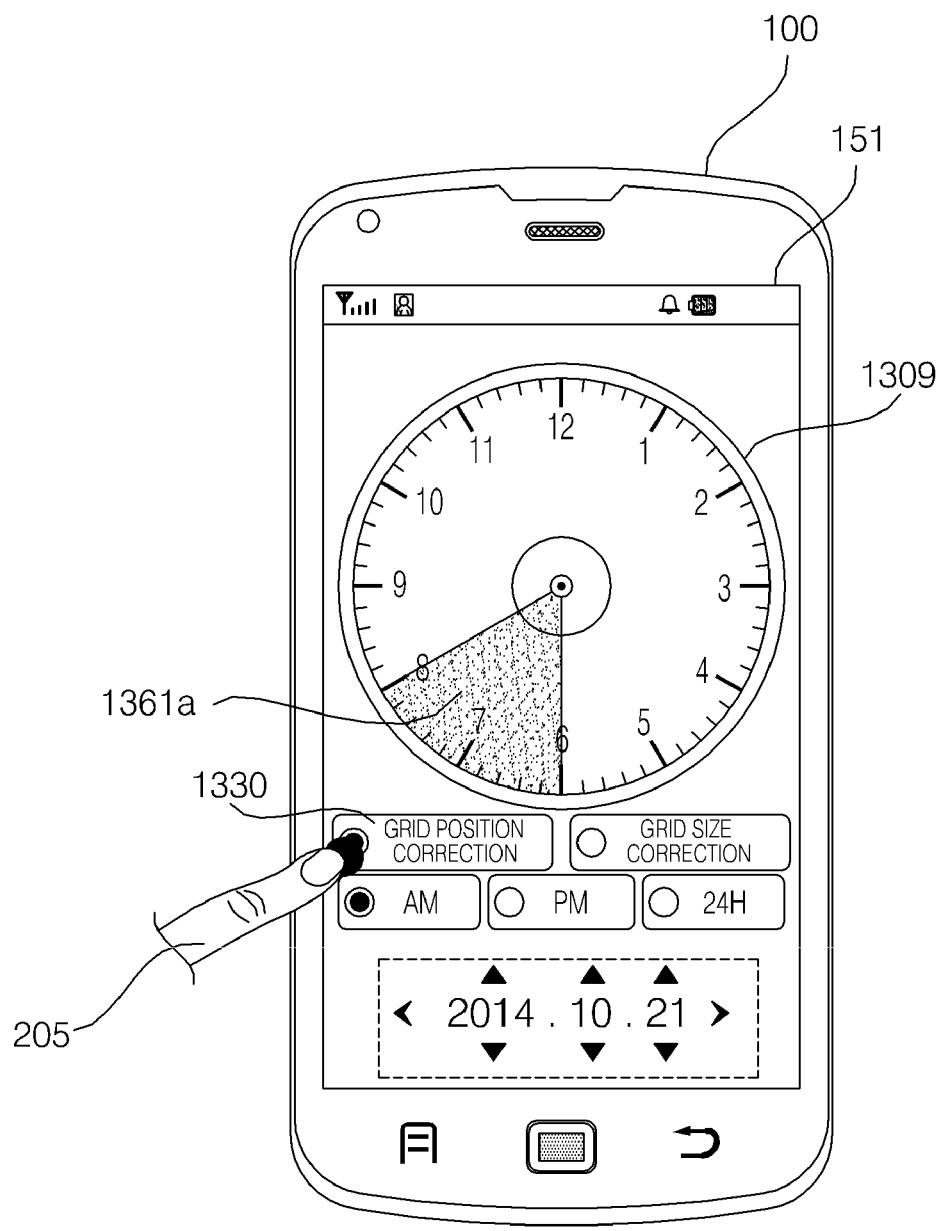
Figure 13K:
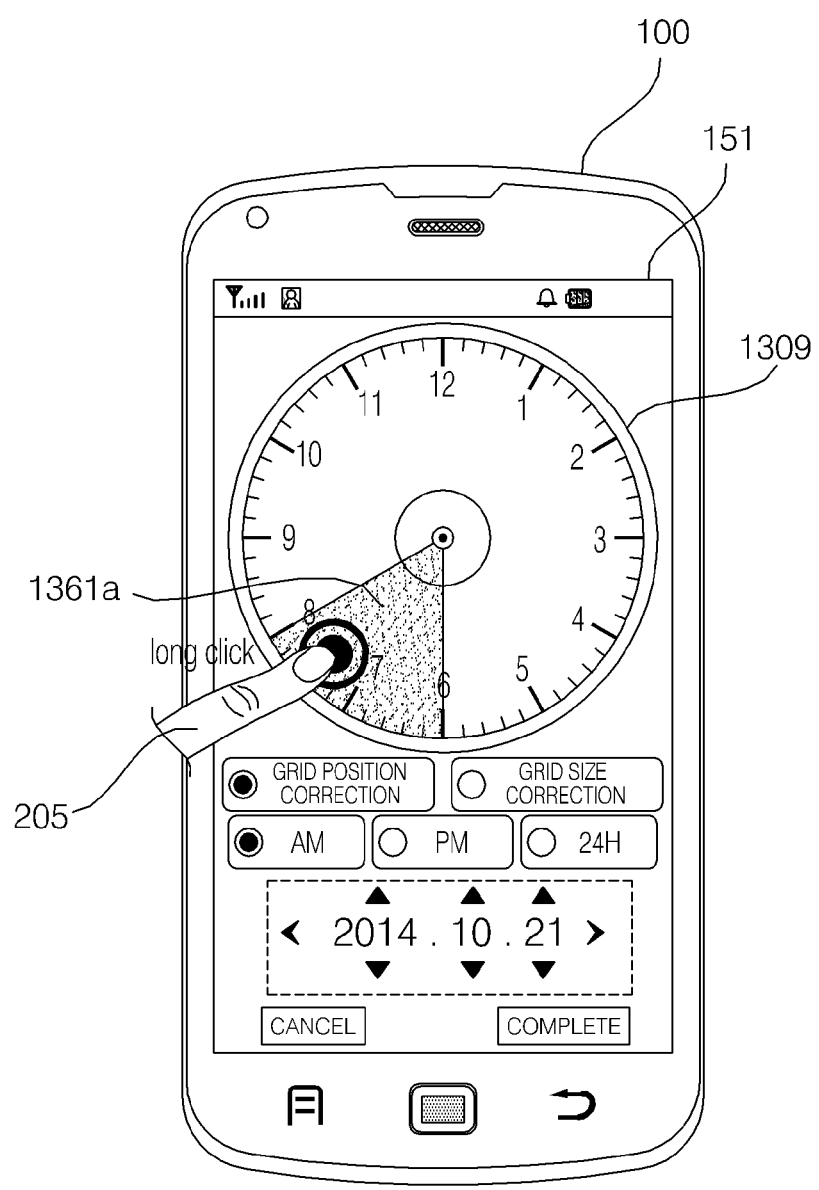
Figure 13L:
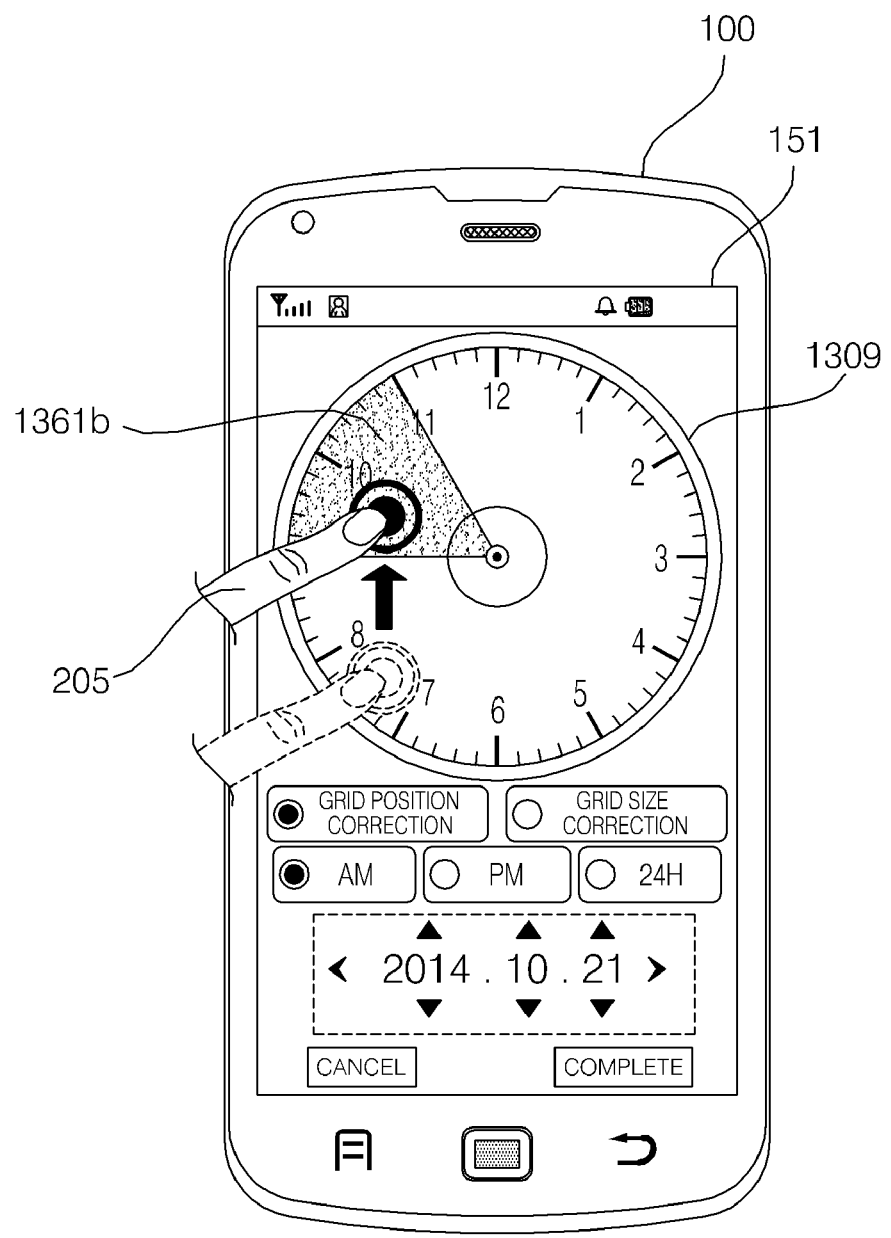
Figure 13M:
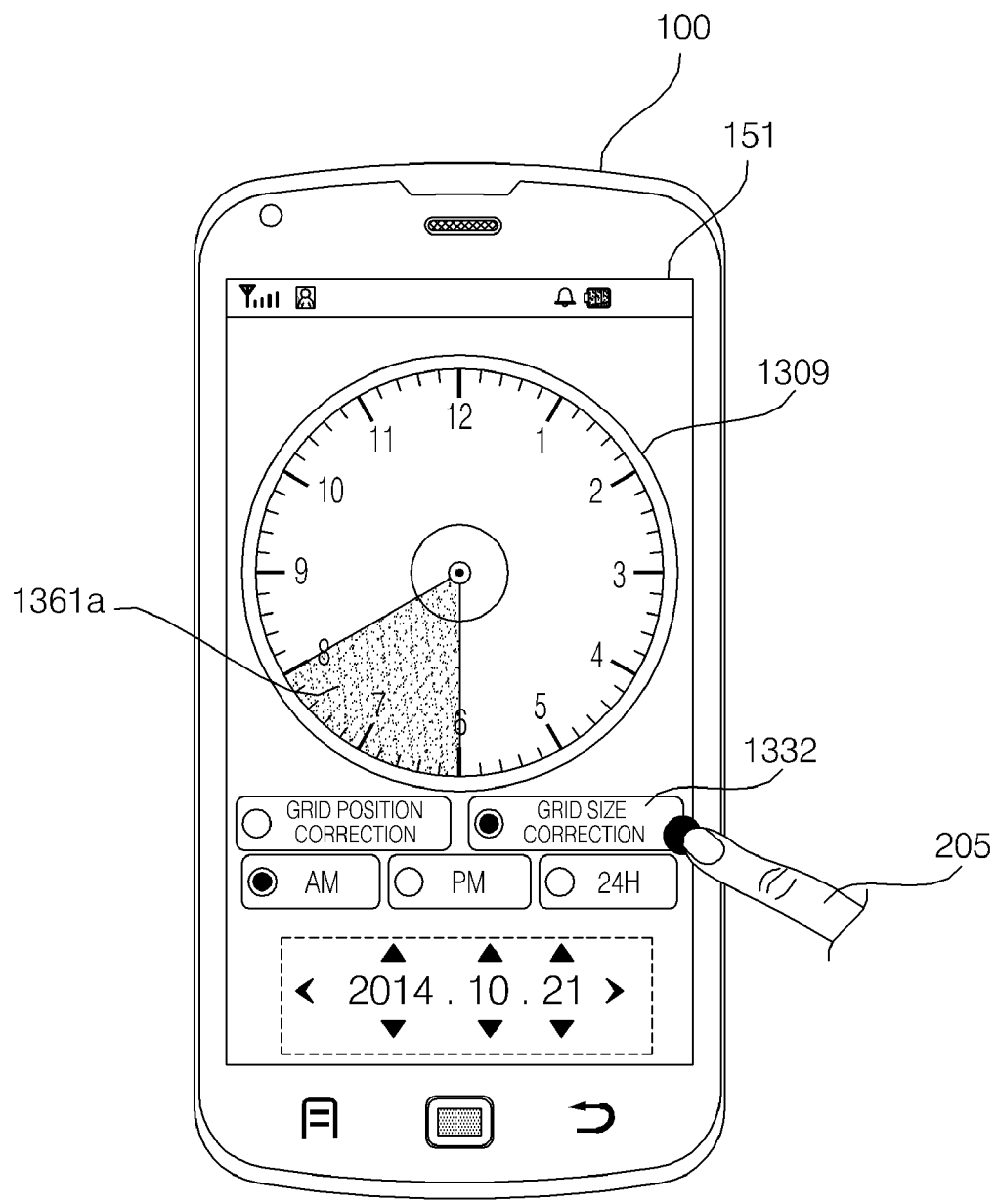
Figure 13N:
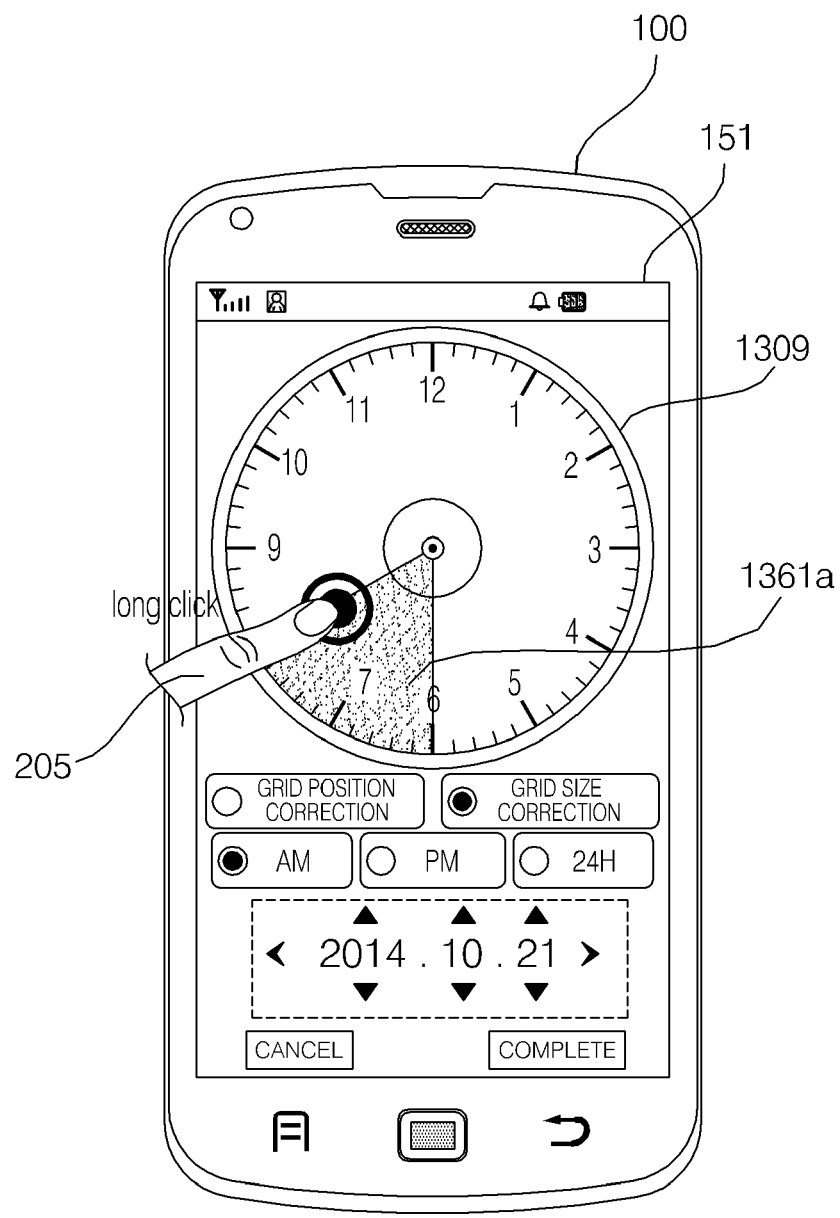
Figure 13O:
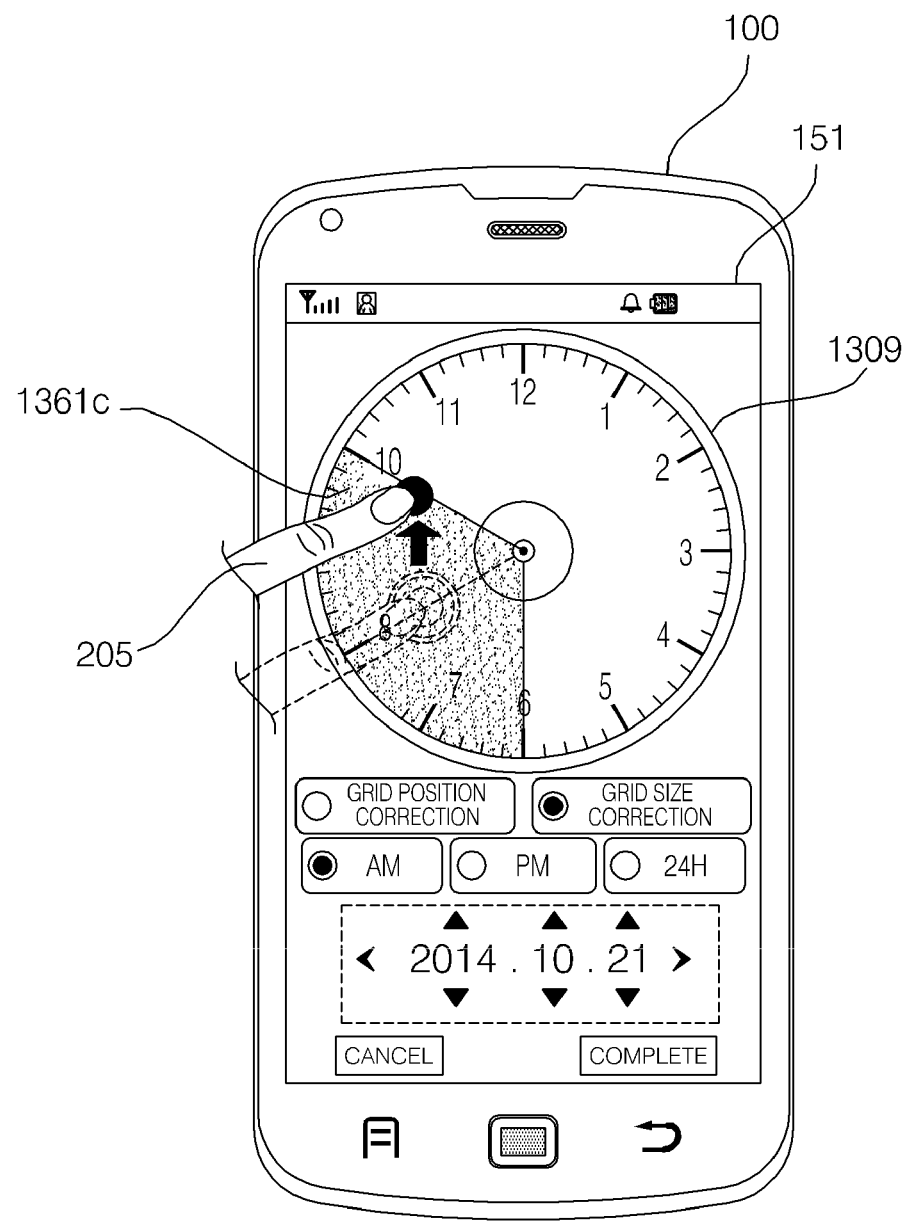

FIGS. 13A to 13O illustrate various operating methods using a day and night object.

First, FIG. 13A illustrates that the user's finger selects a day and night object 1305 in a watch object 1300.

When the day and night object 1305 in the watch object 1300 is selected, the controller 180 may control display of a setting screen related to the watch object 1300.

FIG. 13B illustrates a setting screen related to the watch object 1300.

First, the setting screen may include, for example, a watch object 1301, a grid position correction item 1330, a grid size correction item 1332, an AM item 1334, a PM item 1336, a 24H item 1338, and a date setting item 1340.

The watch object 1301 may include a plurality of regions 1310a and 1320a related to set schedules. In turn, the respective regions may include related application items 1315a and 1325a.

Meanwhile, the controller 180 controls display of a watch object including afternoon schedule information when the PM item 1336 is selected.

FIG. 13C illustrates the case where the PM item 1336 is selected from the setting screen related to the watch object.

Accordingly, a watch object 1303 of FIG. 13C may include a plurality of regions with respect to afternoon schedule information as the PM item 1336 is selected. That is, in the watch object 1303 of FIG. 13C, schedule information related to a region between 1:00 and 3:00 and schedule information related to a region between 7:00 and 8:00 may be displayed respectively.

The watch object 1301 of FIG. 13B includes the regions 1310a and 1320a with respect to morning schedule information, whereas the watch object 1303 of FIG. 13C includes a plurality of regions with respect to afternoon schedule information according to selection of the PM item 1336.

Meanwhile, the controller 180 controls display of a watch object including schedule information for 24 hours upon selection of the 24H item 1338.

FIG. 13D illustrates the case where the 24H item 1338 is selected from the setting screen related to the watch object.

Accordingly, a watch object 1304 of FIG. 13D may include a plurality of regions with respect to schedule information for 24 hours as the 24H item 1338 is selected. That is, in the watch object 1304 of FIG. 13D, schedule information related to a region between 5:00 and 7:00, schedule information related to a region between 9:00 and 11:00, schedule information related to a region between 13:00 and 15:00, and schedule information related to a region between 19:00 and 20:00 may be respectively displayed.

Time region setting and setting of schedule information or related applications on a per set time region basis may be implemented using the watch object 1304 of FIG. 13D.

Meanwhile, upon selection of a completion item, a watch object 1306 for 24 hours may be displayed on a lock screen or a standby screen as exemplarily illustrated in FIG. 13E.

Meanwhile, in the case where the user touches a time axis (for example, the vertical axis) in a watch object and drags the touched axis in, for example, a given direction or in a circular path, the controller 180 may control a time region displayed in the watch object so as to be variable.

Specifically, in the case where the user touches the vertical axis corresponding to 24:00 or the vertical axis corresponding to 12:00 in a time object and drags the time axis rightward or in clockwise, the controller 180 may vary a time of at least one of a right region and a left region of the time object 1304 on the basis of the vertical axis.

For example, in the case where the user touches the vertical axis of the watch object 1304 corresponding to a point of 24:00 and drags the vertical axis rightward or in clockwise, on the basis of the vertical axis, the right region of the watch object 1304 may represent an afternoon time region of the current day (a region between 12:00 and 24:00) and the left region may represent a morning time region of the next day (a region between 0:00 and 12:00). In this way, in addition to the current day, a time region of the next day may be displayed.

On the other hand, when the user touches the point of 24:00 once more and drags the point rightward, the right region of the watch object 1304 may represent a morning time region of the next day (a region from 0:00 to 12:00) and the left region may represent an afternoon time region of the next day (a region from 12:00 to 24:00). In this way, retrieval of a time region of the day after the current day may be simply implemented.

The above-described time region retrieval function may be applied to a 12-hour watch object, in addition to the 24-hour watch object 1304.

Simultaneously with performing the above-described time retrieval, setting schedule information or related applications with respect to a specific time region is possible.

Meanwhile, when the user designates two points in a watch object using two fingers 205a and 205b in a state in which a setting screen as exemplarily illustrated in FIG. 13F is displayed, the controller 180 may set a region between the two points to, for example, a schedule region. Then, the controller 180 may set schedule information or a related application with respect to the set region. This will be described below with reference to FIGS. 13F to 13I.

FIG. 13F illustrates setting of a region in a watch object.

As exemplarily illustrated in FIG. 13F, when the user designates two points Pa and Pb (for example, a point of 9:00 and a point of 11:00) in a watch object using two fingers 205a and 205b, a region between the two points may be set to a schedule region 1360.

Meanwhile, in a state in which the schedule region 1360 has been set, when there is a touch input to the corresponding schedule region 1360 as exemplarily illustrated in FIG. 13G, a schedule setting screen 1370 as exemplarily illustrated in FIG. 13H may be displayed.

The schedule screen 1370 may include, for example, a schedule title and content item 1371, a schedule repetition setting item 1372, a repetition period setting item 1373, an application list 1374 including a bus application item 1378, a toss item 1377, and a completion item 1379.

Schedule repetition setting may be implemented via the schedule repetition setting item 1372, and an application to be executed in a corresponding time region 1360a may be set via selection of the application in the application list 1374.

In addition, a schedule of the user of the mobile terminal 100 may be transmitted to other users via the toss item 1377. In particular, schedule information with respect to the corresponding time region 1360a may be transmitted to other users. In this way, the user can share their schedule information with others.

On the other hand, upon selection of the toss item 1377, in addition to the schedule information with respect to the corresponding time region 1360a, related application item information may be transmitted. In this way, the user can share the related application information as well as their schedule information with others.

For example, in the case where a shared application is a phone call application or an SNS application, a toss function enables automated execution of a corresponding application between different users. In this way, rapid execution of the related application between the users is possible.

Meanwhile, the user can receive schedule information, or both schedule information and application information from other users. Based on a user approval, the controller 180 may control schedule information or both schedule information and application information received from other users so as to be reflected in a corresponding time region of a watch object 1308 thereof.

Meanwhile, when the completion item 1379 is selected, as exemplarily illustrated in FIG. 13I, a bus application item 1365a associated with the corresponding time region 1360a may be displayed.

Next, when a completion item 1342 of FIG. 13I is selected, the setting item ends and setting in a home screen, a standby screen, or a lock screen is completed. Thereby, a watch object in which a region between 9:00 and 11:00 is associated with a bus application item may be displayed.

Meanwhile, when the grid position correction item 1330 is selected from the setting screen, the controller 180 may control correction in the position of a grid. This will be described below with reference to FIGS. 13J to 13L.

FIG. 13J illustrates that the grid position correction item 1330 is selected from the setting screen including a watch object 1309. In this way, movement of a region in the watch object 1309 is possible.

FIG. 13K illustrates the case where the user's finger 205 inputs a long click to a region 1361a between 6:00 and 8:00 in the watch object 1309. In this way, movement of a region in the watch object 1309 is possible.

Meanwhile, when the user inputs a long click to the region 1361a in the watch object 1309 and thereafter drags the region 1361a upward, the controller 180 controls a schedule so as to be moved to a time region corresponding to a dragged position.

FIG. 13L illustrates that the user 205 inputs a long click to the region 1361a between 6:00 and 8:00 and thereafter drags the region 1361a upward.

Thereby, a region 1361b between 9:00 and 11:00 is newly set. In particular, the region 1361a between 6:00 and 8:00 is moved and set to the region 1361b between 9:00 and 11:00.

That is, schedule information and an application item set in the region 1361a between 6:00 and 8:00 are moved to and set in the region 1361b between 9:00 and 11:00. In this way, schedule information and the like may be simply moved to a desired time region.

Meanwhile, when the grid size correction item 1332 is selected from the setting screen, the controller 180 may control correction in the size of a grid. This will be described below with reference to FIGS. 13M to 13O.

FIG. 13M illustrates that the grid size correction item 1332 is selected from the setting screen including the watch object 1309. In this way, change in the size of a region in the watch object 1309 is possible.

FIG. 13N illustrates the case where the user's finger 205 inputs a long click to the region 1361a between 6:00 and 8:00 in the watch object 1309. In this way, change in the size of a region in the watch object 1309 is possible.

Meanwhile, in the case where the user inputs a long click to the region 1361a in the watch object 1309 and thereafter drags any one point in the region 1361a upward, the controller 180 controls the region 1361a so as to be increased to a point corresponding to a dragged position.

FIG. 13O illustrates that the user's finger 205 inputs a long click to a point of 8:00 in the region 1361a and thereafter drags the point upward.

As such, a region 1361c between 6:00 and 10:00 is newly set. That is, the size of the region 1361c is increased.

That is, schedule information and an application item set in the region 1361a between 6:00 and 8:00 of FIG. 13N are also set in the increased region 1361c between 6:00 and 10:00. In this way, a region may be simply changed in size to a desired time region.

Figure 13P:
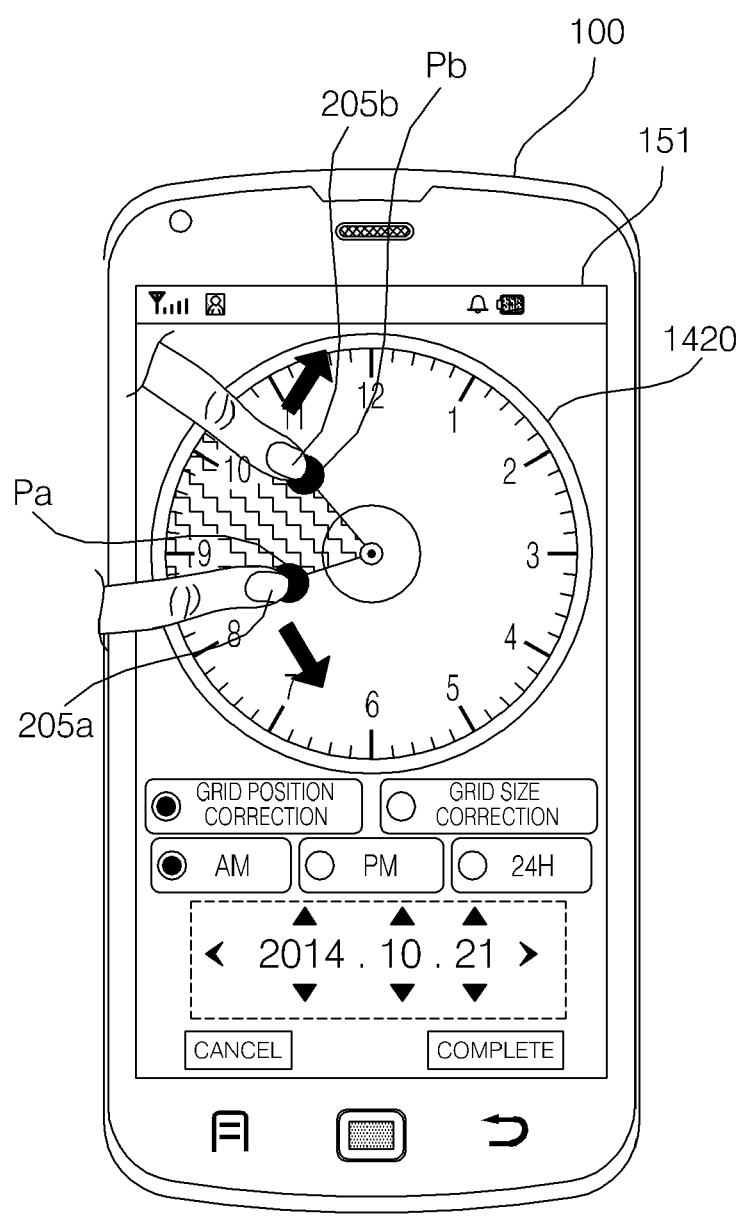
Figure 13Q:
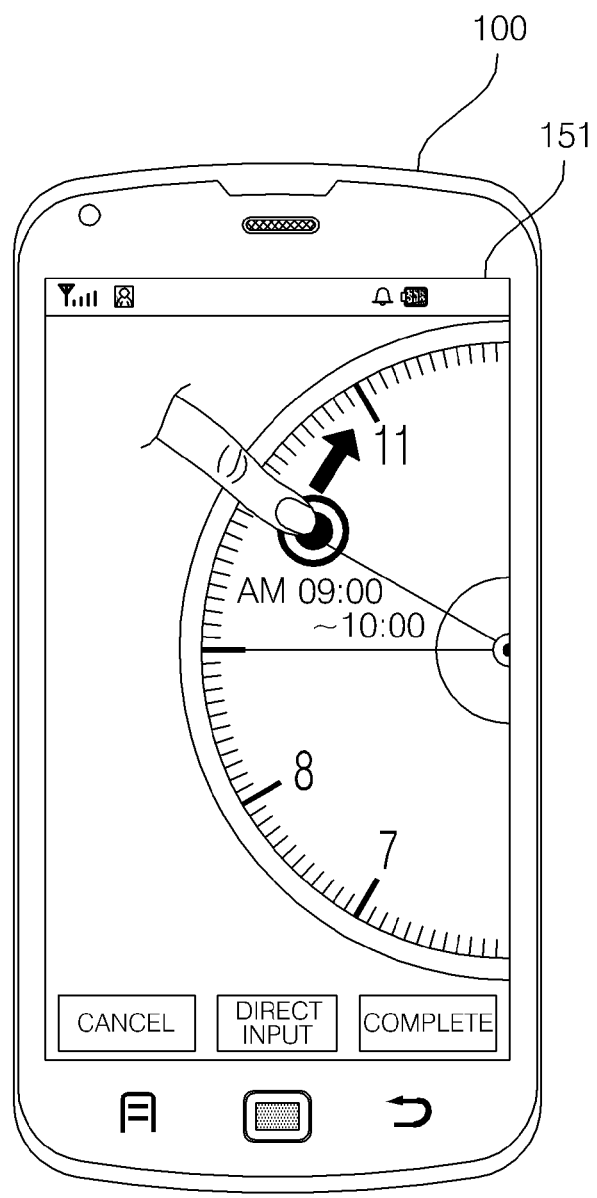
Figure 13R:
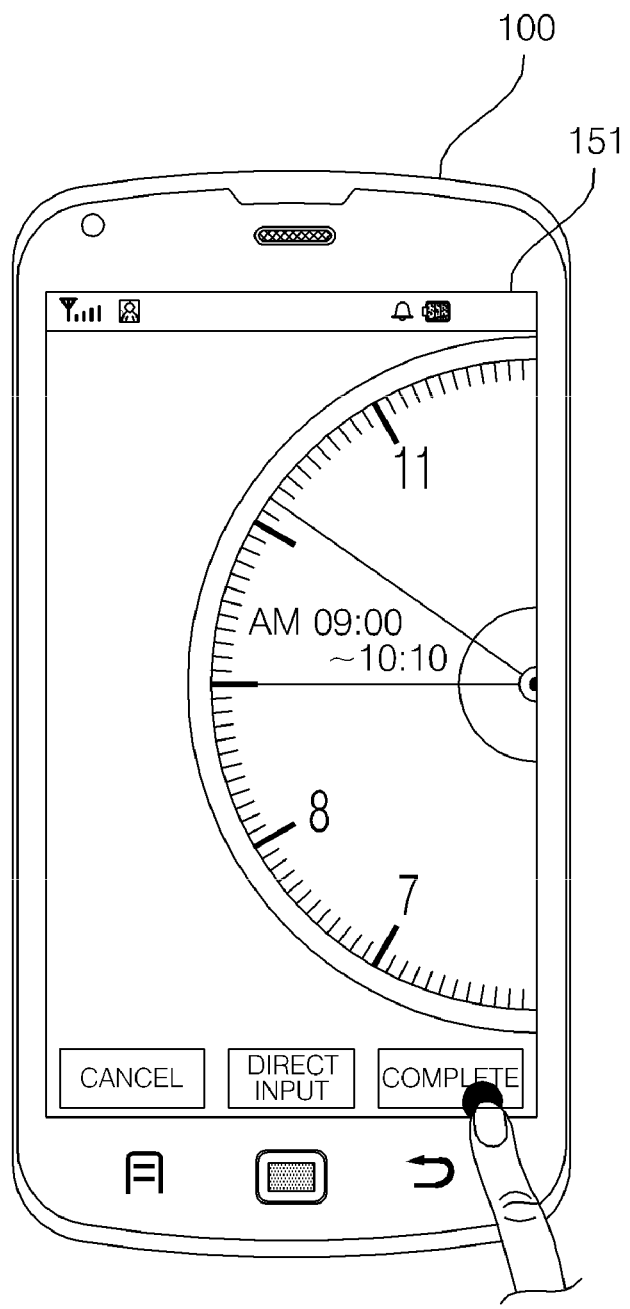

FIGS. 13P to 13R illustrate another exemplary schedule setting with respect to a prescribed region in a watch object.

First, as exemplarily illustrated in FIG. 13P, when the user touches and spreads two points Pa and Pb (a point of 9:00 and a point of 10:00) in a watch object 1420 using two fingers 205a and 205b in a state in which a setting screen is displayed, the controller 180 may control display of an enlarged watch object as exemplarily illustrated in FIG. 13Q. As exemplarily illustrated in FIG. 13Q, only a portion of the enlarged watch object is displayed. In particular, the watch object may be enlarged about the touched two points (the point of 9:00 and the point of 10:00).

At this time, the controller 180 may highlight a partial time region (a region between 9:00 and 10:00).

On the other hand, when the user touches, for example, a point representing a 10:00 region of a partial time region and drags the point in a direction toward a 11:00 region, the controller 180 may control a highlight target time region so as to be increased from a region between 9:00 and 10:00 to a region between 9:00 and 11:00.

In conclusion, as exemplarily illustrated in FIG. 13Q, setting of a time region in the watch object 1420 may be more precisely implemented.

Meanwhile, when a completion item is selected after completion of setting as exemplarily illustrated in FIG. 13R, the mobile terminal 100 may return to the screen of FIG. 13P. Thereafter, schedule information or a related application with respect to the set time region may be set in response to a user input.

Meanwhile, in addition to the toss item 811 in the setting screen of FIG. 8D or the toss item 1377 in the setting screen of FIG. 13H, when a schedule information transmission item is selected in a state in which a conversation window is displayed, the controller 180 may control transmission of schedule information to another user. This will be described below with reference to FIGS. 14A to 14G.

Figure 14A:
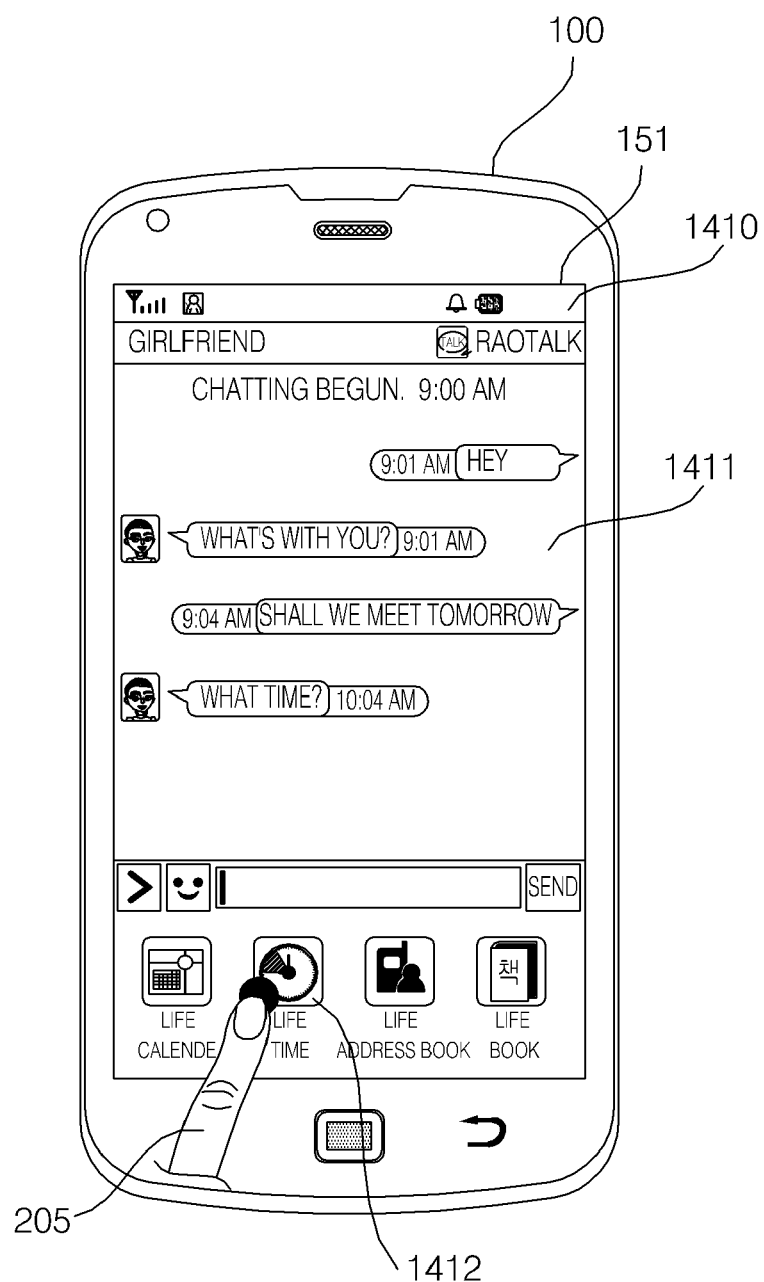

FIG. 14A illustrates that an SNS application is executed and an application screen including a conversation window 1410 is displayed on the display unit 151.

At this time, in addition to the conversation window 1410, an application list related to a schedule may be displayed below the conversation window 1410.

When the user wishes to transmit schedule information through the conversation window 1410 while having a talk with another user, the user may select a related application item 1412 from the application list.

The related application item 1412 may be an application item related to a watch object as described above.

Figure 14B:
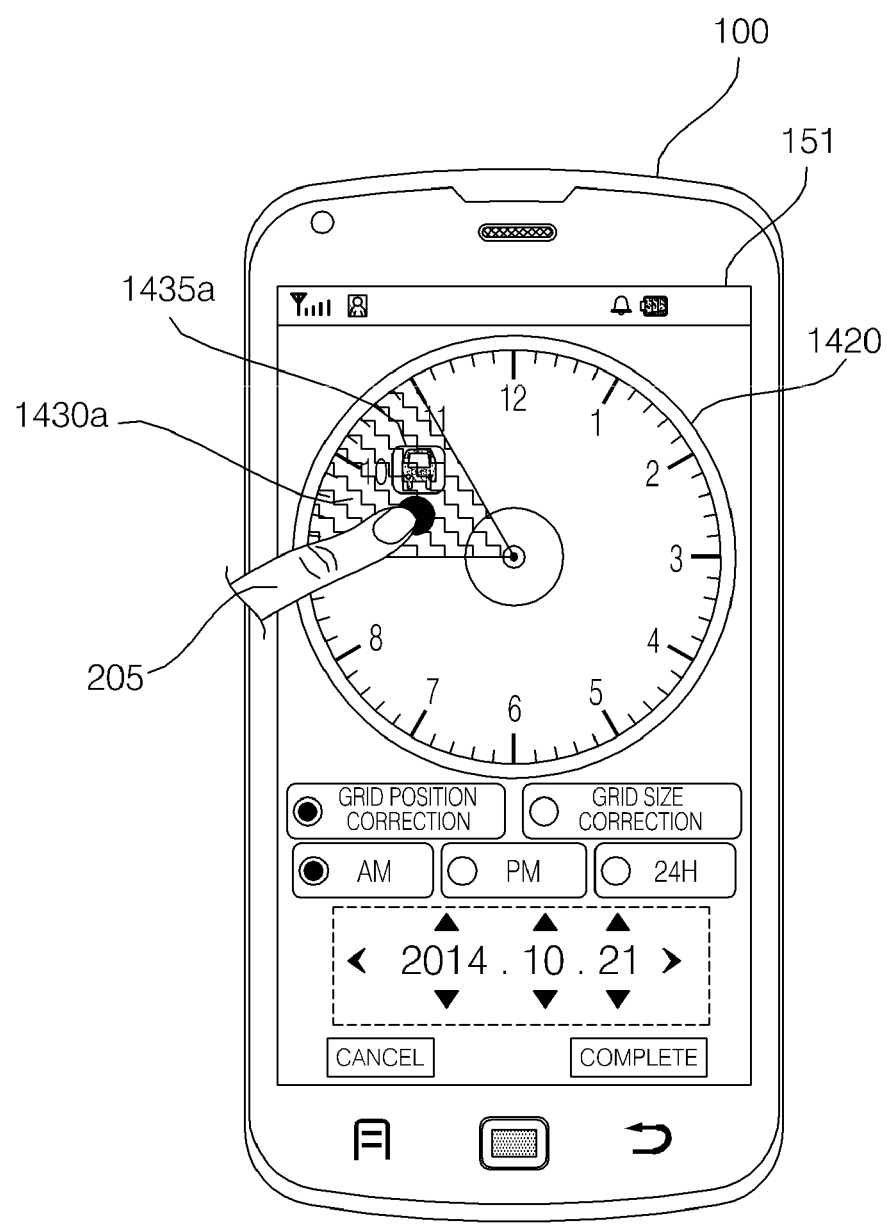

When the related application item 1412 is selected, the controller 180 may perform screen switching from the displayed conversation window so as to display a screen including the watch object 1420 as exemplarily illustrated in FIG. 14B.

Then, when the user's finger 205 touches a region 1430a of the watch object 1420 in which a schedule is set, schedule information corresponding to the region 1430a may be selected as schedule information to be transmitted to another user.

Figure 14C:
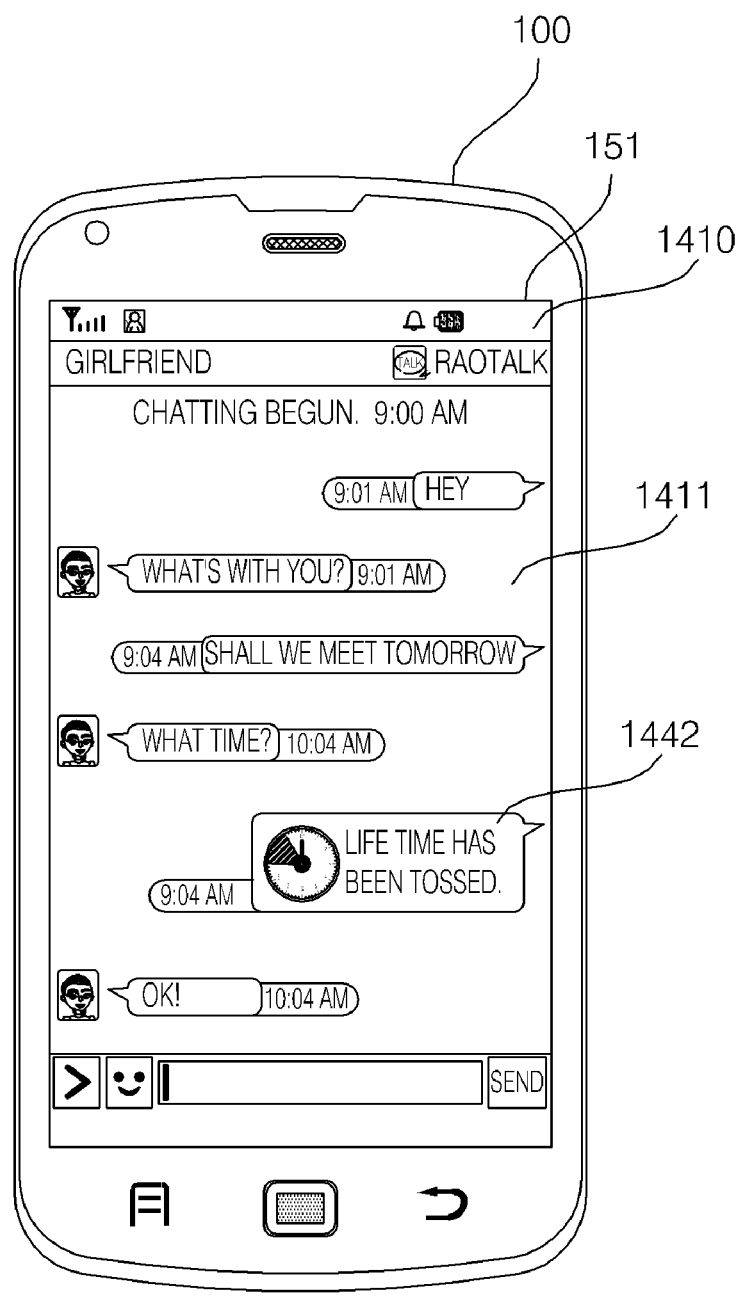

In this way, as exemplarily illustrated in FIG. 14C, an object 1442 representing selected schedule information may be displayed on the conversation window 1410. That is, the mobile terminal 100 may perform wireless transmission of selected schedule information to a terminal of a conversation partner.

Meanwhile, the transmission target schedule information may include time information and application information corresponding to the time information.

The object 1422 that represents the selected schedule information may include a watch icon representing a schedule time as exemplarily illustrated in FIG. 14C. In this way, the user of the mobile terminal 100 may simply check sketchy time information of the transmitted schedule information.

Figure 14D:
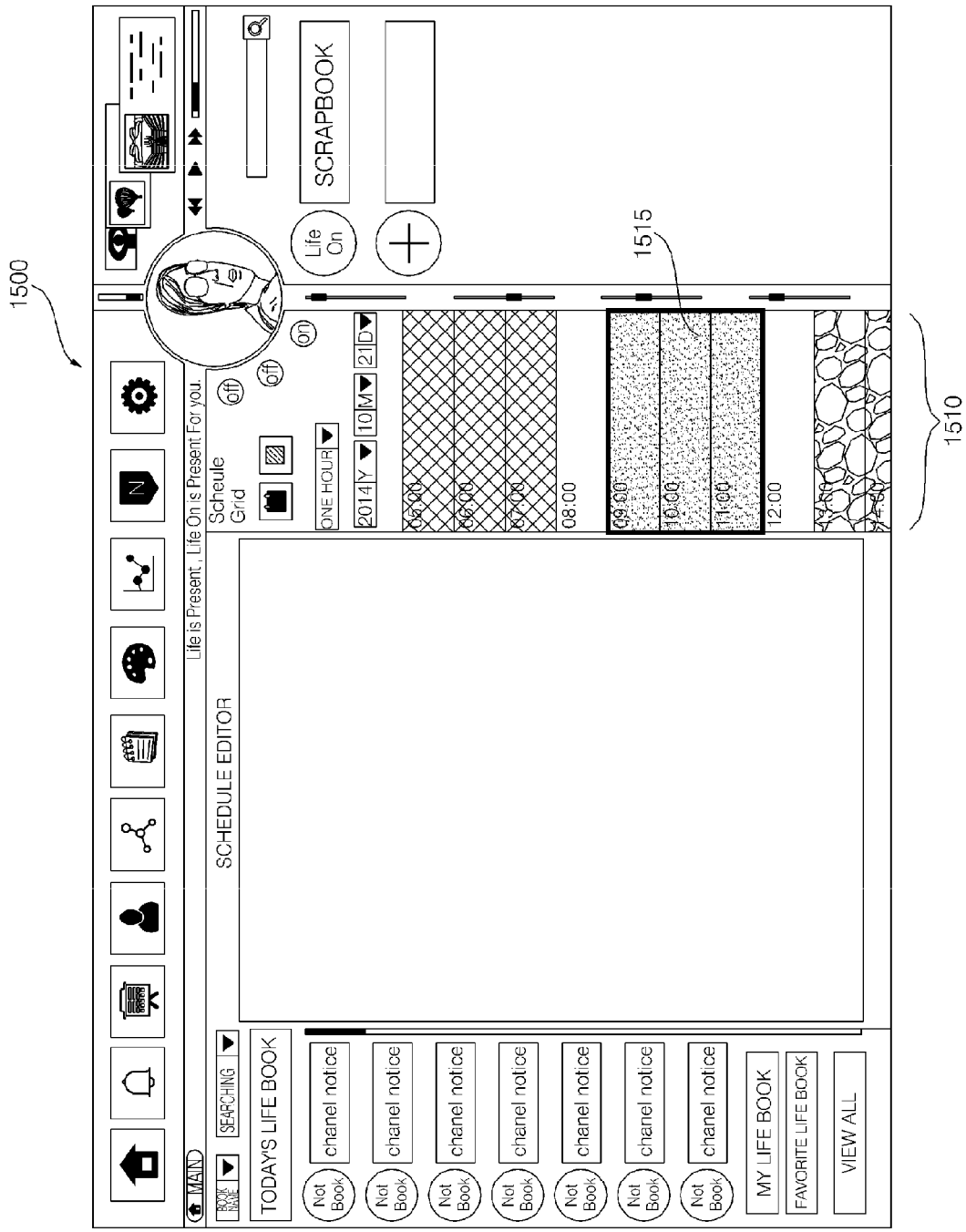

In the case where the terminal of the conversation partner is a tablet PC, as exemplarily illustrated in FIG. 14D, a region 1515 between 9:00 and 11:00 may be displayed in a highlighted state on a schedule screen of the tablet PC.

That is, when one user approves reception of schedule information transmitted from the other user, the user can add the schedule information to their schedule. In this way, different users can simply share their schedule information.

Meanwhile, the controller 180 may control a watch object and a calendar object so as to be displayed together. In particular, when a specific date of the calendar object is selected, the controller 180 may control corresponding schedule information so as to be displayed in the watch object.

Figure 14E:
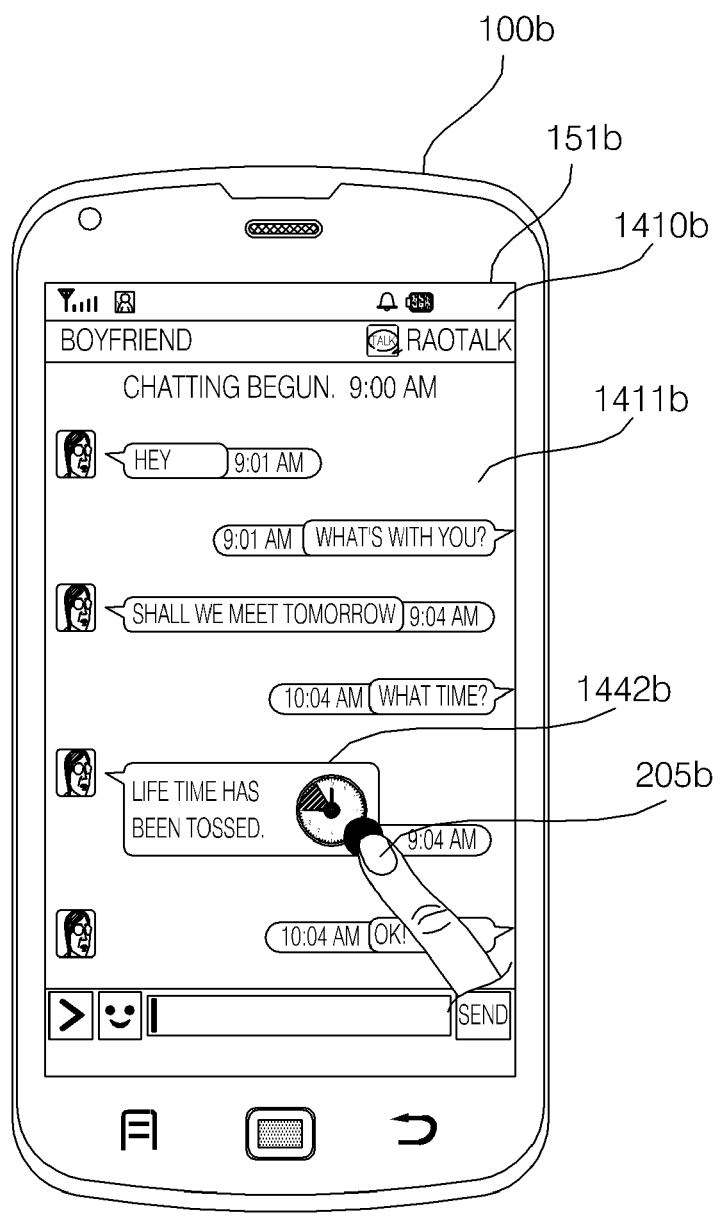

FIG. 14E illustrates that a conversation window 1410b is displayed on a mobile terminal 100b of a second user who is a conversation partner of a first user who owns the mobile terminal 100 as illustrated in FIG. 14C.

When the mobile terminal 100b of the second user receives schedule information as the selected schedule information is transmitted as illustrated in FIG. 14C, the conversation window 1410b of the mobile terminal 100b of the second user may display an object 1442b representing reception of the schedule information as illustrated in FIG. 14E.

At this time, the object 1442b representing reception of schedule information may include a watch icon representing a schedule time. In this way, the second user can simply check sketchy time information of the transmitted schedule information.

Meanwhile, when the mobile terminal 100b of the second user receives schedule information as the selected schedule information is transmitted as illustrated in FIG. 14C, the schedule information of the first user may be automatically reflected in a watch object of the second user.

Figure 14F:
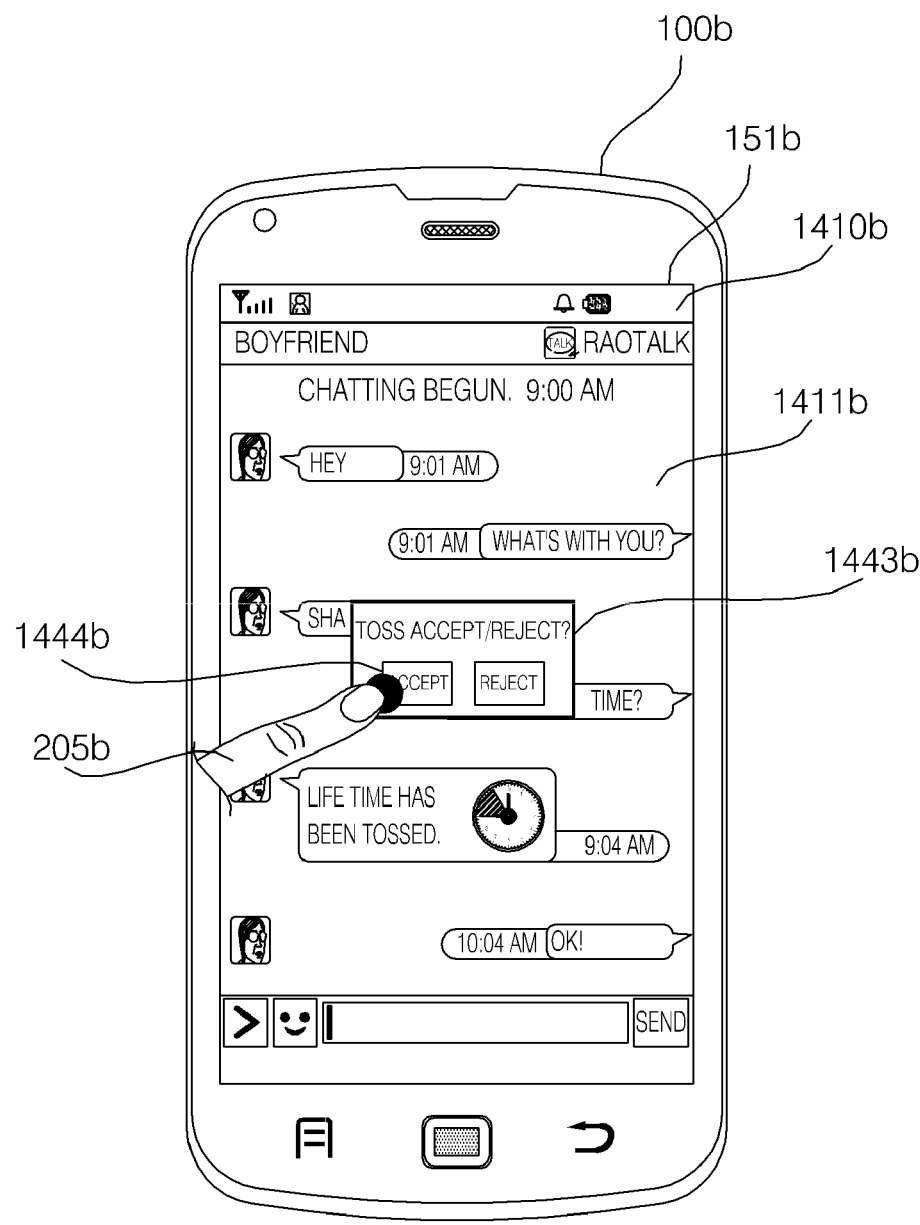
Figure 14G:
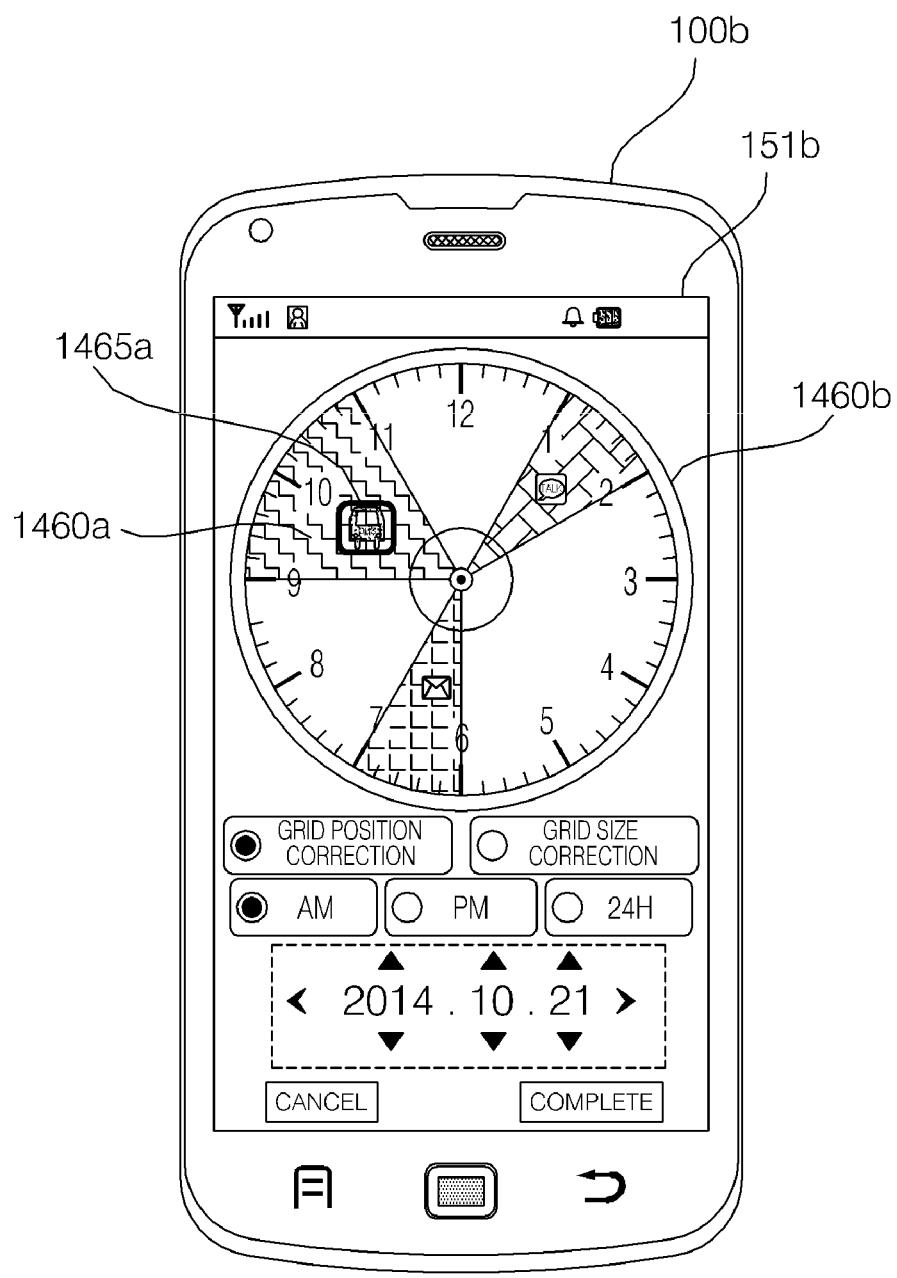

For example, when the user's finger 205*b* inputs a touch to the object 1442*b* representing reception of schedule information, a watch object 1460*b* of FIG. 14G may be displayed.

As exemplarily illustrated in FIG. 14G, in addition to schedule information (between 6:00 to 7:00 and between 1:00 and 2:00) of the second user, schedule information 1460*a* of the first user may be added to the watch object 1460*b* displayed on the mobile terminal 100*b* of the second user.

FIG. 14G illustrates that the schedule information 1460*a* includes time information corresponding to a region between 9:00 and 11:00 and an execution target application item 1465*a* related to the corresponding time region.

In this way, according to transmission and reception of schedule information, sharing of schedule information between a plurality of users and, more particularly, between mobile terminals used by a plurality of users is possible.

Meanwhile, when the mobile terminal 100*b* of the second user receives schedule information as the selected schedule information is transmitted as illustrated in FIG. 14C, schedule information of the first user may be manually reflected in a watch object of the second user.

For example, when the mobile terminal 100*b* of the second user receives schedule information as the selected schedule information is transmitted as illustrated in FIG. 14C, as exemplarily illustrated in FIG. 14F, an object 1443*b* that represents acceptance or rejection with respect to the received schedule information may be displayed on the mobile terminal 100*b* of the second user.

When an acceptance item 1444*b* in the object 1443*b* is selected, a watch object 1460*b* may be displayed as exemplarily illustrated in FIG. 14G.

As the object 1443*b* is displayed, the second user may reflect only a desired schedule in the watch object 1460*b*.

Meanwhile, when a current time reaches 9:00 after reflection of the schedule information 1460*a*, the schedule information may be displayed on the mobile terminal 100*b* of the second user illustrated in FIG. 14G, or a traffic related application corresponding to the application item 1465*a* may be executed to display an application screen on the mobile terminal 100*b*.

With sharing of schedule information as described above, other electronic devices or external devices may be controlled to execute a related application. At this time, in addition to mobile terminals, the electronic devices or external devices may be, for example, a TV, an air conditioner, a washing machine, a cooking appliance, a robot cleaner, a temperature adjustment device in a building, a lighting device in a building, and a gas supply device.

For example, based on schedule information transmitted from the mobile terminal, a TV, an air conditioner, a washing machine, a cooking appliance, a robot cleaner, a temperature adjustment device in a building, a lighting device in a building, and a gas supply device may be powered on or powered off.

In another example, a recording application is included in schedule information and transmitted to a TV, the TV may automatically record a broadcast of a specific channel at a corresponding time after receiving the corresponding schedule information.

In another example, when a cleaning application is included in schedule information and transmitted to a robot cleaner, the robot cleaner may perform cleaning in a building according to a preset course and time.

In a further example, a temperature adjustment application is included in schedule information and transmitted to a temperature adjustment device, the temperature adjustment device may perform temperature adjustment according to a preset temperature and time.

Figure 15A:
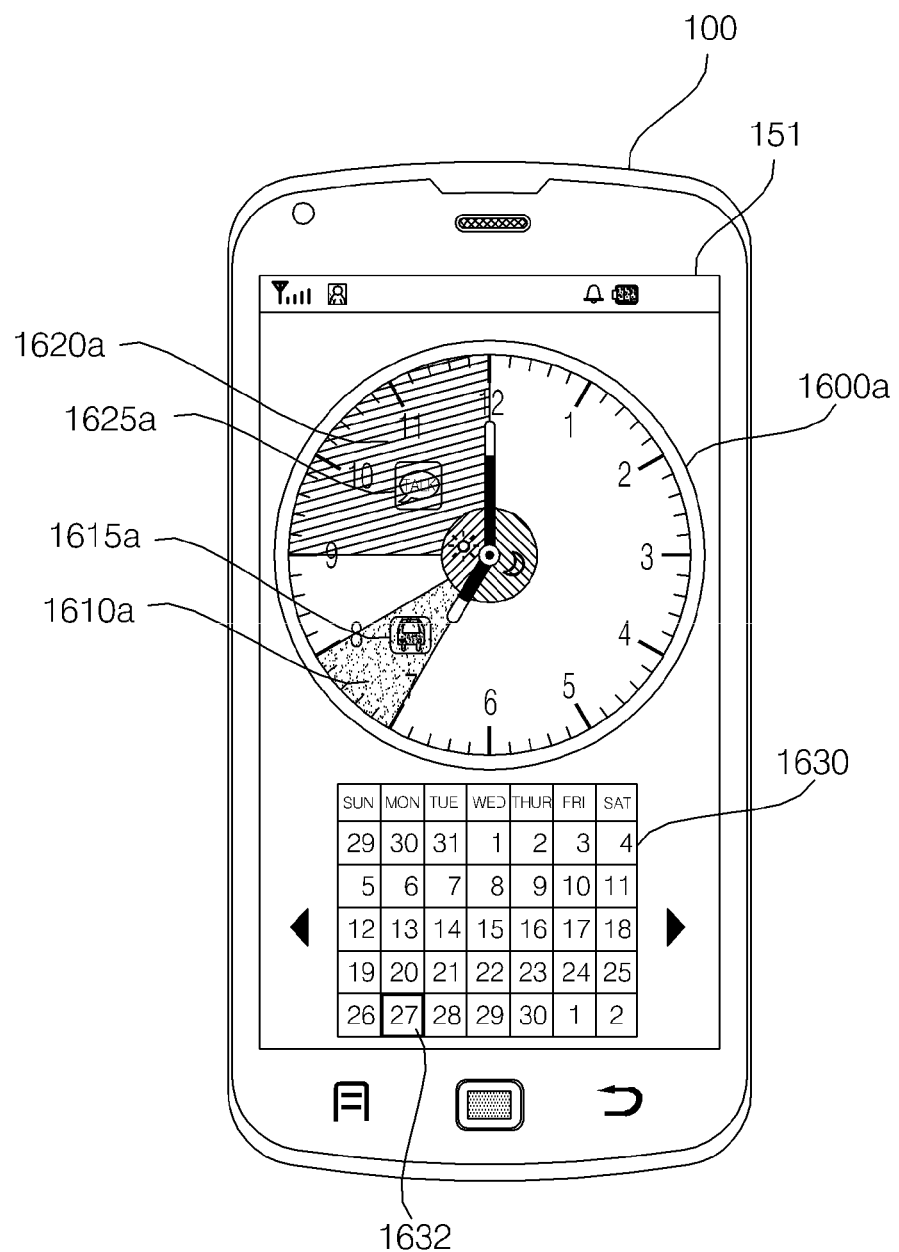
Figure 15B:
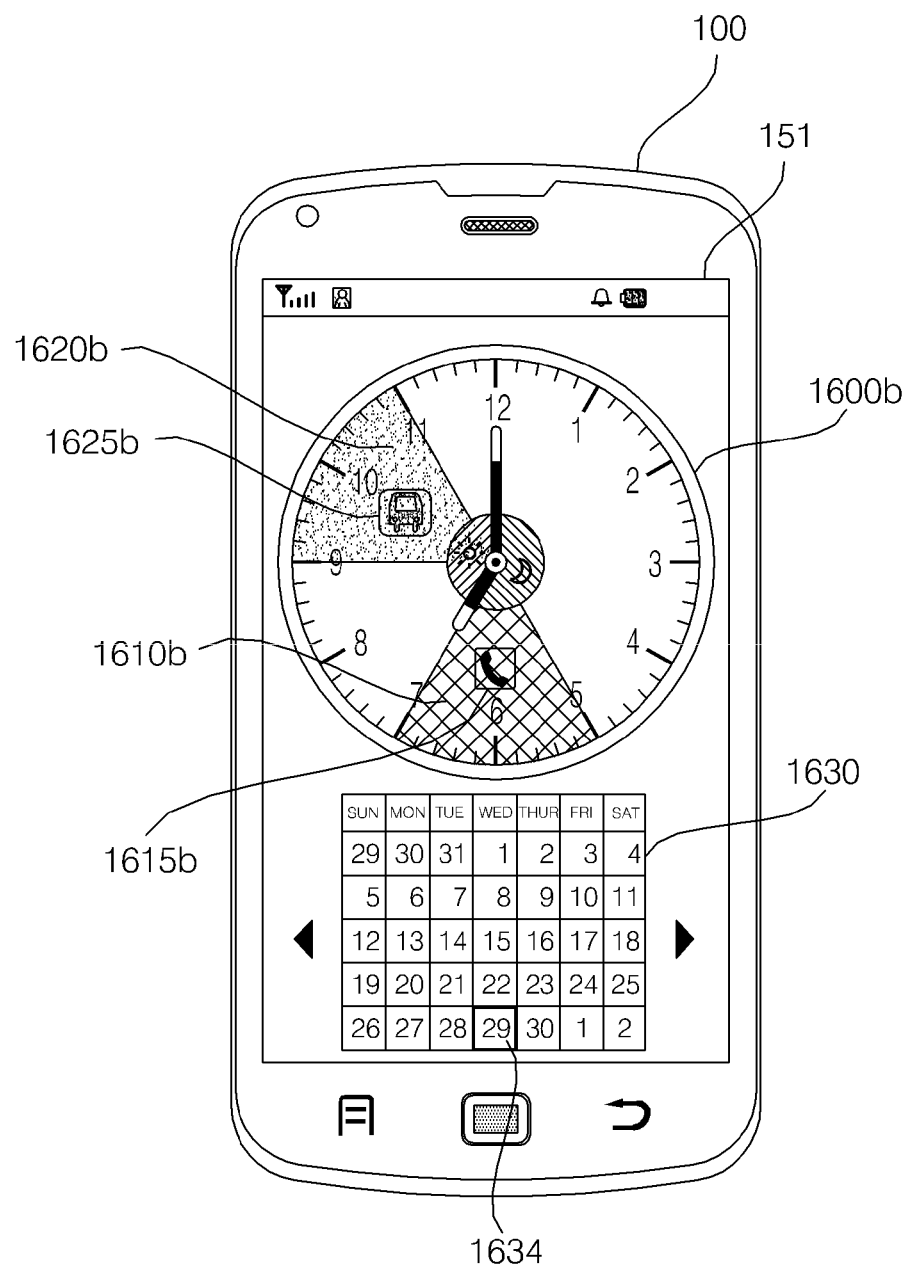

FIGS. 15A and 15B illustrate a screen including a watch object and a calendar object.

At this time, the screen may be a lock screen or a standby screen. Alternatively, the screen may be a home screen.

FIG. 15A illustrates one example of a watch object 1600*a* and a calendar object 1630.

The calendar object 1630 may exemplify a month based calendar. On the other hand, the watch object 1600*a* may display schedule information on the basis of a specific date in the calendar object 1630.

FIG. 15A illustrates the watch object 1600*a* including schedule information with respect to a $27^{th}$ item 1632 in the calendar object 1630.

The watch object 1600*a* illustrates that first schedule information and a related application item 1615*a* are included in a first region 1610*a* between 7:00 and 8:00 and second schedule information and a related application item 1625*a* are included in a second region 1620*a* between 9:00 and 12:00.

FIG. 15B illustrates another example of a watch object 1600*b* and the calendar object 1630.

The watch object 1600*b* as exemplarily illustrated in FIG. 153 includes schedule information with respect to a $29^{th}$ item 1634 in the calendar object 1630. In response to user selection or upon change of a date, the watch object 1600*b* as illustrated in FIG. 15B may be displayed.

The watch object 1600*b* illustrates that schedule information and a related application item 1615*b* are included in a region between 5:00 and 7:00 and schedule information and a related application item 1625*b* are included in a region 1620*b* between 9:00 and 11:00.

Meanwhile, the controller 180 may control schedule information with respect to a watch object so as to be synchronized with an application and to be displayed.

Figure 16:
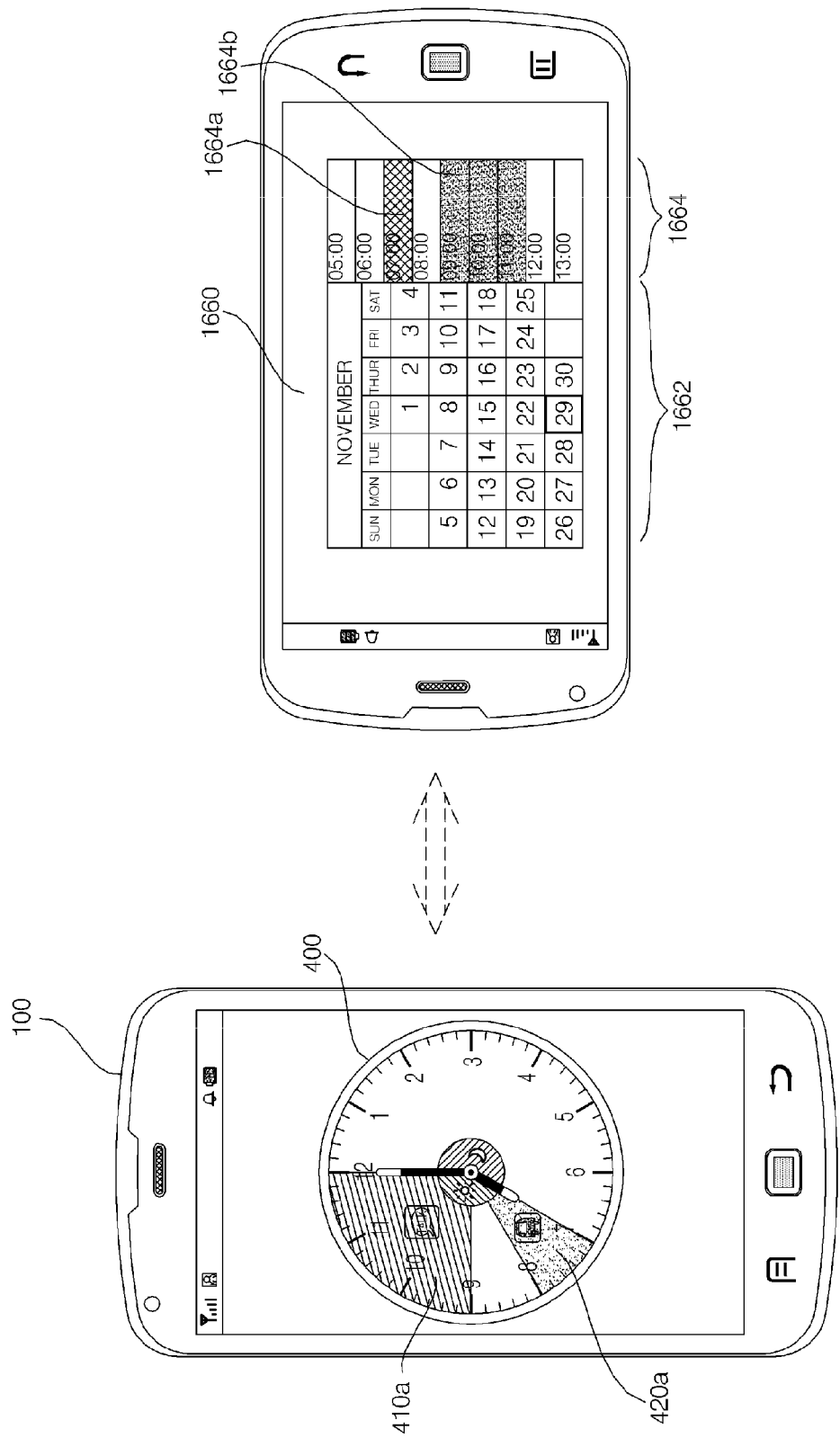

FIG. 16 illustrates the case where the watch object 400 is displayed on the mobile terminal 100 and the case where a schedule related application screen 1660 is displayed on the mobile terminal 100.

The watch object 400 and a schedule related application may be separate applications. When the watch object 400 and the schedule related application are set so as to be synchronized with each other, the watch object 400 and the schedule related application may share data in a synchronized state.

For example, when schedule information with respect to a specific date is completely input through the schedule related application screen 1660, the corresponding schedule information may be transmitted to the watch object 400, thereby allowing the watch object 400 to display the corresponding schedule information.

As exemplarily illustrated in FIG. 16, the schedule related application screen 1660 includes a calendar object 1662 and a schedule object 1664.

After any one date of the calendar object 1662 is designated, the user can input their schedule information with respect to each time zone in the schedule object 1664. Then, after completion of input of the schedule information, the schedule information may be automatically transmitted to the watch object 400.

Although the watch objects as described above in FIGS. 5A to 16 have been described as being displayed on a portion of a standby screen, a lock screen or a home screen of the mobile terminal 100, a circular watch object may be displayed on a full screen.

For example, in the case of a wearable digital watch, various pieces of information may be displayed on a circular display unit. Accordingly, the watch objects as described above in FIGS. 5A to 16 may be displayed on a full screen of the circular display unit. That is, the above description of FIGS. 5A to 16 may be applied to all wearable digital watches.

Figure 17A:
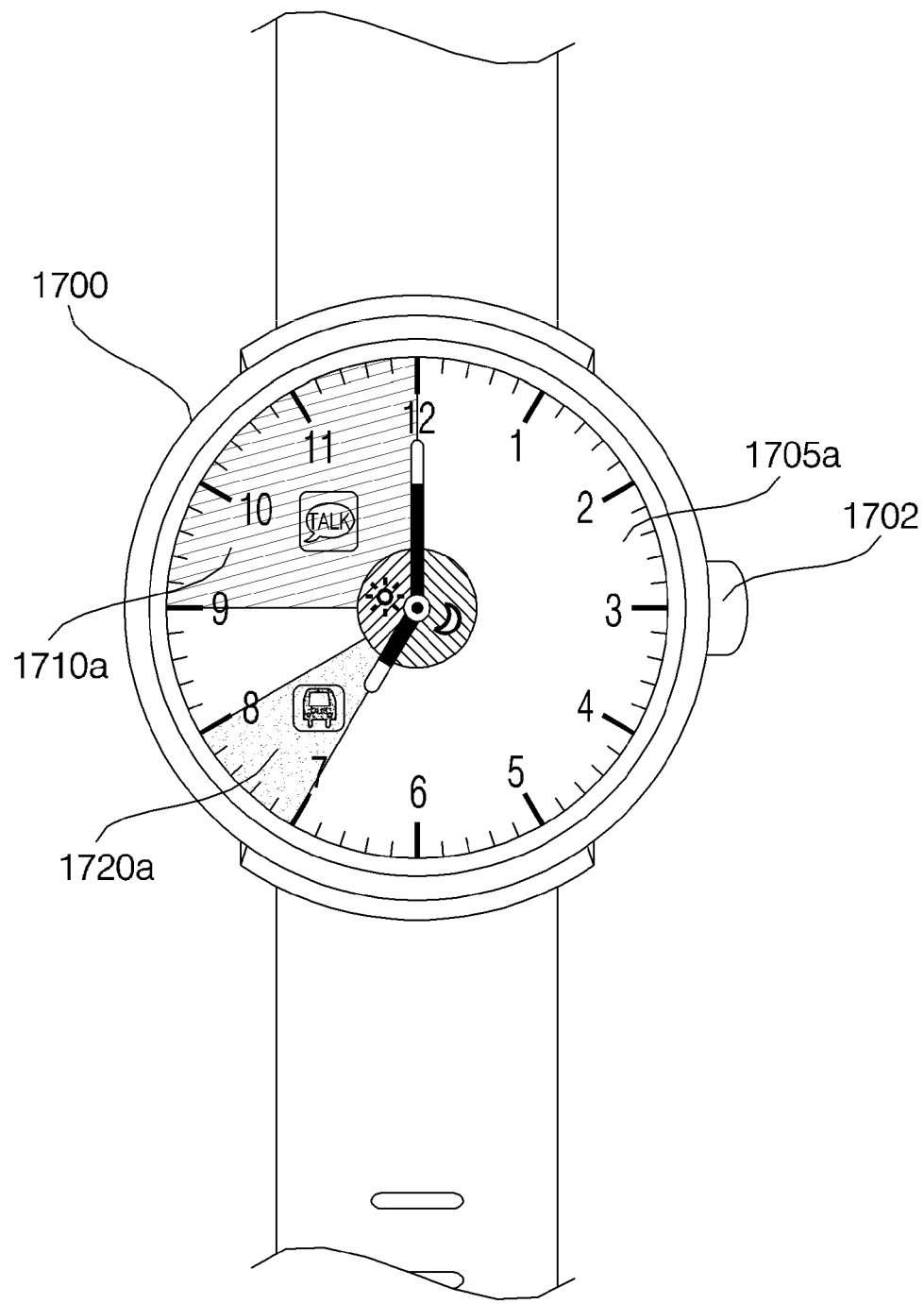

FIG. 17A illustrate that a circular watch object 1705a is displayed on a wearable digital watch 1700 that is a mobile terminal.

The watch object 1705a may include a region 1710a between 9:00 to 12:00 and a region 1720a between 7:00 and 8:00.

The region 1710a between 9:00 and 12:00 may include a schedule or phone call application related to a corresponding time region, and the region 1720a between 7:00 and 8:00 may include a schedule or phone call application related to a corresponding time region.

Meanwhile, the mobile terminal 100 and the wearable digital watch 1700 may be synchronized with each other. In particular, information related to a watch object of the mobile terminal 100 may be transmitted to the wearable digital watch 1700.

Figure 17B:
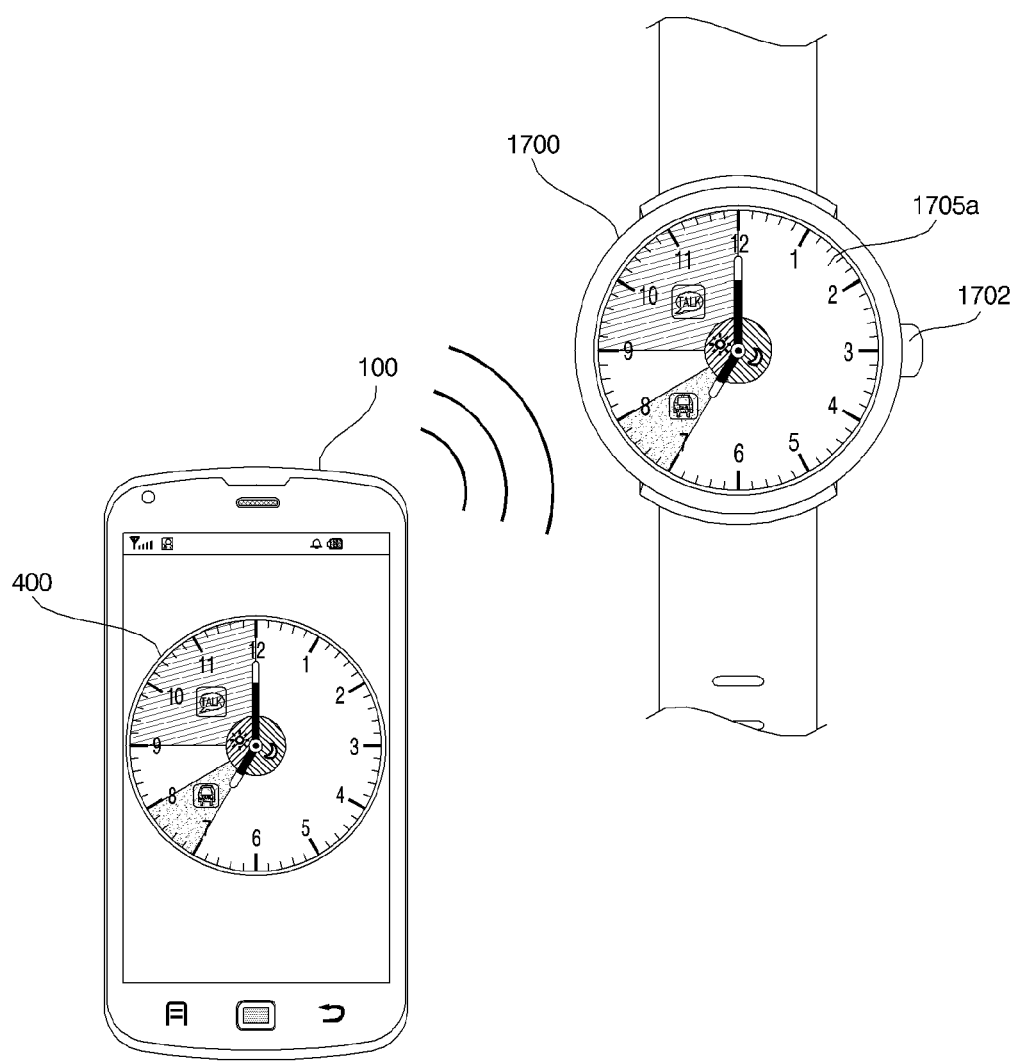

FIG. 17B illustrates that the watch object 400 is displayed on the mobile terminal 100 and the watch object 1705a is displayed on the wearable digital watch 1700.

Both the watch object 400 and the watch object 1705a may include the same schedule information.

Meanwhile, a plurality of schedule information for each user may be set.

The controller 180 may divide user schedule information into a plurality of information according to a security or sharing level.

Specifically, the controller 180 may control user schedule information on the current day so as to be divided into first schedule information of a first security or sharing level, second schedule information of a second security or sharing level, and third schedule information of a third security or sharing level.

For example, the first schedule information may be schedule information for sharing with all users, the second schedule information may be schedule information for sharing with users of a prescribed group, and the third schedule information may be schedule information for only the user without sharing with other users.

Meanwhile, the controller 180 may control the first schedule information so as to be displayed in response to a display input of a first security level or a first sharing level, and may control the second schedule information so as to be displayed in response to a display input of a second security level or a second sharing level.

Figure 17C:
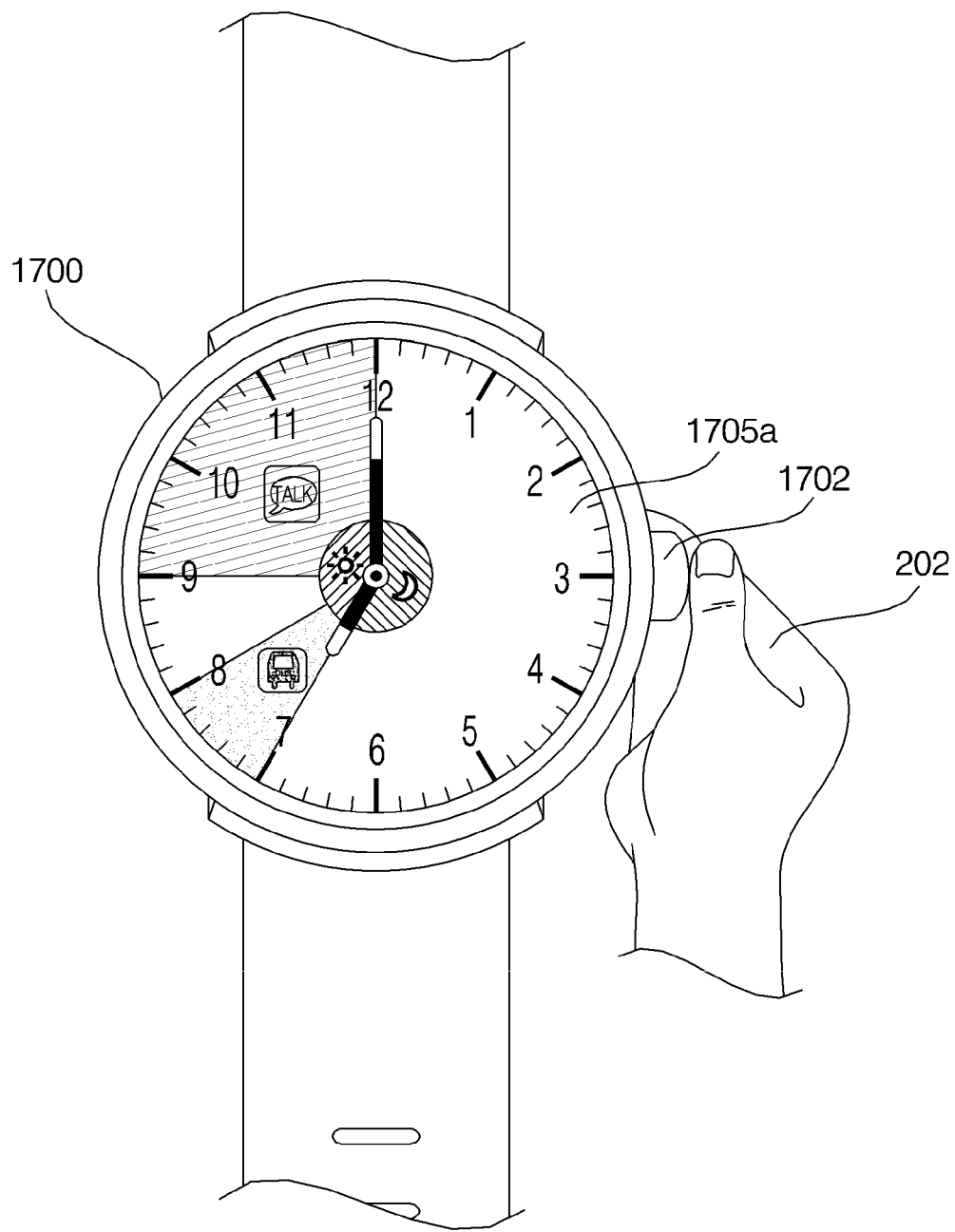

FIG. 17C illustrates that the first watch object 1705a that is sharable with all users is displayed on the wearable digital watch 1700.

Figure 17D:
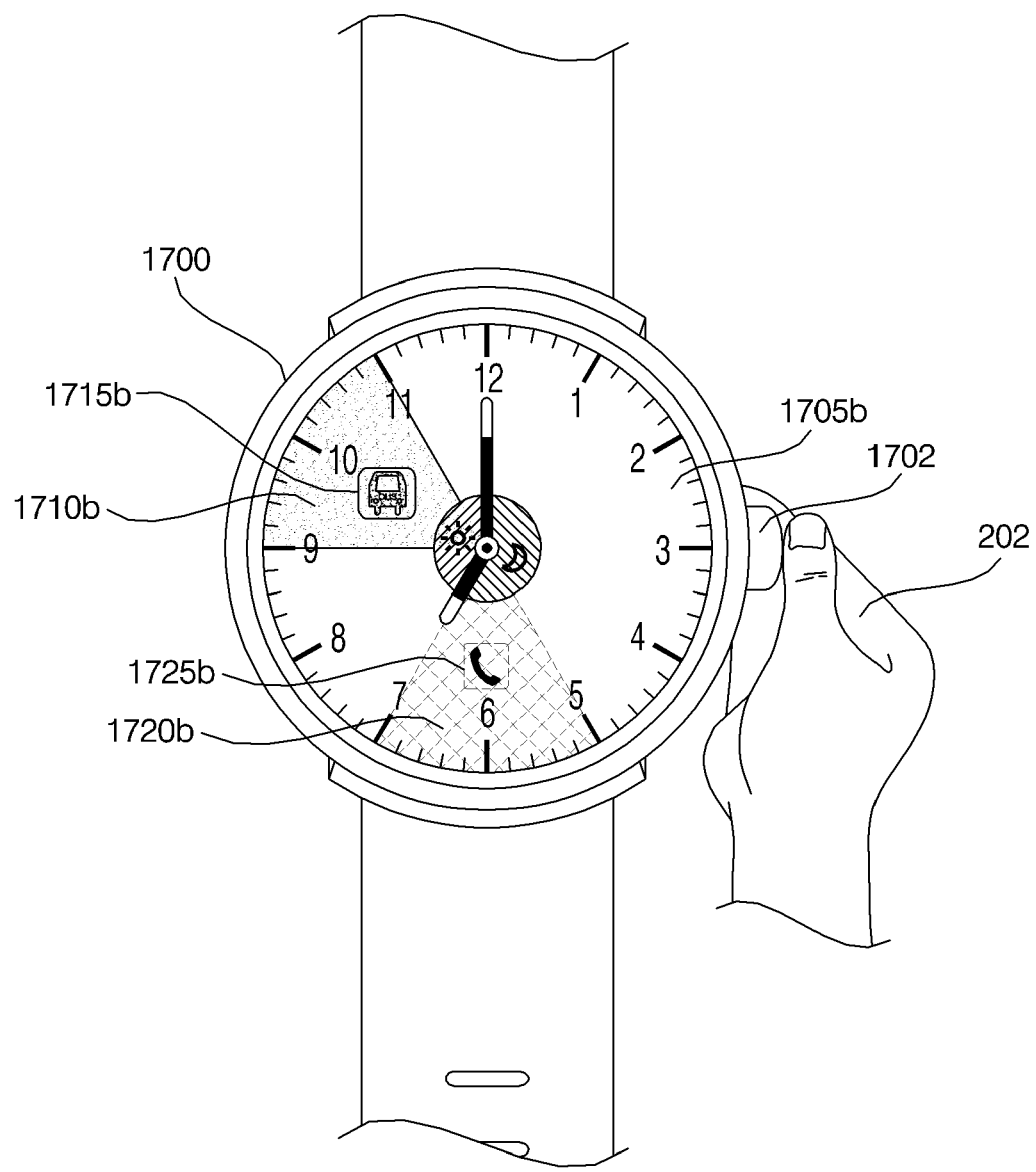

At this time, when the user pushes a prescribed input part 1702 of the wearable digital watch 1700 with the hand 202, as exemplarily illustrated in FIG. 17D, a second watch object 1705b including schedule information that is sharable with a specific group may be displayed on the wearable digital watch 1700.

The second watch object 1705b illustrates a region 1720b related to a schedule between 5:00 and 7:00 and a region 1710b related to a schedule between 9:00 and 11:00.

The region 1720b may include a phone call related application item 1725b, and the region 1710b may include a bus related application item 1715b.

Figure 17E:
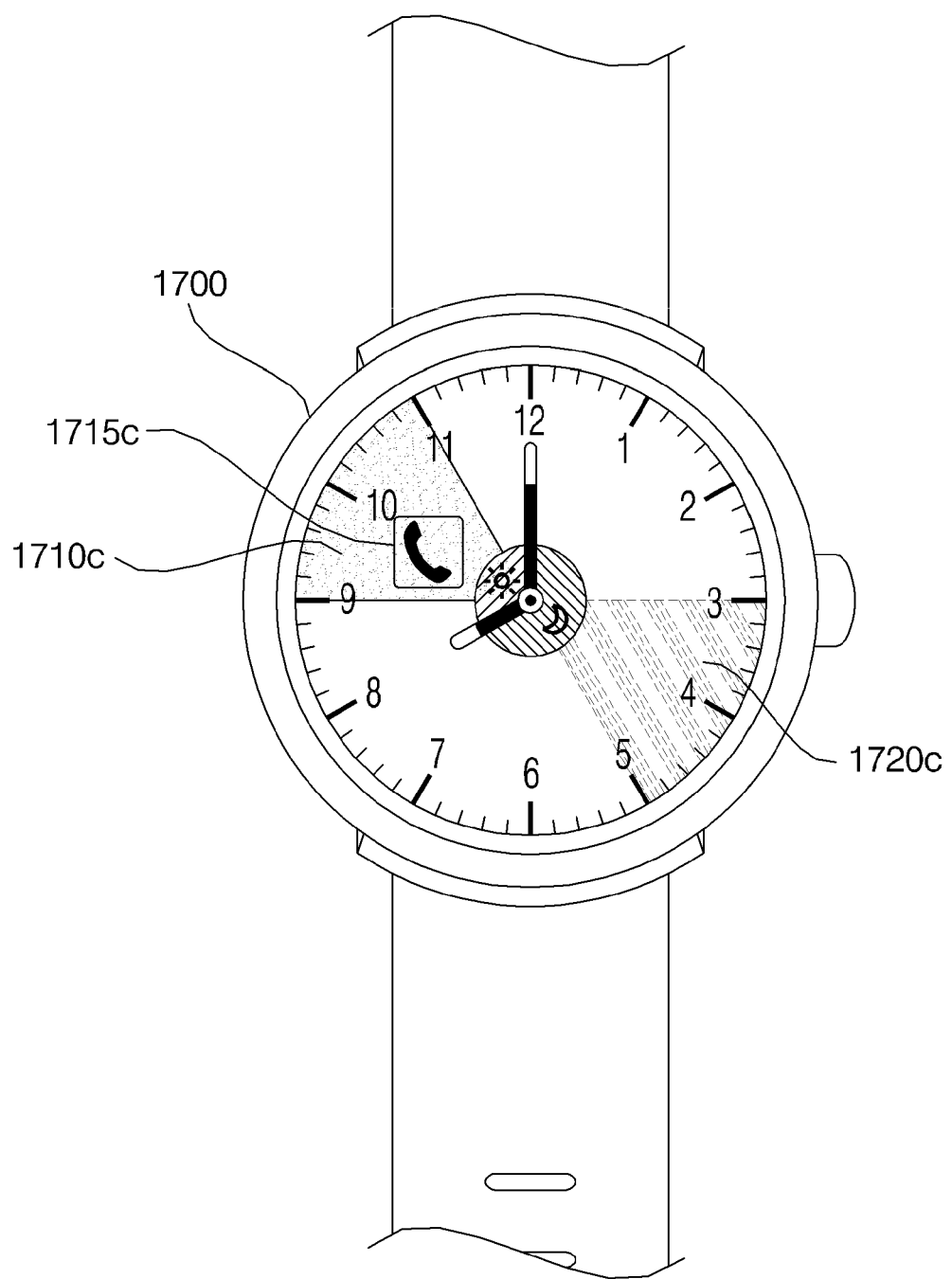

When the user again pushes the prescribed input part 1702 of the wearable digital watch 1700 with the hand 202, as exemplarily illustrated in FIG. 17E, a third watch object 1705c including schedule information that is not shared with other users may be displayed on the wearable digital watch 1700.

The third watch object 1705ca region 1720c related to a schedule between 3:00 and 5:00 and a region 1710c related to a schedule between 9:00 and 11:00.

The region 1720c may include no application item when the region 1720c is not related to other applications, and the region 1710c may include a phone call related application item 1715c.

As described above, as a plurality of schedule information is divided according to a security or sharing level and difference pieces of schedule information are displayed according to a security or sharing level, selective protection of schedule information is possible.

FIGS. 18A to 18D are views illustrating a method for editing a watch object displayed on the wearable digital watch 1700.

Figure 18A:
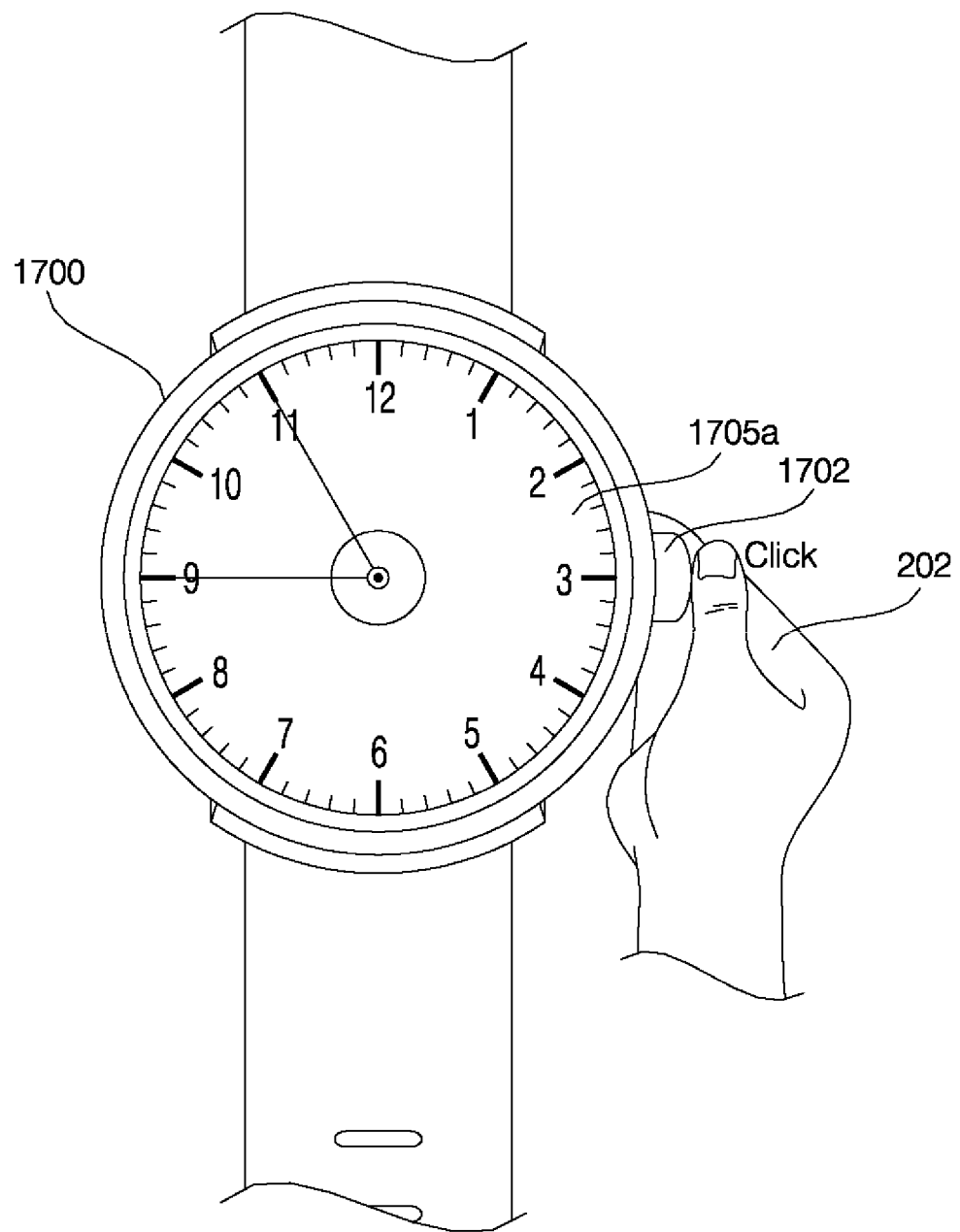

First, FIG. 18A illustrates that the user clicks a prescribed input part 1702 of the wearable digital watch 1700 with the hand 202.

The controller 180 may control a watch object edit screen so as to be displayed on a circular display unit when the user clicks the prescribed input part 1702. For example, a screen such as the watch object 1420 of FIG. 13P may be displayed.

Figure 18B:
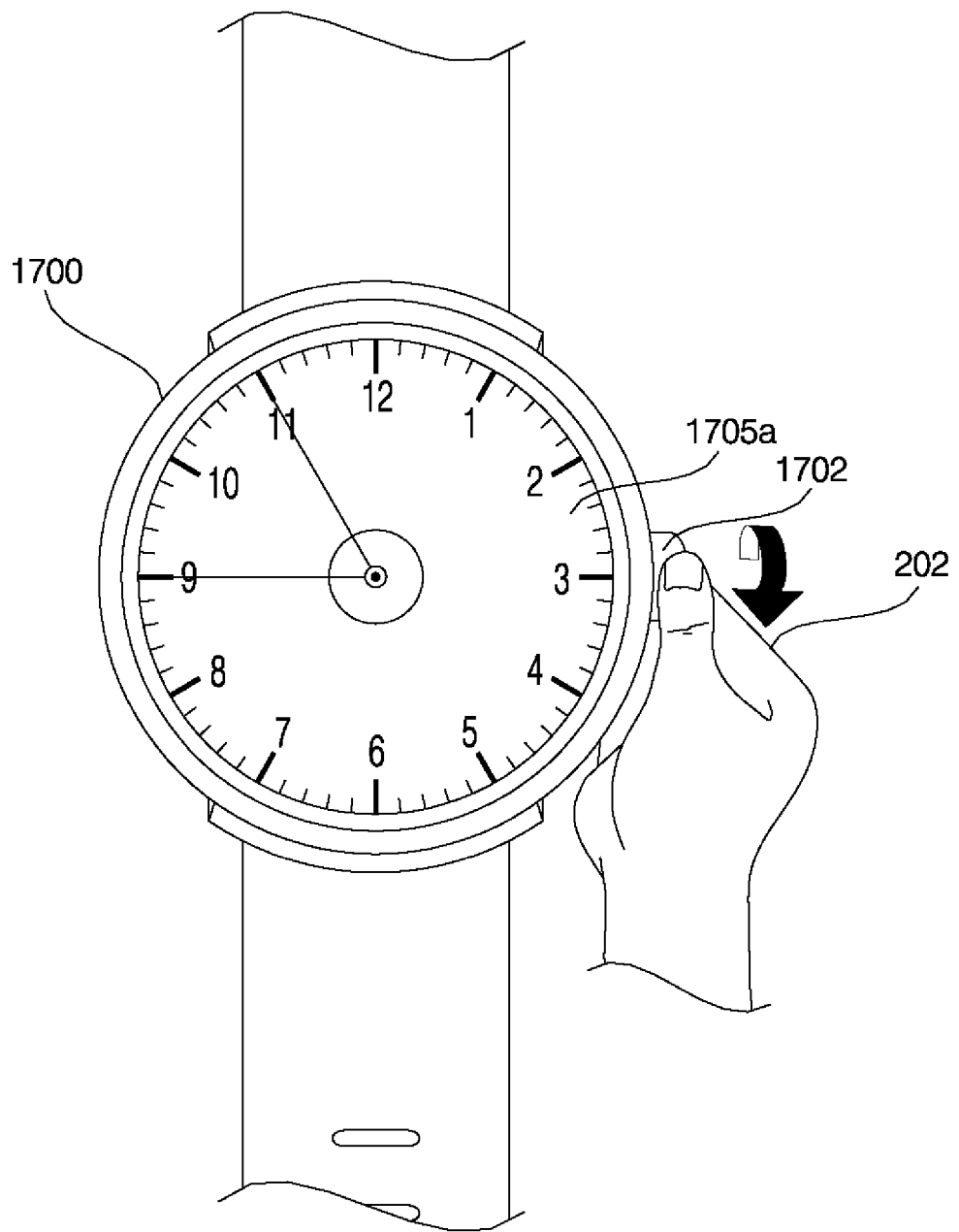

Next, FIG. 18B illustrates the case where the user rotates the prescribed input part 1702 of the wearable digital watch 1700 in a given direction.

The controller 180 may control a watch object edit screen so as to be displayed on a circular display unit when the prescribed input part 1702 is rotated in a given direction. For example, a screen such as the watch object 1420 of FIG. 13P may be displayed.

Meanwhile, after the end of setting, a schedule or a related application set in a specific time region (a region between 9:00 and 11:00) may be displayed in a watch object.

Figure 18C:
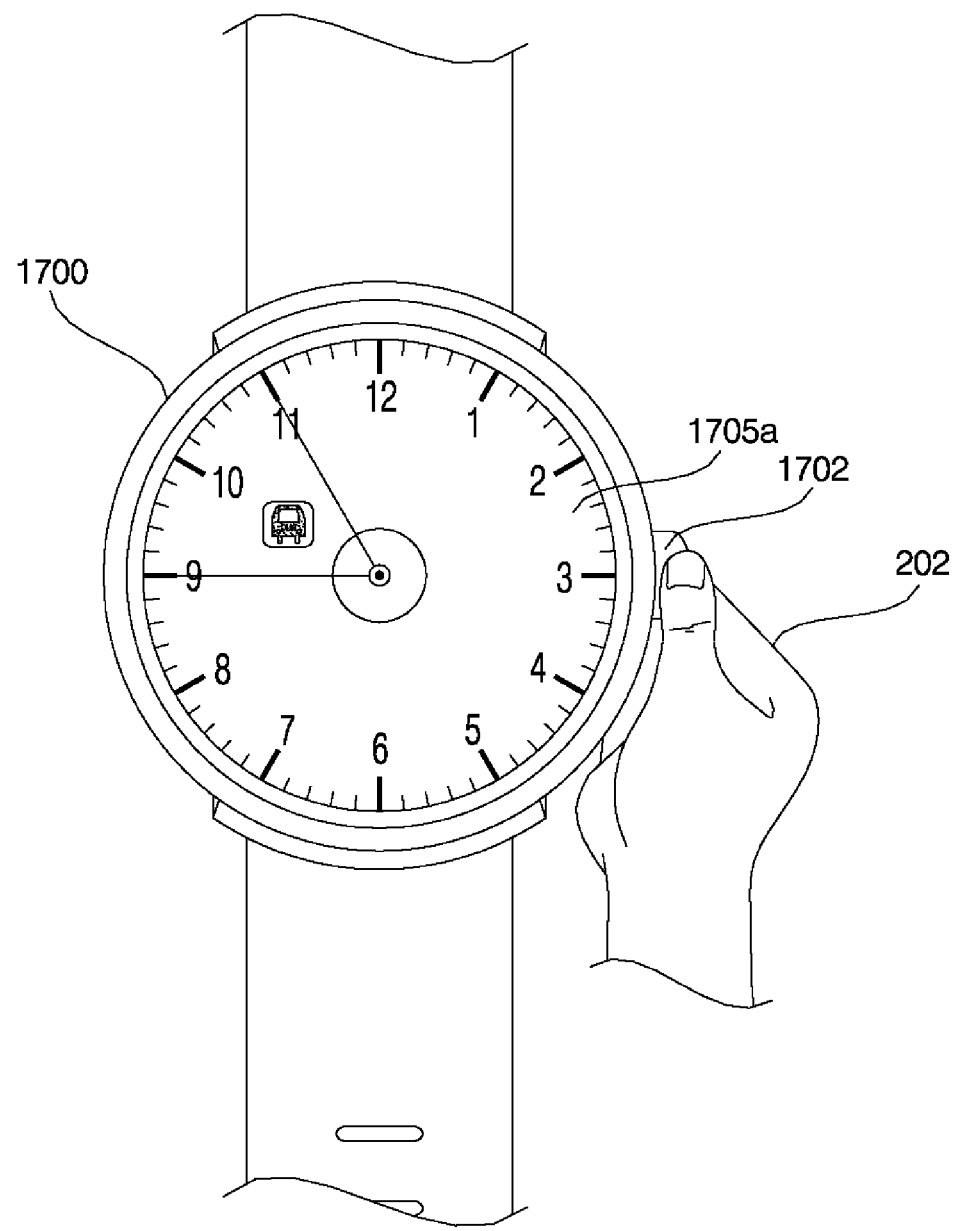
Figure 18D:
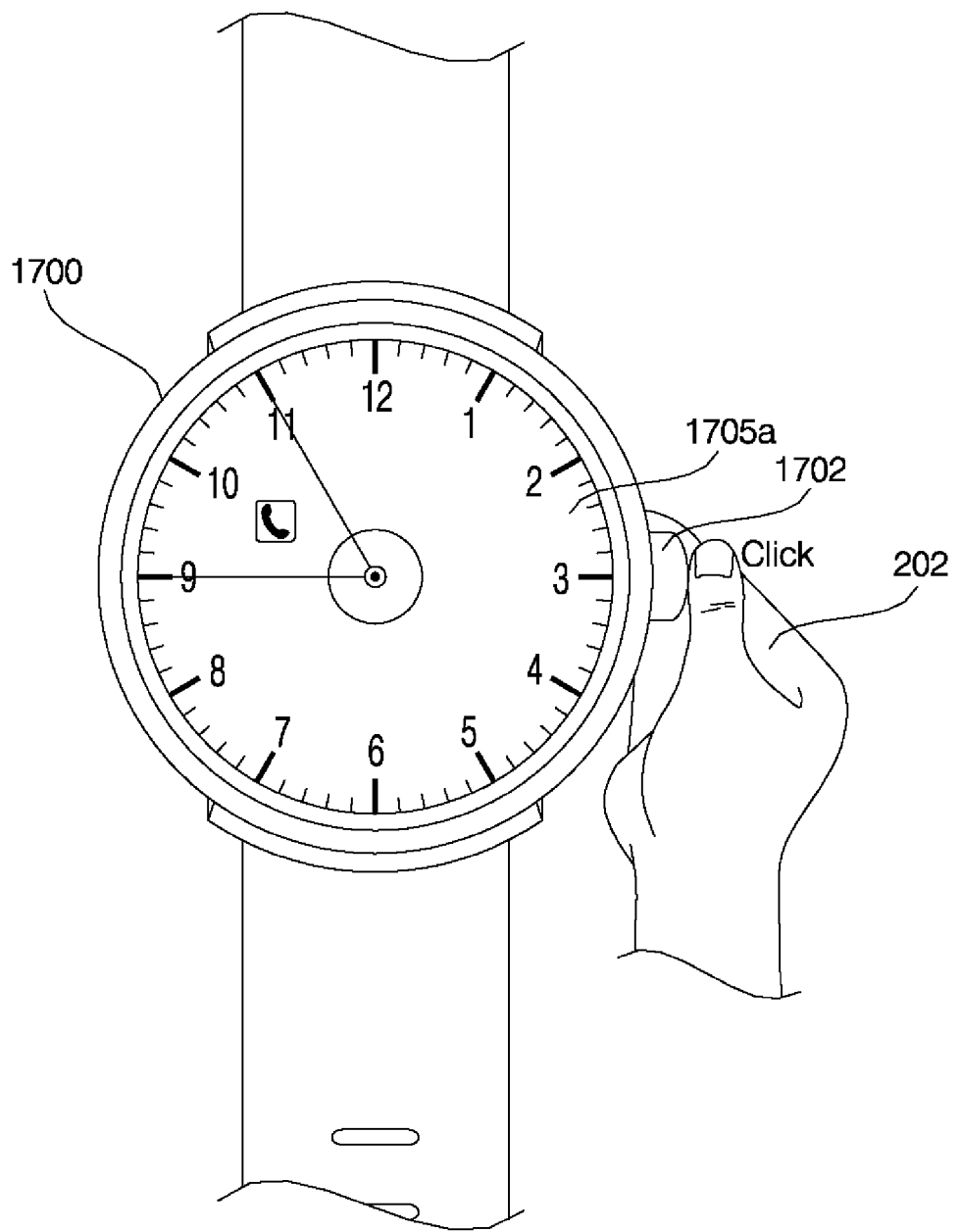

FIGS. 18C and 18D respectively illustrate that a bus related application or a phone call related application is set in a specific time region (a region between 9:00 and 11:00). In this way, the user can simply edit information via the wearable digital watch 1700.

As is apparent from the above description, according to an embodiment of the present invention, a mobile terminal includes a display unit and a controller configured to display a watch object on the display unit, the watch object including at least one of a plurality of schedule information or a plurality of applications, and the controller is configured to control a corresponding piece of schedule information or a corresponding application screen so as to be displayed when a first region of the watch object is touched or when a current time reaches a time corresponding to the first region and to control a corresponding piece of schedule information or a corresponding application screen so as to be displayed when a second region of the watch object is touched or when a current time reaches a time corresponding to the second region. In this way, the user can simply check, for example, a plurality of schedules.

In addition, as a corresponding schedule or application is executed automatically or according to a user selection, user convenience may be enhanced.

Meanwhile, the mobile terminal is capable of receiving, for example, a schedule from other users or transmitting a schedule of the user to external devices, which enables schedule sharing.

Meanwhile, a plurality of schedule information may be classified according to a security or sharing level and different pieces of schedule information may be displayed according to a security or sharing level, which enables selective protection of the schedule information.

A mobile terminal according to the present invention should not be limited to configurations and methods of the above-described embodiments, and all or some of the embodiments may be selectively combined with one another to achieve various alterations.

In addition, a method for operating a mobile terminal according to the present invention may be implemented as code that may be written on a processor readable recording medium and thus read by a processor provided in the mobile terminal. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed there from in a decentralized manner.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A mobile terminal comprising:
   a display unit; and
   a controller configured to display a watch object on the display unit, the watch object including at least one of a plurality of schedule information or a plurality of applications,
   wherein the controller is configured to:
   when a first region of the watch object is touched or when a current time reaches a time corresponding to the first region, display schedule information or a corresponding application screen related to the first region of the watch object or the time corresponding to the first region; and
   when a second region of the watch object is touched or when a current time reaches a time corresponding to the second region, display schedule information or a corresponding application screen related to the second region of the watch object or the time corresponding to the second region,
   wherein the controller is configured to:
   display an application screen corresponding to the first region when there is a short touch input to the first region; and
   display a sub menu related to the first region when there is a long touch input to the first region, and
   wherein the sub menu includes a schedule information view item to view information regarding a schedule reserved in the first region.

2. The mobile terminal according to claim 1, wherein the controller is configured to:
   display the watch object in a lock screen; and
   release the lock screen and display a home screen in response to an input to select at least one of numbers in the watch object displayed in the lock screen.

3. The mobile terminal according to claim 1, wherein the controller is configured to output an alarm message or execute a corresponding application when a current time reaches a time corresponding to the first region or the second region in the watch object.

4. The mobile terminal according to claim 1, wherein, when a current time is a time after the first region in a state in which the watch object is displayed, the controller is configured to make the first region disappear or to differentially display from the first region in a case where the current time is a time before the first region.

5. The mobile terminal according to claim 1, wherein, when a current time is a time after the first region in a state in which the watch object is displayed, the controller is configured to make the first region disappear and to additionally display a region related to a next schedule or application item.

6. The mobile terminal according to claim 1, wherein the controller is configured to transmit schedule information with respect to the first region to an external device when there is a schedule information transmission input to the first region.

7. The mobile terminal according to claim 6, wherein the schedule information transmission input to the first region corresponds to an input to select a share item in a schedule screen.

8. The mobile terminal according to claim 6, wherein the transmitted schedule information of the first region includes time information with respect to the first region and application information set to correspond to the first region.

9. The mobile terminal according to claim 8, wherein the controller is configured to execute the application set to correspond to the first region when there is an application execution input from the external device or when a current time reaches a time corresponding to the first region.

10. The mobile terminal according to claim 1, wherein the sub menu further includes a representative schedule setting item for setting of a representative schedule when there is a plurality of schedule information, and
    wherein the controller is configured to set any one of schedule information to a representative schedule and to display any one of schedule information on the watch object when the representative schedule setting item is selected.

11. The mobile terminal according to claim 1, wherein the controller is configured to receive schedule information from an external source and to display the received schedule information on a screen or to execute an application corresponding to the schedule information.

12. The mobile terminal according to claim 1, wherein the controller is configured to synchronize schedule information related to the watch object with another application and to display the schedule information related to the watch object in a synchronized state.

13. The mobile terminal according to claim 1, wherein the controller is configured to:
    display a calendar object along with the watch object; and
    when a specific date of the calendar object is selected, display schedule information corresponding to the selected date in the watch object.

14. The mobile terminal according to claim 1, wherein the controller is configured to transmit information related to the watch object to a wearable device.

15. The mobile terminal according to claim 1, wherein the controller is configured to change a time region displayed in the watch object when a time axis in the watch object is touched and dragged in a given direction or along a circular path.

16. The mobile terminal according to claim 1, wherein the controller is configured to:
   divide the pieces of schedule information according to a security or sharing level;
   display first schedule information according to a first security or first sharing level; and
   display second schedule information according to a second security or second sharing level.

17. A mobile terminal comprising:
   a display unit;
   a communication unit configured to externally transmit data; and
   a controller configured to display a watch object on the display unit, the watch object including at least one of a plurality of schedule information or a plurality of applications,
   wherein the controller is configured to transmit schedule information with respect to a first region in the watch object to an external device when there is a schedule information transmission input to the first region,
   wherein the controller is configured to:
   display an application screen corresponding to the first region when there is a short touch input to the first region; and
   display a sub menu related to the first region when there is a long touch input to the first region, and
   wherein the sub menu includes a schedule information view item to view information regarding a schedule reserved in the first region.

18. A mobile terminal comprising:
   a display unit;
   a communication unit configured to externally transmit data; and
   a controller configured to display a watch object on the display unit, the watch object including at least one of a plurality of schedule information or a plurality of applications,
   wherein the controller is configured to transmit schedule information, including time information with respect to a first region in the watch object and application information set to correspond to the first region, when there is a schedule information transmission input to the first region,
   wherein the controller is configured to:
   display an application screen corresponding to the first region when there is a short touch input to the first region; and
   display a sub menu related to the first region when there is a long touch input to the first region, and
   wherein the sub menu includes a schedule information view item to view information regarding a schedule reserved in the first region.

* * * * *